(12) United States Patent
Moran et al.

(10) Patent No.: US 6,738,205 B1
(45) Date of Patent: May 18, 2004

(54) SELF-WRITING OF SERVO PATTERNS IN DISK DRIVES

(75) Inventors: Patrick Moran, Shrewsbury, MA (US); Tim Everett, Los Gatos, CA (US); Peter McEwen, Santa Clara, CA (US); Mike Moser, San Jose, CA (US); Stan Shepherd, Morgan Hill, CA (US); Eduardo Gentile Veiga, Sunnyvale, CA (US); Murat Erkocevic, San Jose, CA (US); Bill Baker, Redwood City, CA (US)

(73) Assignee: Maxtor Corporation, Longmont, CO (US)

(*) Notice: Subject to any disclaimer, the term of this patent is extended or adjusted under 35 U.S.C. 154(b) by 93 days.

(21) Appl. No.: 09/903,445

(22) Filed: Jul. 8, 2001

(51) Int. Cl.[7] ................................................ G11B 5/86
(52) U.S. Cl. .......................................... 360/17; 360/75
(58) Field of Search .............................. 360/75, 17, 15

(56) References Cited

U.S. PATENT DOCUMENTS

| | | | |
|---|---|---|---|
| 5,012,363 A | 4/1991 | Mine et al. ............... 360/77.05 |
| 5,570,247 A | 10/1996 | Brown et al. | |
| 5,585,989 A | 12/1996 | Kuromiya et al. | |
| 5,668,679 A | 9/1997 | Swearingen et al. .......... 360/75 |
| 5,757,574 A | 5/1998 | Chainer et al. | |
| 5,784,296 A | 7/1998 | Baker et al. ............ 364/551.01 |
| 5,793,554 A | 8/1998 | Chainer et al. | |
| 5,838,512 A * | 11/1998 | Okazaki ...................... 360/51 |
| 5,867,337 A | 2/1999 | Shimomura | |
| 5,875,064 A | 2/1999 | Chainer et al. | |
| 5,991,104 A | 11/1999 | Bonyhard | |
| 6,061,504 A | 5/2000 | Tzelnic et al. | |
| 6,304,407 B1 * | 10/2001 | Baker et al. ................... 360/75 |
| 6,411,459 B1 * | 6/2002 | Belser et al. ................. 360/75 |
| 6,522,494 B1 * | 2/2003 | Magee ....................... 360/75 |

FOREIGN PATENT DOCUMENTS

| | | | |
|---|---|---|---|
| JP | 9702519 | 7/1997 | |
| JP | 10162493 | 6/1998 | |
| JP | 9804913 | 11/1998 | |
| JP | 2000322849 A * | 11/2000 | ........... G11B/21/10 |
| WO | WO 99/24971 * | 5/1999 | ............. G11B/5/00 |

OTHER PUBLICATIONS

Ono, H.; "Architecture and Performance of the ESPER–2 Hard–Disk Drive Servo Writer," *IBM J. Res. Develop.*; vol. 37, No. 1; Jan. 1993; p. 3–11.

* cited by examiner

Primary Examiner—David Hudspeth
Assistant Examiner—Dan I. Davidson

(57) ABSTRACT

A method and system for self-servo writing a disk drive by transferring a servo reference pattern by magnetic printing onto at least one storage surface of a reference disk, wherein a resulting printed reference pattern includes embedded servo information providing servo timing and transducer head position information; assembling the disk drive including the steps of installing at least said disk into the disk drive and enclosing said disk and the data transducers within a housing sealed against particulate contamination from an eternal ambient environment; reading the printed reference pattern from said disk via at least one transducer head to generate a readback signal; sampling the readback signal at a sampling rate to generate a sampled signal; processing the sampled signal waveform specturm to generate a recovered signal including the embedded servo information and a fundamental frequency of the sampled signal; using the servo information from the recovered signal to precisely position and maintain the data transducers at concentric track locations of disk storage surfaces; and self-writing disk drive servo patterns onto the storage surfaces at the concentric track locations with the data transducers in accordance with disk drive servo pattern features.

88 Claims, 24 Drawing Sheets

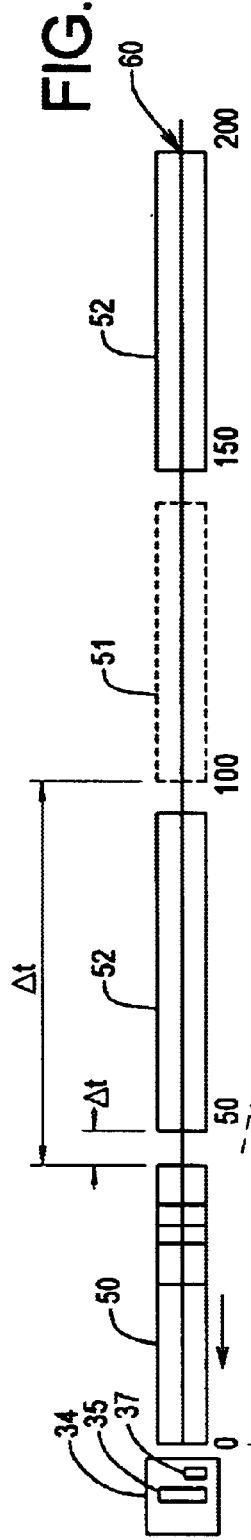
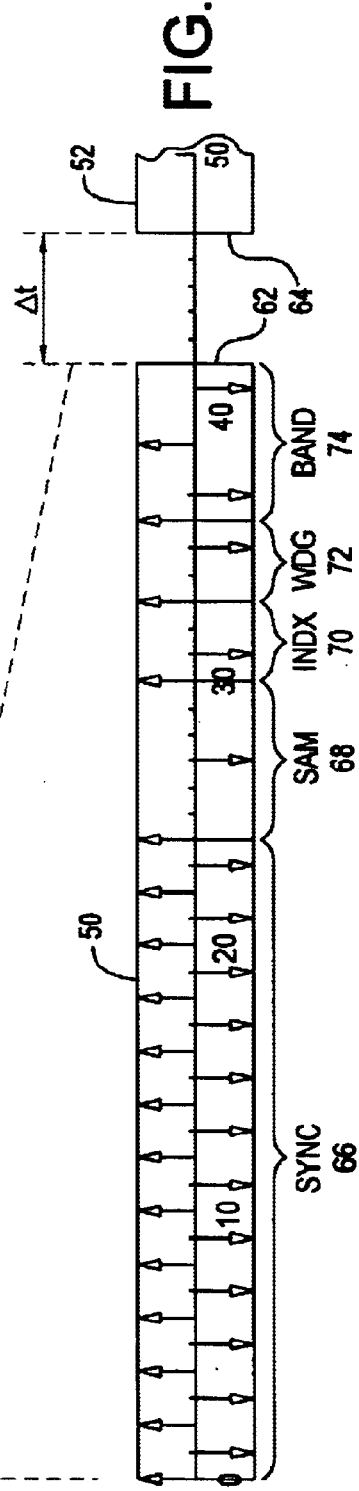
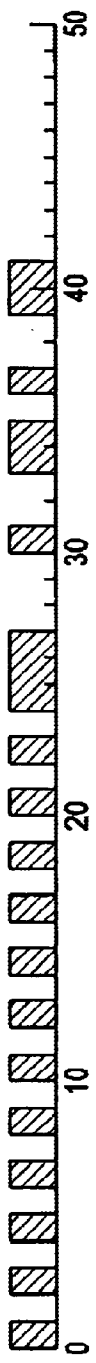
FIG. 5A
FIG. 5B
FIG. 5C

SPATIAL COORDINATES

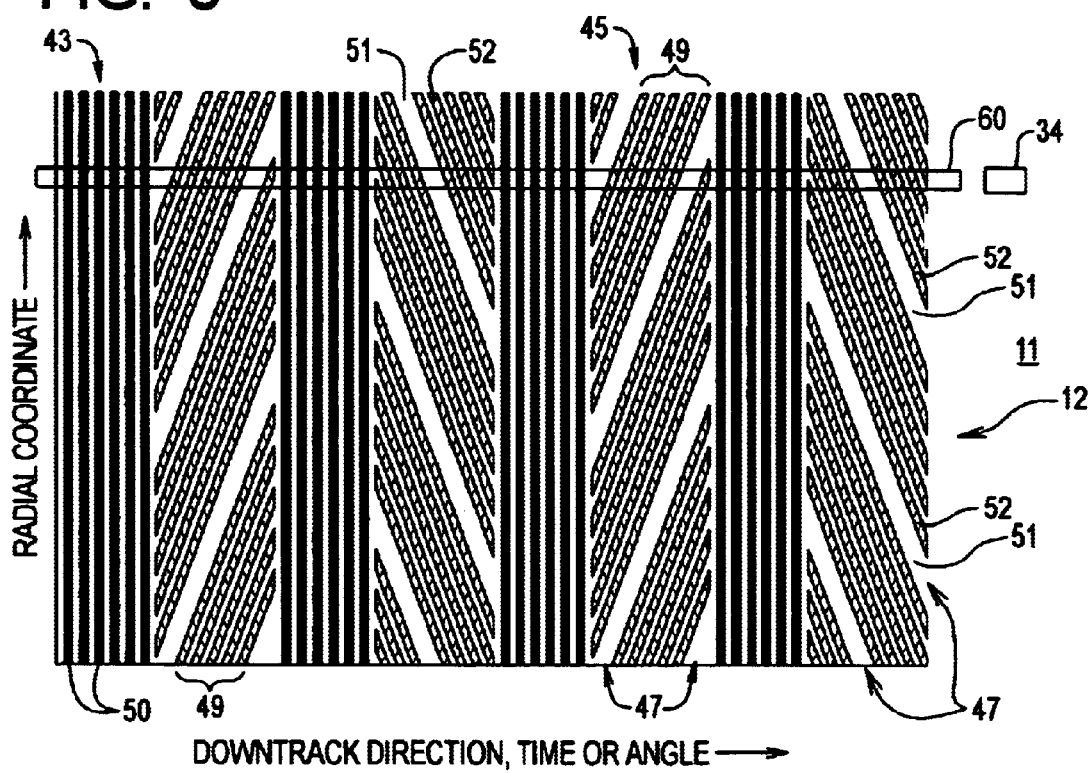

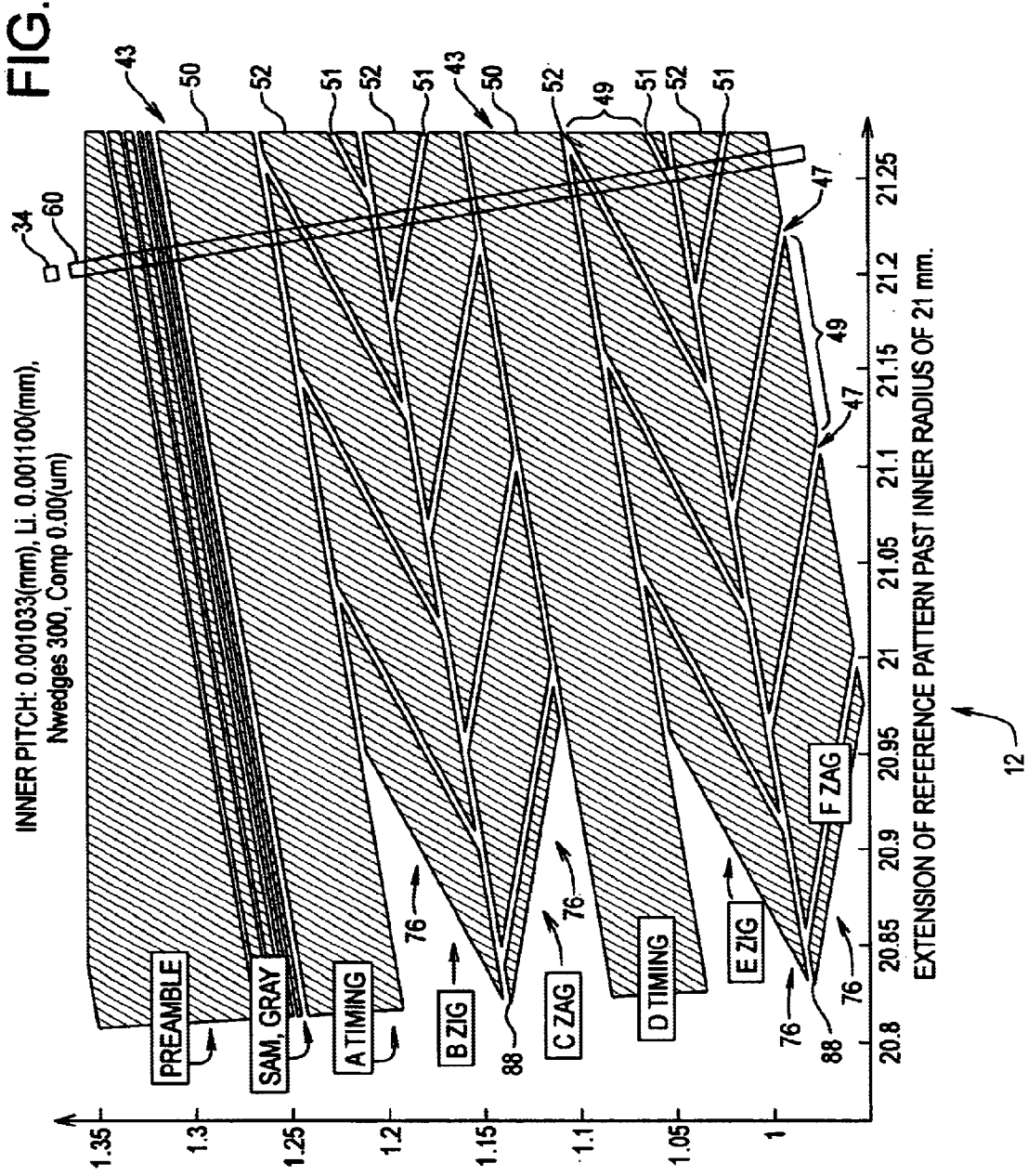

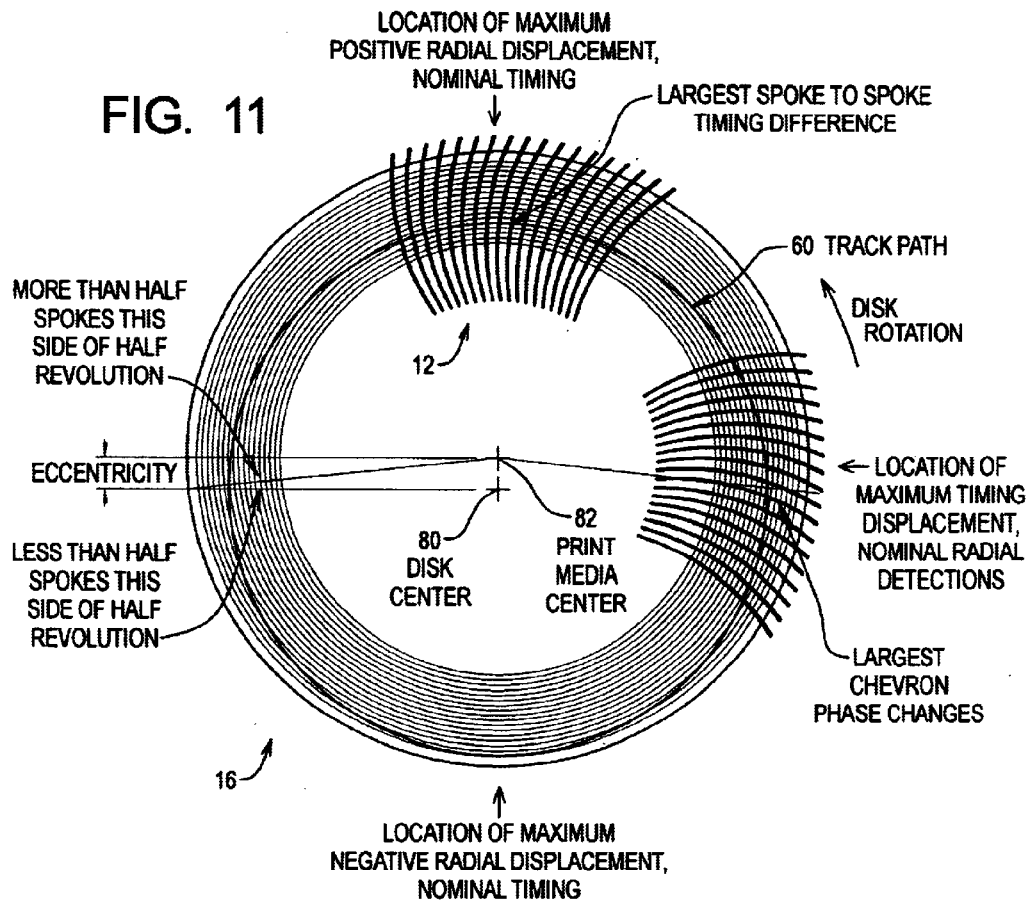
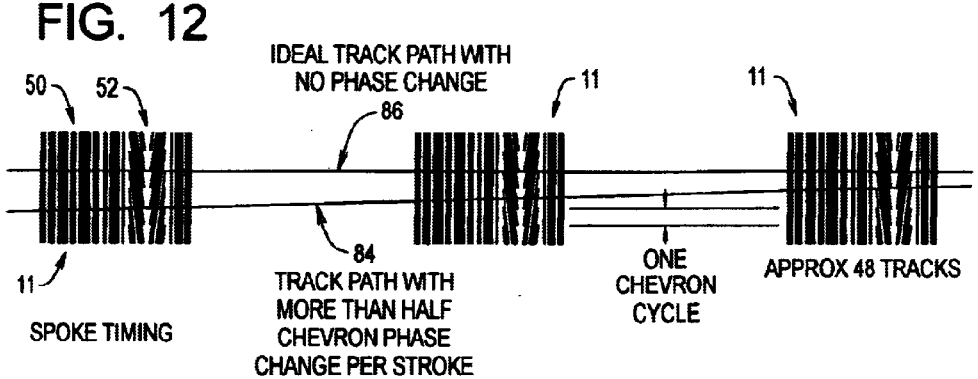

SELF-WRITING OF SERVO PATTERNS IN DISK DRIVES

FIELD OF THE INVENTION

The present invention relates generally to a method for writing servo sector patterns on a data disk storage device, and more particularly, to self-servo writing of servo sector patterns on a data disk storage device using a reference pattern on a surface of a data disk.

BACKGROUND OF THE INVENTION

In many processing and computing systems, magnetic data storage devices, such as disk drives are utilized for storing data. A typical disk drive includes a spindle motor having a rotor for rotating one or more data disks having data storage surfaces, and an actuator for moving a head carrier arm that supports transducer (read/write) heads, radially across the data disks to write data to or read data from concentric data tracks on the data disks.

In general, a magnetic transducer head is positioned very close to each data storage surface by a slider suspended upon an air bearing. Typical clearance between a smooth disk surface and the slider is about one microinch, or less. The close proximity of the head to the disk surface allows recording of very high resolution data and servo patterns on the disk surface. Servo patterns are typically written with uniform angular spacing of servo sectors and interleaved data sectors or blocks. An example servo pattern includes circumferentially sequential, radially staggered single frequency bursts. Servo patterns provide the disk drive with head position information to enable the actuator, such as a rotary voice coil positioner, to move the head from starting tracks to destination tracks during random access track seeking operations. Further, the servo patterns provide the disk drive with head position information to enable the actuator to position and maintain the head in proper alignment with a track centerline during track following operations when user data is written to or read from the available data block storage areas in concentric data tracks on the disk surface.

Data transducer heads currently in use employ dual elements. An inductive write element having a relatively wide recording gap is used to write information into the data tracks, and a read element such as a "giant-magneto-resistive sensor" having a relatively narrow playback gap is used to read information from the data tracks. With this arrangement, data track densities equaling and exceeding e.g. 30,000 tracks per inch are possible.

In a standard manufacturing process the head disk assembly (HDA) of the disk drives are assembled in a clean room environment, then transported to a specialized servowriter station where the drive is mounted to a stabilized metrological measurement system. A customized drive electronic assembly then writes a servo reference track, from which the embedded servo format is created. The drive modules are then assembled to the HDA and are moved to a self scan station where the drives are tested for reliable servo operation. Block errors, drive defects, drive specific control tracks and other information is written to the media at this station. If the drive fails the self-scan tests it is either reworked or scrapped at this late manufacturing stage.

Conventionally, servo patterns are written into the servo sectors of each disk using a servowriter at a point in the drive assembly process before the hard disk unit is sealed against particulate contamination from the ambient. A servo writer is a complex and expensive manufacturing unit, typically stabilized on a large granite base to minimize unwanted vibration and employing e.g. laser interferometry for precise position measurements. The servo writer typically requires direct mechanical access to the head arm, and includes a fixed head for writing a clock track onto a disk surface.

Because of the need for direct access to the interior of the hard disk assembly of each disk drive unit, the servo writer is typically located within a "clean room" where air is purged of impurities that might otherwise interfere with operation including the servo writing process or in normal usage after manufacturing. Further, such conventional servo-writing methods are very time consuming. In one example, a disk drive having two disks with four data storage surfaces can require three servo-writer-controlled passes of the transducer head over a single track during servo writing, consuming a total servo writing time as long as 13.2 minutes. Thus, servo writing using servo writers in clean rooms requires both considerable capital investment in the manufacturing process and severe time penalties in the manufacturing process attributable to servo writer bottlenecks. Further, as track densities increase with evolving hard disk designs, servo writers become obsolete, and have to be replaced, or upgraded, at considerable capital expense.

An attempt to alleviate the above shortcomings is directed to servo writing a master pattern at full resolution on one surface of a master disk during a pre-assembly operation. Then, a master disk with the master pattern is assembled with other blank disks into a disk drive unit. After the disk drive unit is sealed against the ambient, the master servo pattern of the master disk is used as a reference by the disk unit in self-writing embedded sector servo patterns on each data surface within the enclosed unit. Finally, the master pattern is erased, leaving the disk drive unit with properly located embedded servo sector patterns on every surface, including the surface which originally included the master pattern. An example of this servo writing method is described in U.S. Pat. No. 5,012,363 to Mine et al, entitled: "Servo Pattern Writing Method for a Disk Storage Device". However, a disadvantage of such a method is that certain repeatable run out information must be removed during the self-servo write operation. Another disadvantage of such a method is that a number of expensive servo writers are still required to write the master patterns on the master disks.

A self-servo writing method which eliminates the need for such servo-writers is described in commonly assigned U.S. Pat. No. 5,668,679 to Swearingen et al., entitled: "System for Self-Servo writing a Disk Drive", the disclosure thereof being incorporated herein by reference. That method essentially comprises the steps of writing a clock track at an outside diameter (OD) recording region of a first disk surface of a disk drive having multiple storage surfaces, tuning an open-loop seek from the OD to an inside diameter (ID) recording region to develop a repeatable seek profile, and recording a plurality of high frequency spiral tracks from the OD to the ID, each spiral track including embedded (e.g. missing bit) timing information. Then, spiral track provided peak data, and missing bit data, are read back. A voltage controlled oscillator is locked to the timing information to track disk angular position. As the head is then moved radially from OD to ID the detected spiral peaks shift in time relative to a starting (index) mark, although the timing information does not shift. Embedded servo sectors can then be precisely written across the data storage surface by multiplexing between reading spirals and writing servo sectors (wedges). After the integrity of the wedges has been verified, the spirals are erased (overwritten with user data).

While this method is satisfactory, challenges remain in generating and recording an accurate clock pattern on the first disk surface. Further, the time period required to produce the master position pattern on the first disk surface can be lengthy.

There is, therefore, a need for an improved self-servo writing method in disk drives which reduces self-servo writing times, is simpler to implement and does not require servo-writers.

BRIEF SUMMARY OF THE INVENTION

The present invention satisfies these needs. In one embodiment, the present invention provides a method and system for self-servo writing a disk drive by transferring a servo reference pattern by magnetic printing onto at least one storage surface of a reference disk, wherein a resulting printed reference pattern includes embedded servo information providing servo timing and transducer head position information; assembling the disk drive including the steps of installing at least said disk into the disk drive and enclosing said disk and the data transducers within a housing sealed against particulate contamination from an eternal ambient environment; reading the printed reference pattern from said disk via at least one transducer head to generate a readback signal; sampling the readback signal at a sampling rate to generate a sampled signal; processing the sampled signal waveform specturm to generate a recovered signal including the embedded servo information and a fundamental frequency of the sampled signal; using the servo information from the recovered signal to precisely position and maintain the data transducers at concentric track locations of disk storage surfaces; and self-writing disk drive servo patterns onto the storage surfaces at the concentric track locations with the data transducers in accordance with disk drive servo pattern features.

The present invention allows the disk drive to be fully assembled and tested in one location at one time. In addition it eliminates the requirement for the servowriter stations which occupy a large portion of the clean room factory floor. In one embodiment, the present invention utilizes an architecture for the read and write sections of a disk drive read/write channel and controller which allows the extraction of embedded servo reference timing from a printed reference pattern and a technique to replicate that timing onto the surface of the embedded product servo format.

According to another example method and system according to the present invention, a preformatted magnetic reference pattern is applied to one or more surfaces of disk media and are then assembled, using the standard manufacturing process, into the HDA. A phase extraction process extracts pattern phase information from the reference pattern, and another process eliminates any mechanical runout (i.e., eccentricity) due to standard assembly, using a combination of hardware and software signal processing techniques. The entire system structure is contained within the disk drive channel/controller design and requires no external devices or process steps during the disk drive manufacturing process. This allows the disk drives to be moved from the assembly area to the selfscan area where they are formatted and tested without the need to maintain and support a separate external servowriter process. It also allows the additional capability of detecting and correcting servo defects when the user data area is qualified during self scan.

The present invention helps reduce the manufacuturing costs of a disk drive assembly by eliminating the servowrite manufacturing process. The performance of the disk drive is unaffected in terms of user bit error rate, reliability or overall capacity. The lower disk drive manufacturing costs also increases profit margins.

DESCRIPTION OF THE DRAWINGS

These and other features, aspects and advantages of the present invention will become understood with reference to the following description, appended claims and accompanying figures where:

FIGS. 5A–C is a set of graphs depicting a linearized portion of a radial reference segment of the reference pattern of FIG. 4, printed at the printing station of FIG. 1;

FIG. 8 shows use of a printed reference pattern to obtain a precisely located data track having a track resolution (density) much higher than the printed reference pattern in accordance with aspects of the present invention;

FIG. 9A shows a greatly enlarged portion of another example of the reference pattern of FIG. 3 printed onto the reference-patterned disk at the printing station of FIG. 1;

FIG. 11 shows a diagrammatic view of example eccentricity of the reference pattern of FIG. 3;

FIG. 12 shows a diagrammatic view of the eccentricity of several printed spokes of the reference pattern of FIG. 11, causing timing shifts as the printed spokes pass under the head with the rotation of reference pattern;

In the drawings, like references refer to like elements.

DETAILED DESCRIPTION OF THE INVENTION

In one embodiment, the present invention provides servo reference patterns and a method of self-servo writing product servo patterns in disk drives using the servo reference patterns. The servo reference patterns are printed on a reference disk by e.g. magnetic printing, and in one example comprise magnetic segments having magnetic transitions wherein the direction of magnetization is generally along the circumferential direction of circular disk tracks. Spatial separation between proximately printed segments can be used to obtain timing information and position transducer heads over concentric circular disk tracks for self-servo-writing of servo patterns after disk drive assembly.

Figure 1:
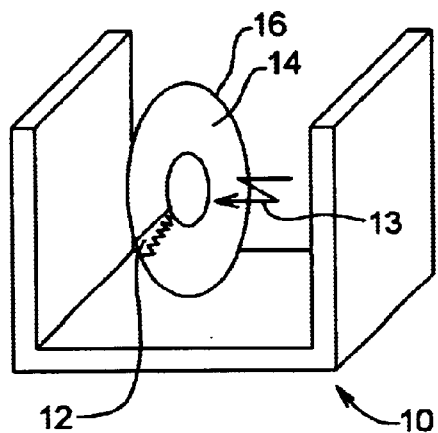
FIG. 1, shows a highly diagrammatic representation of an embodiment of a magnetic printing station for printing a reference disk storage surface with a servo reference pattern.

Accordingly, referring to FIG. 1, a magnetic printing station 10, magnetically prints or otherwise transfers a servo reference pattern 12 to one surface 14 of a magnetic disk 16, known as a reference disk. The magnetic printing station 10 can utilize one of several known magnetic transfer methods. One such method includes the steps of applying a unidirectional magnetic domain orientation to a blank storage disk, such as the surface 14 of the disk 16. Then, a reticle or magnetic die having the desired magnetic reference pattern is placed into close proximity with the storage surface 14 of the disk 16, and the disk 16 is heated to approach the Curie temperature of the storage media on the surface 14. The reference surface 14 is selectively remagnetized with the aid of a reverse bias field and e.g. localized heating in accordance with the reference pattern established by the reticle or die. In cases wherein an optical reticle is used, intense local heating through reticle apertures can be obtained from a laser beam, for example, in accordance with well understood magneto-optical principles in order to provide selective magnetization of domains of the reference-patterned surface 14 in accordance with the servo reference pattern 12. Care must be taken during the magnetic printing process not to damage or contaminate the disk 16. Preferably, although not necessarily, the magnetic printing process is carried out in a very clean environment within a disk manufacturing process.

Figure 2A:
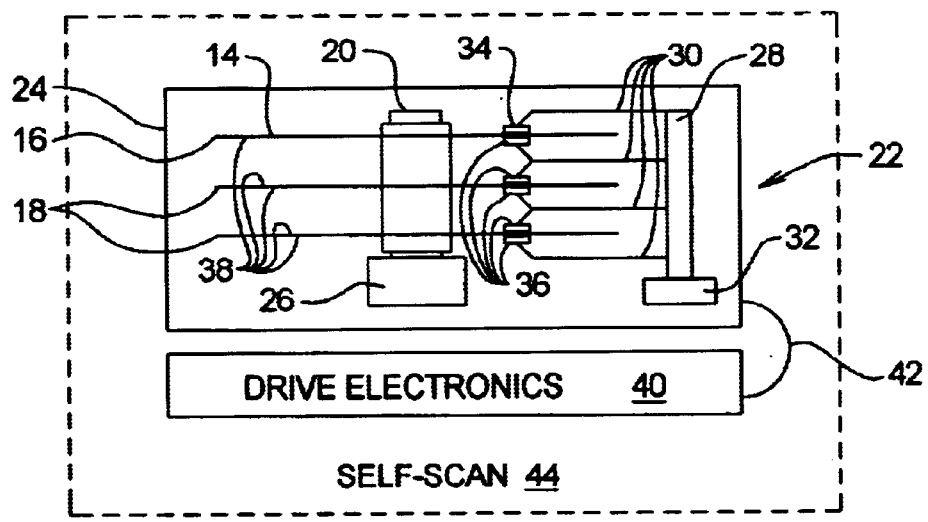
FIG. 2a shows a diagrammatic view of an embodiment of a hard disk drive comprising a head-disk assembly including a reference-patterned disk and several blank disks, and disk drive electronics, for self-servo-writing based on the reference pattern within a self-scan station within a manufacturing process.

Referring to FIG. 2a, after the servo reference pattern 12 has been applied to storage surface 14 of the printed disk 16, the disk 16, along with other blank disks 18 are assembled onto a spindle 20 of a disk drive 22. The spindle 20 is mounted within an enclosed head-disk assembly (HDA) 24, and is rotated at a predetermined angular velocity by a spindle motor 26. A comb-like head actuator structure 28 is included with the HDA 24, wherein the head actuator structure 28 includes head arms 30 rotated by e.g. a rotary voice coil motor 32 in order to position transducer heads 34 and 36, respectively, adjacent to the reference surface 14 of the disk 16 and blank surfaces 38 of the disks 16 and 18. After the disks 16, 18 and heads 34, 36 are installed, the HDA 24 is enclosed by a cover to prevent unwanted particulate contamination. A drive electronics module 40, such as a printed circuit board carrying large scale integrated circuits and other components, is mechanically attached to the HDA 24 and electrically connected thereto by a suitable interconnection 42, in order to complete the assembly of the disk drive 22. The disk drive 22 is then placed into a self-scan chamber 44 and connected to a suitable power supply, wherein a control and status collection computer (not shown) collects data concerning the disk drive 22 during self-scan procedures.

Figure 10:
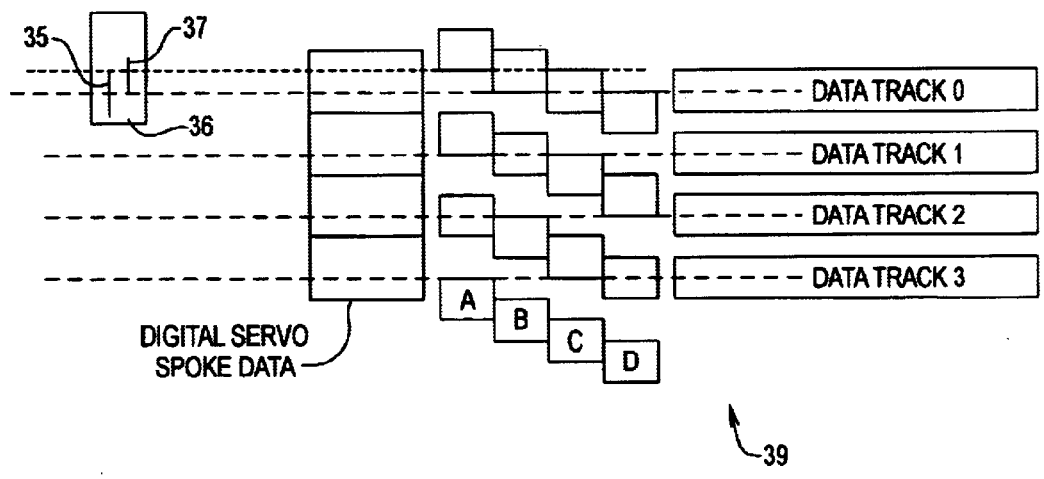
FIG. 10 shows a final servo pattern in a band of adjacent circumferential data tracks which has been self-written by the FIG. 2 assembled disk drive, based on the reference pattern printed at the FIG. 1 printing station, in accordance with principles of the present invention.

In one version of the present invention, the drive electronics 40 enables the head 34 to read the reference pattern 12, and in turn enables each head 34, 36 to write precise servo patterns on each storage surface 38 including the reference surface 14 in accordance with a final/product servo pattern features plan (e.g., servo plan pattern 39 shown in FIG. 10 and described further below). After all of the surfaces of the disks 16, 18 have been written with final servo patterns, the reference pattern 12 is overwritten, either in the self-scan station 44, or later with user data when the disk drive 22 is installed in a user computing environment for data storage and retrieval operations.

Figure 2B:
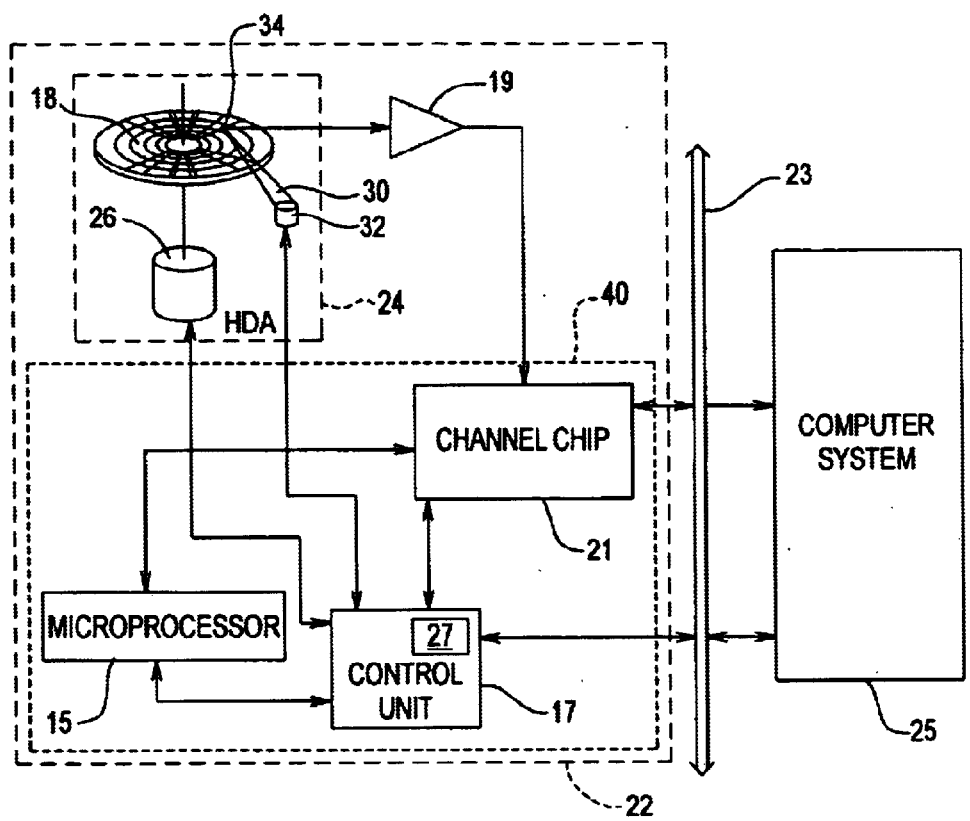
FIG. 2b shows a simplified diagram of the hard disk drive of FIG. 2a, including details of an embodiment of the drive electronics therein.

Referring to FIG. 2b, the disk drive 22 is shown connected to a computer system 25 via a bus 23. In one example, the computer system 25 can comprise the aforementioned status collection computer. The disk drive 22 includes the HDA 24 and the drive electronics 40. The HDA 24 comprises the spindle motor 26 for rotating at least one magnetic storage disk 18, and the actuator assembly 30 having the actuator motor 32 for positioning the transducer assembly 34/36 to read and write data from and to, respectively, the data storage disks 16, 18. The drive electronics 40 includes a microprocessor 15 typically concerned with servo control of the disk drive 22, a control unit or controller 17, including a control processor 27, primarily for controlling data flow communications with the computer system 25 via a system bus 23 and also controlling components of the disk drive 22, a preamplifier 19 amplifying signals read by the transducer assembly 34, and a channel chip 21 for processing data being transferred between the preamplifier 19, the computer system 25, the microprocessor 15 and the controller17. Alternatively, the microprocessor 15 can be a component of the controller 17.

Figure 2C:
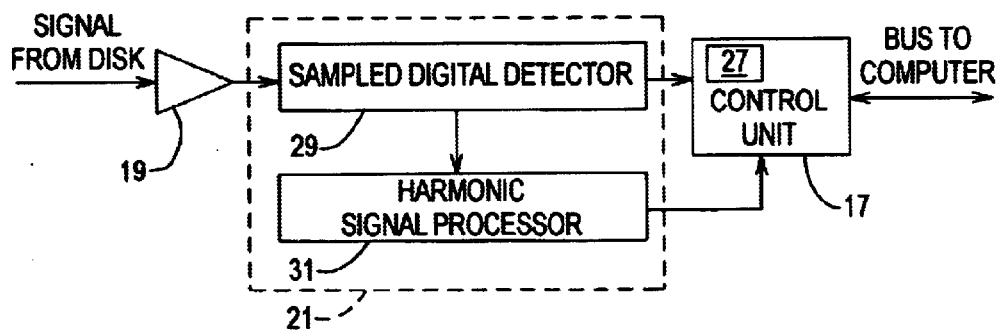
FIG. 2c shows a simplified block diagram of details of an embodiment of the channel chip in the drive electronics of FIG. 2b.

A simplified version of the channel chip 21 is shown in FIG. 2c. As shown, the channel chip 21 receives an amplified signal from the preamplifier 19. The channel chip 21 includes a sampling digital detector 29 coupled to the preamplifier 19 for digitally sampling the signal read from the disk 18. The sampling digital detector 29 employed in the channel chip 21 can be constructed to include a digital detector such as, for example, a Viterbi detector, a DFE (decision feedback equalizer), a PR4 (partial response mode 4), EPR4 (extended partial response mode 4), etc.

A harmonic signal processor 31 receives digital samples from the sampling digital detector 29. The harmonic signal processor 31 processes the digital samples to extract the spectral content (e.g., amplitude and phase of the harmonics) of the read signal. The channel chip 21 provides the measurements of the harmonic signal processor 31 to the microprocessor 15 which can be part of the controller 17. The microprocessor 15 can comprise an integrated circuit processor chip which has the capability of performing floating point arithmetic, integer mathematics, transforms, etc.

Figure 3:
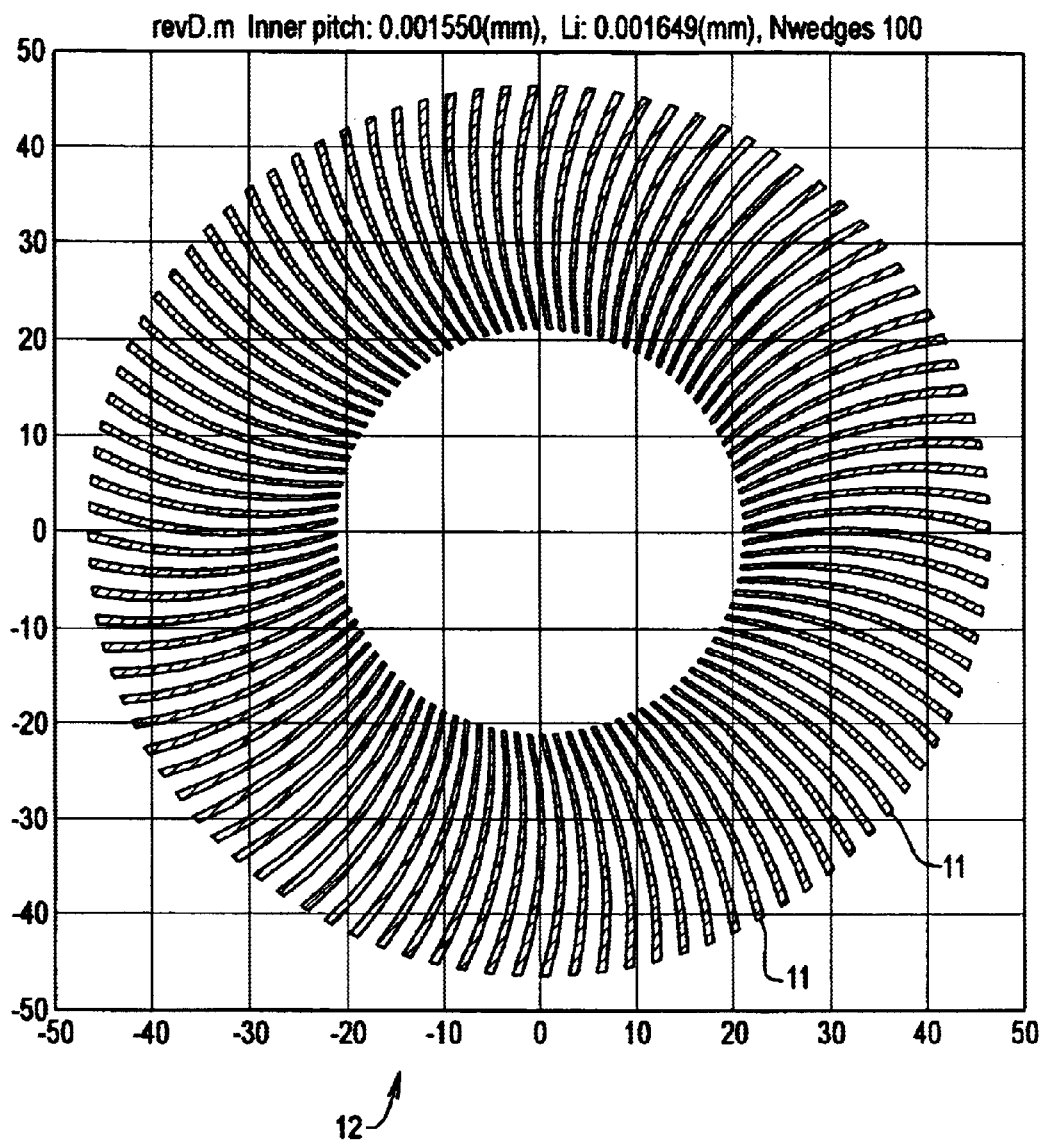
FIG. 3 shows a diagrammatic plan view of an embodiment of a servo reference pattern in accordance with aspects of the present invention transferred to a disk surface by the printing station of FIG. 1.

Referring to FIG. 3, a schematic example of the printed reference pattern 12 is shown. Magnetic printing is most effectively accomplished by magnetizing relatively long circumferentially magnetized regions or strips with the long dimension generally in the radial direction of the disk 16. Successive stripes in the circumferential direction are magnetized in opposite/transverse directions creating transitions. Fringing fields from these transitions provide a signal recovered during a read operation according to well known methods. The transitions at the long edges are relatively straight and can be read by a passing head 34 over the patterns during a readback process. The long edge transitions are generally transversely aligned to the travel path of the head 34 about a locus of a circumferential track. FIG. 3 illustrates an example printed reference pattern 12 comprising one hundred spokes (arcs) 11, each spoke 11 comprising servo information including servo timing information for providing relative circumferential position information for the head 34, and radial position information for the head 34. The example reference pattern 12 is shown in vertical/horizontal scale and is about 95 mm in diameter. Other features and diameters for the reference pattern 12 are possible based on the diameter of the disk 16.

Figure 4A:
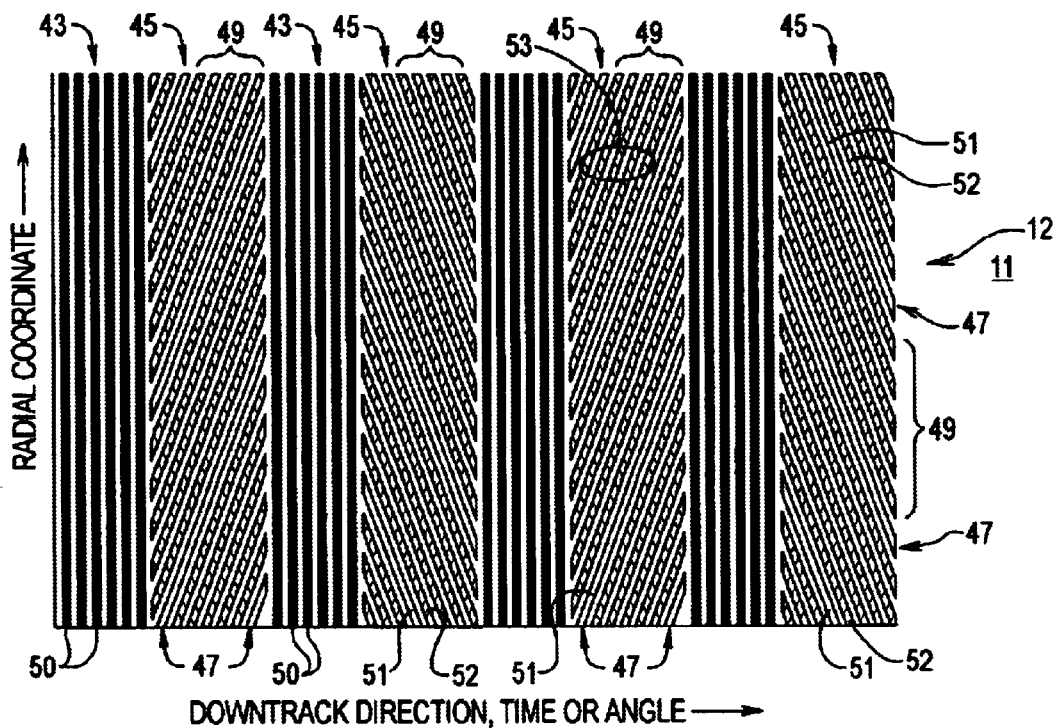
FIGS. 4A–B show enlarged schematic plan views of a portion of example reference patterns comprising servo information including servo timing information and servo position information with transverse patterns printed onto the reference-patterned disk at the printing station of FIG. 1.

FIG. 4A shows an enlarged schematic plan view of a section of a example spoke 11 (FIG. 3) including the servo timing information 43 described above, and servo position information 45. The servo timing information 43 includes a pattern of substantially radial isochronal timing segments 50. The servo position information 45 includes coarse position information 47 for providing transducer head coarse radial relative position information, and fine position information 49 for providing transducer head fine radial relative position information.

In one example, the coarse position information 47 comprises a coarse pattern of radially spaced slanted segments 51, and the fine position information 49 comprises a fine pattern of radially spaced slanted segments 52. The coarse slanted segments 51 are interspersed with the fine slanted segments 52. Sets of one or more of the timing segments 50 are separated by interspersed slanted segments 51 and 52. By slanting the segments 51, 52 relative to the timing segments 50, a repeating reference pattern 12 that provides relative coarse and fine radial position information is obtained. In this example, the slanted segments 51, 52 between sequential sets of one or more timing segments 50 are at different or opposite angles relative to the direction of an iscoshrone at that location (e.g., transverse). Though the segments 51, 52 are shown slanted, the segments 51, 52 can also be substantially radial.

Figure 4B:
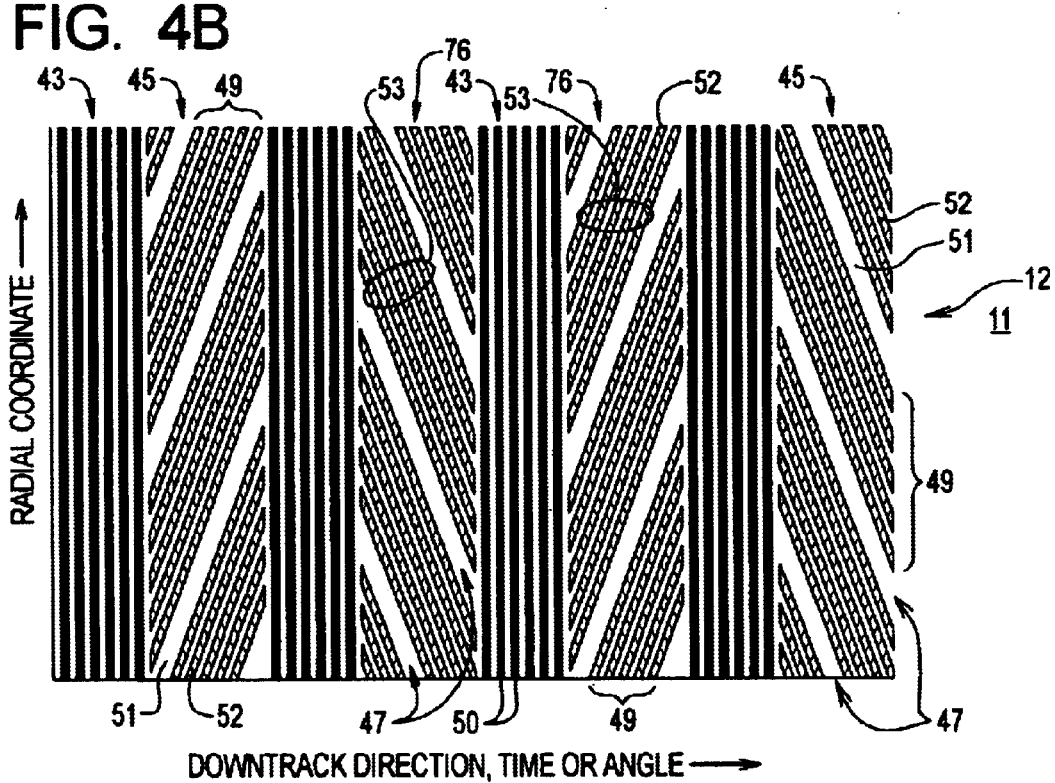

Referring to FIG. 4B, in another example, the coarse slanted segments 51 can comprise periodically suppressed slanted segments (shown as missing slanted segments) among the fine slanted segments 52. As such, the surface 14 of the disk 16 is printed with a repeating reference pattern 12 of substantially radial timing segments 50 separated by unsuppressed slanted segments 52 including periodically suppressed slanted segments 51. In this example, the slanted segments 51, 52 are sloped about 20 degrees in relation to the radial timing segments 50. Larger or smaller slopes can also be used. The suppressed slanted segments can be used for extracting coarse timing information.

Referring to FIGS. 4A–B, circumferentially adjacent slanted segments 51 can be radially displaced, such that a slanted segment 51 is radially partially-stepped relative to one or more other slanted segments 51. Similarly, circumferentially adjacent sets 53 of slanted segments 52 can be radially displaced, wherein one set 53 of slanted segments 52 is radially partially-stepped relative to another set 53 of slanted segments 52. The coarse slanted segments 51 can be of the same width as the fine slanted segments 52. Alternatively, the coarse slanted segments 51 can be of different width than the slanted fine segments 52.

The fine slanted segments 52 are preferably printed as a series of magnetic flux reversal patterns at a constant flux pitch or reversal frequency. FIG. 5A depicts a circumferential track path 60 across the reference pattern 12 passing under the head 34. In FIG. 5A, the head 34 is shown to include an inductive write element 35 and a magneto-resistive or giant magneto-resistive (GMR) read element 37 narrower than the write element 35. The head 34 passes by sets of timing segments 50, coarse (suppressed) segments 51 and fine slanted segments 52 as the track 60 moves past the head 34 during rotation of the reference disk 16 within the disk drive 22. In one example, length of segment 51 can be selected to be zero.

Relative radial position of the head 34 within a band defined by the extent of a slanted segment 52 (or suppressed segment 51) can be determined by measuring a differential time $\Delta t$ (phase difference) between passage of a group of one or more timing segments 50 by the head 34, and arrival of a group of one ore more slanted segments 52 (or suppressed segment 51) at the head 34. In one example, relative radial position of the head 34 within a band defined by the extent of a slanted segment 52 (or suppressed segment 51) can be determined by measuring a differential time between passage of a trailing edge 62 of the timing segment 50 by the head 34, and arrival of a leading edge 64 of the next slanted segment 52 (or suppressed segment 51) at the head 34 (shown as Δt in FIG. 5A).

FIG. 5B expands an example segment 50 depicted in FIG. 5A in order to illustrate other timing and position information which may be transferred by magnetic printing process. This information can include a fixed-frequency synchronization pattern 66 of circumferential flux reversals, a servo address mark 68, an index flux reversal 70 present in a predetermined one of the timing segments 50 to mark track beginning of the reference pattern 12, a wedge count field 72 which identifies each particular one of the sets of timing and slanted segments, and a band count field 74 which identifies the particular radial band of the adjacent slanted segments, e.g. chevron/segment 52. FIG. 5C depicts an example reticle or die pattern suitable for printing the fields 66, 68, 70, 72, and 74 of each timing segment 50. In another version, the fields 72 and 74 need not exist and are optional to the function of the self servo write.

In the above description, the differential time Δt can be used to determine the radial position of the head 34 relative to the reference pattern 12. Generally, other methods including phase detection of the timing segments 50 and slanted segments 51, 52 can provide further accurate detection of the radial position of the head 34.

Figure 6:
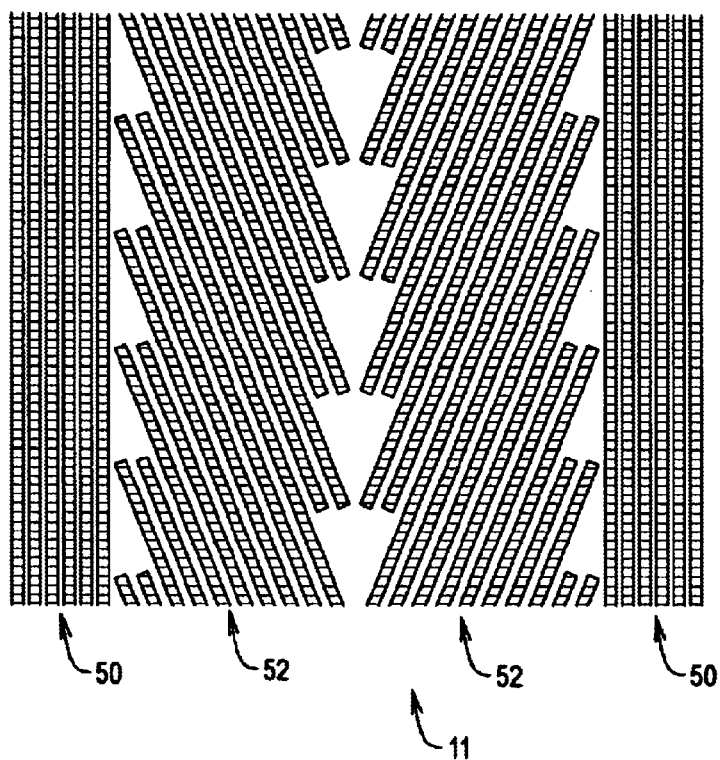
FIG. 6 shows enlarged schematic plan view of a portion of another example reference pattern comprising servo information including servo timing information and servo position information with transverse patterns printed onto the reference-patterned disk at the printing station of FIG. 1.

Referring to FIG. 6, in another version, the patterns in a spoke 11 do not include coarse timing segments. Instead, each pattern includes a digital field 50 (similar to timing segments 50) and two transverse slanted fields/segments 52 (similar to that in FIG. 4 but without isochronal fields) with approximately equal but opposite sign angles. Accurate positioning and timing information is obtained by using the difference and sum of phases measured from the slanted segments 52. The example pattern shows a Preamble burst 50 (for timing acquisition), Zig burst 52 and Zag burst 52, followed by a second timing field/segment 50. A final servo pattern is written after the final timing burst 50 (in another embodiment, a final timing burst is not required).

Figure 7:
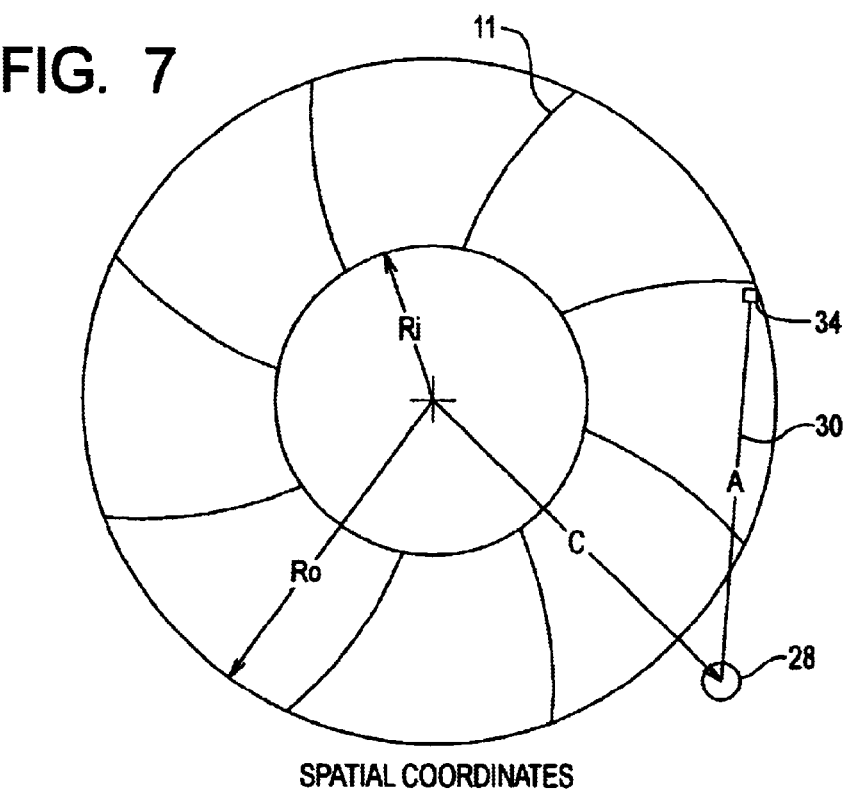
FIG. 7 illustrates spatial considerations and constraints of a printed reference pattern according to the present invention in relation to the architecture of the disk drive of FIG. 2.

FIG. 7 shows the generally arcuate radial path followed by the head 34 across the disk 16. The arc of the head 34 is a function of the length (A) of the head arm 30 and the distance (C) between the pivot point of the rotary actuator 28 and the rotational axis of the spindle 20 and the reference disk 16. The extent of arc is a function of the disk outer radius (Ro) and disk inner radius (Ri).

Because the reference pattern 12 is transferred by the printing station 10 to the surface 14 of the disk 16, the reference pattern 12 as printed may include a repeatable run-out (RRO) and/or timing non-uniformity (eccentricity) after the disk 16 is mounted on the spindle 20. The eccentricity can be large, corresponding to the radial shift of one or more fine slanted segments 52 under the head 34, and as such the coarse slanted segments 51 are utilized initially as coarse radial position information to determine large eccentricities of the pattern 12.

In one implementation, the actuator 28 moves the arm 30 to a crash stop at an outer diameter (or inner diameter) of the disk 16, to start measuring said eccentricity. At the crash stop, the actuator 28 is biased to urge the arm 30 against the crash stop to keep the head 34 in a stationary position relative to the crash stop. For example, referring to FIG. 8, as the disk 16 rotates, the reference pattern 12 passes under the head 34, defining a circumferential track 60 of the head 34 across the reference pattern 12. The head 34 moves substantially perpendicular relative to the timing segments 50, and substantially transverse relative to the slanted position segments 51, 52. As the reference pattern 12 passes under the 34, the eccentricity of the pattern 12 causes the slanted segments 51, 52 to shift radially in and out under the head 34. In particular, as the slanted segments 52 shift radially in an out under the head 34, the head 34 crosses the slanted segments 52 at different circumferential distances from the timing segments 50. Similarly, as the slanted segments 51 shift radially in an out under the head 34, the head 34 crosses the suppressed segments 51 at different circumferential distances from the timing segments 50. The changes in said circumferential distances provide timing variations to determine the change in radial displacement and therefore the eccentricity of the pattern 12.

In operation, when the disk 16 first starts rotating, the suppressed segments 51 are utilized to coarsely determine the radial position of the head 34 relative to the pattern 12. As the disk rotates under the head 34 at the crash stop, when a timing segment 50 passes under the head 34 a phase measurement (e.g., in the disk electronics 40) is obtained, and then phase of the slanted segment 51 passing under the head 34 is measured relative to the timing segment 50. As such, the phase shift (corresponding to an elapsed time Δt) between that timing segment 50 and a suppressed segment 51 passing under the head 34 is measured at the crash stop (in another example, a timing segment is not necessary, and instead a Gray data segment in the printed pattern is used as a phase reference). The phase reference can be either the burst phase of chevrons 52 for a lock & coast self-servowrite method, or Disk_Locked Clock for a synchronous self-servowrite method (SSW), described further below. For each particular radial position of the head 34 relative to the reference pattern 12, there is an expected (i.e. preselected) phase shift between a timing segment 50 and a suppressed segment 51 passing under the head 34 if there is no eccentricity. The measured phase shift is compared to the expected phase shift at the crash stop to provide a coarse measure of radial shift in the reference pattern 12 under the head 34 at the crash stop relative to that timing segment 50. There is an internal reference phase that is fit to the printed media and is maintained by the firmware. The phase shift is computed by the firmware and the channel to refine the firmware model. The process is repeated for each timing segment 50 to obtain coarse measurements of radial shift of slanted segments 51 in the reference pattern 12 for all the timing segments 50 in one revolution of the disk 16. Said coarse measurements of radial shift in the pattern 12 at the crash stop relative to each timing segment 50 is used during a servo-writing phase to position the heads 34 to account for large eccentricities and create concentric circles of final servo patterns.

Similarly, the slanted segments 52 are used to provide a measure of the radial shift of the reference pattern 12 of less than one slanted segment 52 under the head 34, thereby providing fine radial shift information. As the disk rotates under the head 34 at the crash stop, when a timing segment 50 passes under the head 34 a phase measurement (e.g., phase acquisition) is started, and then a second phase is measured when a slanted segment 52 passes under the head 34. The second phase measurement is obtained by computing the arctangent with the sine and cosine components of the slanted segments. As such, a phase shift (corresponding to the elapsed time Δt) between a timing segment 50 and a slanted segment 52 passing under the head 34 is measured at crash stop. For each particular radial position of the head 34 relative to the reference pattern 12, there is an expected (i.e. preselected) phase shift between a timing segment 50 and a slanted segment 52 to pass under the head 34 if there is no eccentricity. The measured phase shift time is compared to the expected phase shift to provide a fine measure of radial shift in the slanted segments 52 of the pattern 12 under the head 34 at the crash stop relative to that timing segment 50. The fine measurement of radial shift in the pattern 12 at the crash stop relative to each timing segment 50 is performed for all the timing segments 50 per revolution of the disk 16.

In the example spoke 11 shown in FIG. 6, there is no need for a coarse measurement (no suppressed segments 51), and all the measurements can be obtained from the slanted positioning fields/segments 52. The slanted segments 52 are used to provide a measure of the radial shift of the reference pattern 12 of less than one slanted segment 52 under the head 34, thereby providing fine radial shift information (also generally less than one track). As the disk rotates under the head 34 at the crash stop, when a timing segment passes 50 under the head 34 a phase measurement (e.g., phase acquisition) is obtained. A second phase is measured when a slanted segment 52 passes under the head 34 using a synchronous inverse tangent computation of the quadrature samples of the slanted timing segments. As such, a phase shift (corresponding to the elapsed time Δt) between a timing segment 50 and a slanted segment 52 passing under the head 34 is measured at crash stop. For each particular radial position of the head 34 relative to the reference pattern 12, there is an expected (i.e., preselected) phase shift between a timing segment 50 and a slanted segment 52 to pass under the head 34 if there is no eccentricity. The measured phase shift is compared to the expected phase shift to provide a fine measure of radial shift in the slanted segments 52 of the pattern 12 under the head 34 at the crash stop relative to that timing segment 50. The fine measurement of radial shift in the pattern 12 at the crash stop relative to each timing segment 50 is performed for all the timing segments 50 per revolution of the disk 16.

Measuring the radial shift in the slanted segments 52 passing under the head 34 provides an indication of the eccentricity of the reference pattern 12 on the disk 16. To reduce the effect of noise on the measurements, the eccentricity can be measured for ten to a hundred or more revolutions of the disk 16 under the head 34 at the crash stop position, and the measurements are averaged to reduce noise.

The eccentricity information is then utilized in the servo-writing process to eliminate the eccentricity in writing the final/product servo pattern 39 (FIG. 10) on disks 18. Specifically, in the servo-writing process, the coarse radial shift measurements are used in conjunction with the fine radial shift measurements per each timing segment 50 to steer the heads 36 to correct for the eccentricity at that timing segment 50 and generate concentric circular tracks on disks 18 when writing the final servo patterns. The coarse and fine radial shift measurements provide precise radial information relative to the timing segments 50 for accurately positioning the heads 36 to write the final concentric circles of servo patterns on the disks 16, 18. The disk drive electronics 40 comprises digital processing circuits including the channel chip 21 (FIGS. 2b–c), and routines for executing e.g. a discrete Fourier transform, described further below. (e.g., as described in U.S. Pat. No. 5,784,296, incorporated herein by reference) which can be used in an algorithm for correcting the RRO error from the reference disk pattern. For example, a technical paper by Hiroyuki Ono, titled "Architecture and Performance of the ESPER-2 Hard-Disk Drive Servo Writer", *IBM J. Res. Develop.* Vol. 37, No. 1, January 1993, pp. 3–11, describes a method of removing RRO in a disk drive servo writer.

FIG. 9A shows a greatly enlarged portion at the inner radius of another example of a spoke 11 of the reference pattern 12 of FIG. 3 printed onto the reference-patterned disk 16 at the printing station of FIG. 1. In this example, the servo position information 45 comprises the fine position information 49 including slanted segments 52 and the coarse position information 47 including the slanted (suppressed) segments 51, organized into two circumferentially adjacent groups 76 of transverse slanted segments 51, 52 between sets of one or more timing segments 50. Each group 76 includes multiple slanted segments 52 spaced by multiple suppressed segments 51 (as also shown by example in FIG. 4B). As discussed, in relation to FIG. 6, in one embodiment the suppressed segments 51 are not necessary, and position and timing information can be obtained from the segments 52. Therefore, the description herein is equally applicable to the reference pattern shown in FIGS. 4 and 6.

In FIG. 9A, the slanted segments 51, 52 in adjacent transverse groups 76 form a "Zig-Zag" pattern of slanted segments ("chevrons"). The slanted segments 52 are interspersed with the periodically suppressed slanted segments 51 such that the suppressed slanted segments 51 separate the slanted segments 52 which provide fine radial position information. The suppressed segments 51 in the two transverse groups 76 between each pair of timing segments 50 can be radially offset. Further, the angle between the transverse slanted segments 52 (and the transverse suppressed segments 51) can vary, or remain the same, from the center towards the periphery of the disk 16. For example, the angle between the transverse segments 52 (and 51) can increase from the center of the disk (e.g. about 20 degrees) towards the periphery of the disk 16 (e.g. about 40 degrees).

The transverse geometry of the segments 51, 52 provides very detailed relative radial and circumferential position information for the head 34 as discussed above. Said differential time Δt to each segment 51 or 52 from a timing segment 50 along a read track 60 of the head 34 provides radial position information. The differential times can be utilized to determine the radial position of the head 34 relative to the reference pattern 12. As aforementioned, in reference to FIG. 6, in another version of pattern 12, the position and timing information can also be obtained from the segments 52, without use of segments 51. Further, as described further below, internal Time Interval Analyzer/Processor 214 can be used to determine coarse radial position information as necessary. In that case, the transverse geometry of the segments 52 provides very detailed relative radial and circumferential position information for the head 34. Said differential time Δt to each segment 52 from a timing segment 50 along a read track 60 of the head 34 provides radial position information. The differential times can be utilized to determine the radial position of the head 34 relative to the reference pattern 12.

As the disk 16 rotates under the head 34, if the head 34 moves radially relative to the transverse segments 52, said differential time Δt to each slanted segment 52 changes, allowing detection of the direction of movement of the head 34 towards or away from the center of the disk 16. If the change in said differential times Δt indicates that the head 34 crossed over a pair of transverse slanted segments 52 at a radial position where the distance between the transverse slanted segments 52 has decreased from a similar measurement over a previous pair of transverse slanted segments 52, then the head 34 has moved radially inward relative towards the center of the disk 16 since that previous measurement. If said distance has increased, then the head 34 has moved radially outward from the center of the disk 16 since that previous measurement.

The above measurements can be made while keeping a record of the position of the head relative to the OD of the disk. This relative head position along with the eccentricity of the reference pattern 12 is used to sense absolute position of the heads 34 relative to the position of the heads over an ideal concentric track (as detailed above in relation to FIGS. 4–8), and the heads 36 can be steered using disk drive electronics 40 to remove said eccentricity or timing non-uniformity and write final servo patterns (e.g., product servo patterns 39) in concentric circular tracks on disks 18.

In versions where the suppressed segments 51 are not used or not provided in the spokes 11 (e.g., FIG. 6), the synchronous samples of the sine and cosine values of the slanted segments 52 are used to compute a phase e.g., theta=inversetan(sin(A)/cos(B)), wherein A and B are the quadrature samples of the slanted segments 52. That phase information is then used to compute the radial position of the head 34 by using the geometry of the slanted segments 52 as described herein.

In one example, the phase angle (i.e. phase difference) between each two pairs of oppositely/transverse slanted segments 52 (or oppositely inclined/transverse suppressed segments 51), as the head 34 crosses over them, provides a measure of the radial position of the head 34 and a measure of the radial movement of the head 34 relative to the reference pattern 12 from a previous measurement detailed above. A phase shift provides an indication of direction and amount of radial movement of the head 34. The phase angle changes as a function of the radial movement of the head 34, wherein: (i) the phase angle decreases if said distance between the transverse pair of slanted segments 52 decreases due to radially inward movement of the head 34, (ii) the phase angle increases if said distance between the transverse pair of slanted segments 52 increases due to radially outward movement of the head 34, and (iii) the phase angle remains the same if the head 34 does not move radially. As such, to remain at the same radial distance from the center of the disk 16, a constant phase angle should be maintained. Similarly, the phase angle between pairs of transverse/oppositely slanted suppressed segments 51 can be utilized to determine larger (e.g., greater than width of one slanted segment 52) radial movements of the head 34. As such, eccentricity of the reference pattern 12 can be measured, and the heads 36 can be steered using disk drive electronics to remove said eccentricity or timing non-uniformity and write final servo patterns 39 in concentric circular tracks.

Referring back to FIG. 9A, the segment of the pattern 12 shown is located near the inner radius of the disk 16, and includes progressively: a Preamble segment; a Servo Address Mark ("SAM"), Gray data segment; a first clock information 43 including timing segments 50, A Timing; a first pair of transverse groups 76, B Zig and C Zag, including suppressed and slanted segments 51, 52; a second timing segment 50, D Timing; and a second pair of transverse groups 76, E Zig and F Zag, including suppressed and slanted segments 51, 52. In this example, the periodicity of the suppressed segments 51 is such that there is a suppressed segment 51 per every nineteen slanted segments 52. Other periodicities for the slanted segments are also possible, and the suppressed segments 51 can be irregular, or non-existent (FIG. 6). The head 34 moves over the pattern 12 over a read track 60 substantially perpendicular to the timing stripes 50 from the Preamble segment towards the E Zig-F Zag transverse groups 76. The transverse slanted position segments 52 are slanted in opposite directions relative to the radius of the disk 16, and can include the suppressed segments 51 as described above. Use of two transverse groups 76 of segments 51, 52 in the example reference pattern 12 shown in FIG. 9A, provides radial position information across the angular slanted segments 52 and across the angular suppressed segment 51, and provides increased (e.g., doubled) sensitivity in detecting and measuring variation in radial position of the head 34 compared to the example reference pattern 12 shown in FIG. 5A. Further, the transverse groups 76 provide for correction of measurement errors due to variations in rotational speed of the disk 16 by canceling out timing errors in the spindle motor control.

A Fourier transform operation can be utilized to obtain the phase angles which represent the delay of each burst or group of segments designated by A Timing, B Zig, C Zag, etc. relative to a reference clock that is set in relation to the Preamble. Said phase angles provide position and timing information in the disk drive electronics 40 for writing the example final servo pattern 39 on disks 18 using heads 36. In another version (FIG. 6), segments D, E and F can be eliminated, wherein using the preamble (PRE) extracted phase and the phase of segments B and C, radial position information of the head 34 is obtained.

In FIG. 9A, in one example operation, the head 34 moves down the read track 60, progressively across the A Timing timing segment 50, and then over the B Zig and C Zag transverse groups 76. In crossing over the B Zig and C Zag transverse groups 76, the head 34 crosses over a first suppressed segment 51 in the B Zig group 76 and then a second suppressed segment 51 in the C Zag group 76 at an opposite angle relative to the first suppressed segment. As the head 34 crosses over the A timing segment 50, and the B Zig and C Zag transverse groups 76, the elapsed time from the A Timing timing segment 50 to each of the first and second suppressed segments 51 in the B Zig and C Zag groups 76 is measured, for example, by phase calculations from Fourier Transforms (such as described in U.S. Pat. No. 5,784,296, "Method and apparatus for spectral analysis in a disk recording system", B. Baker and J. Fitzpatrick, incorporated herein by reference). In another version in FIG. 6 where the timing burst/segment 50 is non-existent, the Gray data segment is used instead, wherein both timing and digital synchronous data information can be used to obtain timing information. As such, timing information can be obtained from either of the Preamble, Gray or A timing segments in each spoke 11.

Said elapsed times provide two different delay time intervals from the A Timing timing segment 50 which are utilized to check and verify a change in the radial position of the head 34. As detailed above, for a particular radial position of the head 34 relative to the reference pattern 12, there are pre-selected expected timing and phase relationship between each suppressed segment 51 and an adjacent timing segment 50 such as the A Timing timing segment 50. Comparing the observed geometry of the segments 51 and 52 passing under the head 34, to that expected, in relation to a timing segment 50, the shift in radial position of the head 34 corresponding to that timing segment 50 can be determined. As the head 34 crosses over the pattern 12, the measured delay between crossing over a timing segment 50 and a suppressed segment 51 is converted into coarse radial position along the timing segment 50.

Figure 9B:
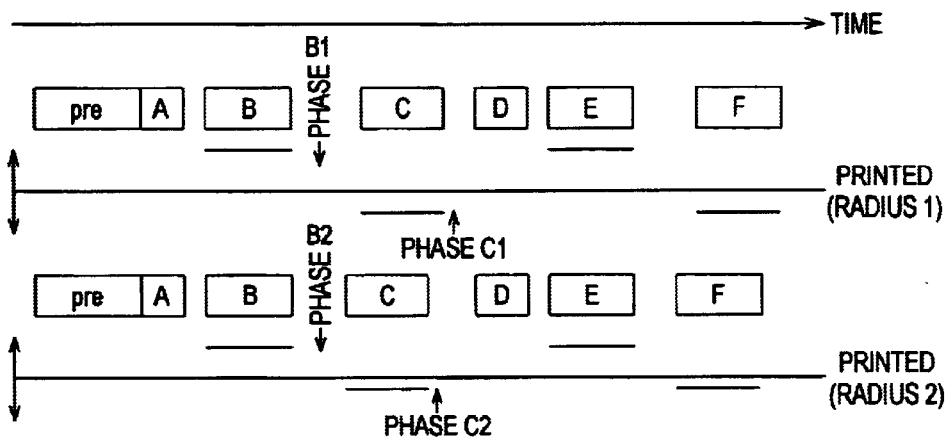
FIG. 9B shows phase measurement vs. time for the printed reference pattern shown of FIG. 9A.

FIG. 9B shows phase measurement vs. time for the pattern 12 shown in FIG. 9A, wherein the fields A, B, C, D, E and F in FIG. 9B are similar to those in FIG. 9A. The Printed Phase as shown for printed pattern 12 in Radius 1 is measured as Phase B1 and Phase C1. At Radius 2 the same chevron phases (Phase B2 and Phase C2) are measured and can be compared to the phase at Radius 1 to determine the relative radius change in the pattern 12 due to eccentricity. The phase arrows shown in FIG. 9B represent the phase observed at each point on two different radii. The individual radii are then compared to each other to determine the phase difference and hence the radial shift of the pattern 12 due to eccentricity.

In the example embodiment of FIG. 9A, the printed pattern 12 includes the servo address mark (SAM) in each spoke 11, wherein the SAM comprises a digital signature indicating the address of the printed spoke 11, along with other information which identifies the circumferential position and radial position of the head 34 relative to the disks. Alternatively, said circumferential and radial positions can also be obtained by dead-reckoning the position from a reference point (crash stop and index mark) and counting the spokes 11 (for head circumferential position) and chevrons 52 (for head radial position) using a staggered set of chevrons 52, to determine when to begin writing product patterns in relation to the spokes 11. The printed pattern 12 may or may not include track information (generally Gray data includes track information), and as such the spokes 11 in the printed pattern 12 may or may not include Gray data therein. Instead, the printed pattern 12 may include a single index mark that indicates the beginning of a disk revolution, wherein the spokes 11 are counted from there to determine where the head 34 is in a circumferential track.

FIG. 11 shows example eccentricity of the reference pattern 12 including low frequency printed media pattern spokes 11 comprising said segments/chevrons 52, relative to the axis of rotation of the disk 16. Displacement of pattern 12 due to eccentricity (disk center 80 is offset from printed pattern/media center 82) as the disk 16 rotates is shown in relation to the Track Path 60 of the head 34. Location of maximum positive radial displacement and maximum negative radial displacement, at top and bottom of FIG. 11, respectively, indicate largest spoke-to-spoke timing difference. Further, maximum timing displacement is at the right of FIG. 11, indicating largest phase change in the chevrons 52.

In the example of FIG. 11, the printed spokes 11 occupy about 33% of each track. Eccentricity is shown exaggerated to illustrate how timing shifts and radial displacements are both sinusoidal and occur 90 degrees apart. In this example, the values for the three sources of eccentricity are: (1) misalignment of master to printed disk contributes up to 0.01 mm, (2) disk hub clearance up to 0.07 mm, and (3) spindle runout about 0.008 mm. To simplify, it is assumed that said eccentricities combine to a single eccentricity of 0.09 mm.

In an example pattern 12 comprising 148 pattern spokes 11 (i.e., num_spokes=148), at an Inner Diameter (ID) of 21 mm the spokes 11 are pitched 0.87 mm apart. If the printed spokes 11 use 33% of the reference surface 14, then ID spokes 11 are 0.29 mm long. An eccentricity of 0.09 mm displaces 0.29 mm spokes by +/−0.09 mm to 0.38 mm. From 0.87 mm ID spoke pitch, 0.49 mm (i.e., 56%) remains for writing final/product wedges interlaced with the printed pattern spokes 11. In one example, the following values are utilized:

(1) Peak timing excursion is 31% of an ID spoke pitch and 10.2% of a sector (shown at left right of FIG. 11),
(2) Worst timing deviation for an ID SAM to SAM is about 0.65% of a sector, and
(3) Timing eccentricity is about half at the OD tracks.

As shown in FIG. 12, the eccentricity of the pattern 12 causes timing shifts as the printed spokes 11 of the pattern 12 on disk 16 pass under the head 34 with the rotation of disk 16. The diagonal path 84 across the spokes 11 is due to pattern eccentricity, and is elongated with respect to the nominal/ideal path 86 of an ideal pattern 12 with no eccentricity. The diagonal path 84 demonstrates the increase in the time between printed spokes passing under the head 34, and an effective decrease in the spoke pitch.

Figure 13:
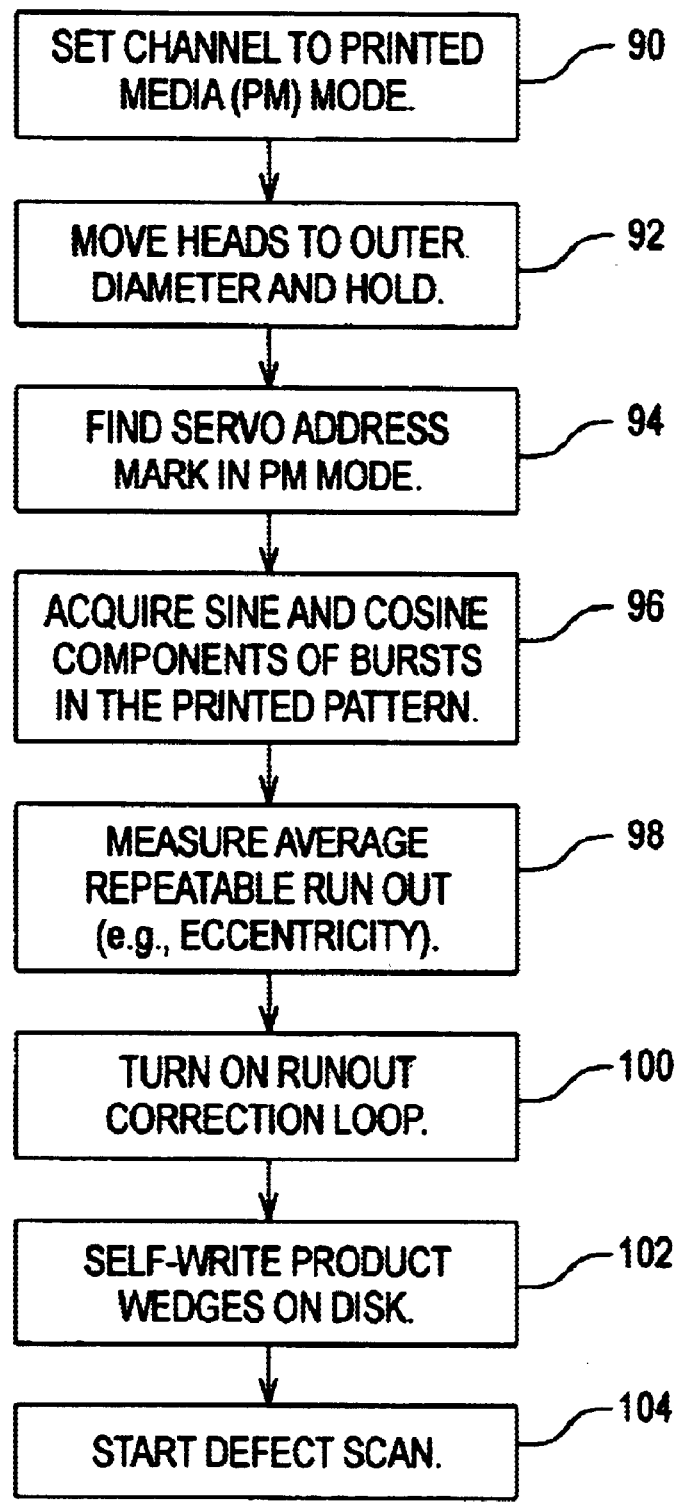
FIG. 13 shows an example flow diagram of an embodiment of the steps of a self-servo write process according to the present invention.

FIG. 13 shows an example flow diagram of an embodiment of the steps of a self-servo write process according to the present invention. The flow diagram represents the overall operation of the process by which the product servo wedges are written to the blank areas of disks in the disk drive 22.

After the disk drive is assembled, and the disk drive is plugged into a power rack that includes e.g. SCSI/ATA control, the controller 17 is signaled to place the disk drive electronics 40 in Printed Media (PM) mode for self-servo writing (step 90). Then the heads 34, 36 are moved to the outer diameter of the disks 16, 18, and held there (step 92). The Servo Address Mark on the pattern 12 is found, by steps comprising performing a SYNC up operation including filtering of the readback signal waveform to shape the signal in the channel 21, wherein different sampling method can be used to ensure finding the SAM in the right location (e.g., SAM can be found in each spoke 11, wherein a timer is set to create a time window in which to detect a SAM, wherein upon detecting the SAM, the content of the SAM field is read and used (step 94). One example of the information in the SAM is the quality measurement field, wherein if the quality is lower than a threshold, finding SAM is started over again). The sine and cosine measurements of the bursts (chevrons 52) in the pattern 12 are acquired (step 96) and average repeatable run out (eccentricity) of the pattern 12 is measured (step 98), as described above.

A runout (eccentricity) correction loop (outer loop) in a synchronous data detection circuit system (e.g., system 200 FIG. 15) is started, wherein the measured eccentricity of the pattern 12 is used as phase error in the correction loop to modulate a synthesized clock to correct for the eccentricity of the pattern 12 and generate a stable phase coherent write clock for writing product servo wedges (step 100). As such, the system 200 initially runs open loop to determine eccentricity of the pattern 12, and the eccentricity measurement is used as phase error information to generate feedback information for both position compensation and timing compensation, thereby closing the outer control loop and writing the product servo wedges 39 (step 102). Writing the product servo wedges include writing a portion of next track (i.e., writing product servo pattern on the track), stepping the head off-track towards the ID, and reprogramming the product wedge to be written, and repeating until all tracks are written with fine product servo wedges relative to the coarse printed pattern 12. As the product spokes 39 are written, the first section of the first track is written while a portion of the next section is written. The remaining portion of the next track is written when the heads 34, 36 are positioned over that track. After self-servo writing, a defect scan test is performed on disk drive 22 to detect defects such as in the product servo wedges (step 104).

Figure 14:
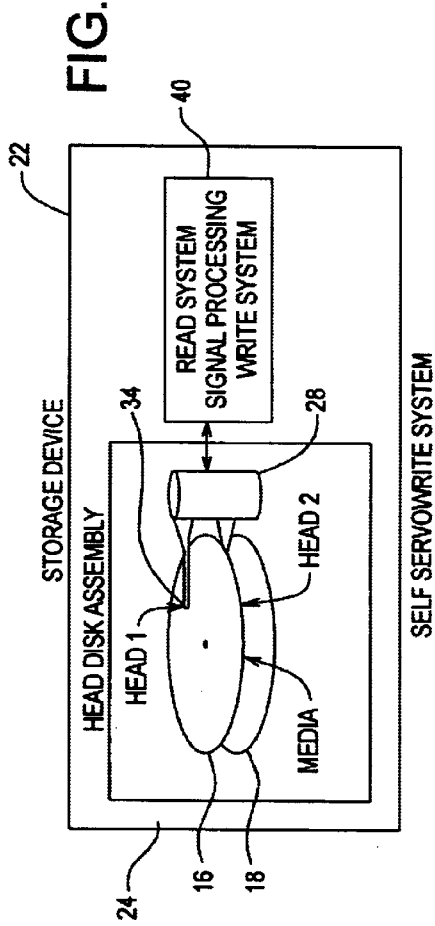
FIG. 14 shows an example block diagram of the disk drive of FIG. 2a, configured as a self-servo write system.

Referring to FIG. 14, the disk drive 22 of FIG. 2 is configured as a self-servo write system. As such, the overall system of the self servowrite scheme according to an embodiment of the present invention includes the disk 16 including the reference pattern 12, the HDA 24 and signal processing electronics 40. The entire servo writing system is contained within the disk drive 22 itself. The servo writing system includes the disk 16 with a preformatted pattern 12 on at least one surface 14, the HDA 24 with one or more head/disk combinations and the signal processing electronics 40.

Figure 15:
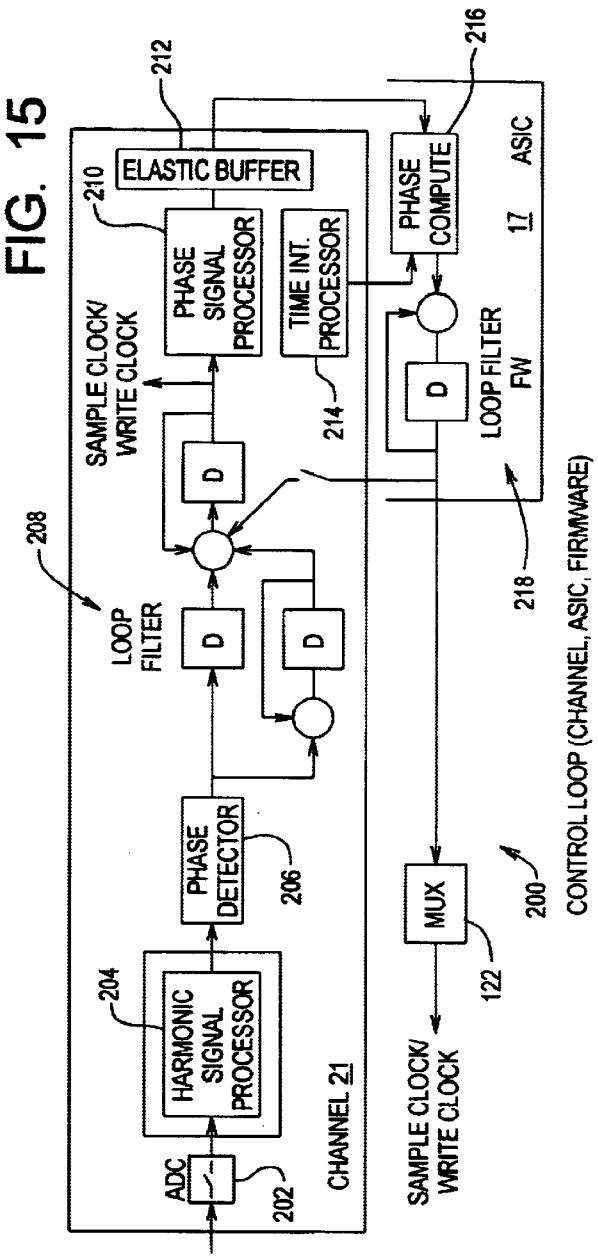
FIG. 15 shows an example block diagram of an embodiment of a control system in the disk drive electronics of the disk drive of FIG. 14.

In one implementation, shown in FIG. 15, the present invention utilizes an architecture for the read and write sections of read/write channel 21 and drive controller 17 of the drive electronics 40 of the disk drive 22, allowing extraction of embedded servo reference timing from the printed reference pattern 12 on disk 16 and a technique to replicate that timing onto the surface of the embedded product servo format in self-servo writing. According to one example preferred method and system according to the present invention, a phase extraction process extracts pattern phase information from the reference pattern 12, and a phase modulation process eliminates any mechanical runout (e.g., reference pattern eccentricity) due to standard assembly, using a combination of hardware and software signal processing techniques. The entire system structure can be contained within the disk drive channel 21 and drive controller 17 and requires no external devices or process steps during the disk drive manufacturing process.

Figure 18:
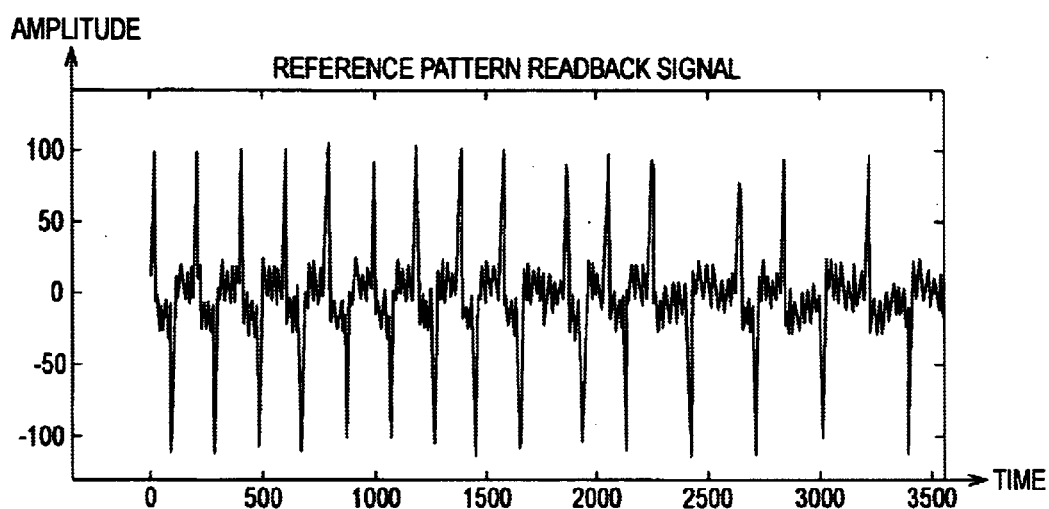
FIG. 18 shows an example waveform of the readback signal from an embodiment of a printed reference pattern according to the present invention.

Generally, the patterned disk 16 is manufactured in such a way that the normal read recovery process in conventional disk drives is unusable due to the extremely low bit density of the pattern 12 which is outside the range of parameters of conventional disk drive electronics. The format of the readback signal from the reference pattern 12 by the head 34 is shown in the diagram of FIG. 18 which compares to the format of the standard data readback signal in FIG. 19. In the example FIG. 18 the time scale (horizontal) is scaled such that the indicia 3500 corresponds to 18 microsec., and in the example FIG. 19 the time scale (horizontal) is scaled so that the indicia 4000 corresponds to 3 microsec.

In the example embodiment of the present invention describe herein, the analog readback signal from the pattern 12 includes embedded servo information (e.g., digital information including Preamble, SAM, Gray codes, etc.), wherein the recovered analog readback signal is sampled and then processed to obtain said embedded servo information and a signal representing a fundamental frequency of the readback signal (for frequency locking). The recovered signal includes embedded servo information wherein the fundamental frequency signal is a part of the embedded information. The recovered samples represent a signal waveform that has a fundamental frequency of the sampled signal, and the recovered samples also represent the recovered embedded servo data. Said processing includes equalization, attenuation and/or amplification of the readback signal. Said embedded servo information, and fundamental frequency in the readback signal are extracted at different times. For example, the fundamental frequency signal is amplified by 6 dB, and relative to fundamental frequency one or more of the upper harmonics (e.g., 3rd harmonics) are attenuated. The signal is further equalized by processing in a 1-D filter and differentiator having e.g. a J-omega transfer function.

The sampled data is further down-sampled (e.g., using a downsampler and differentiator) to recover a servo signal from read signal (e.g., using a 1-D filter in the downsampled frequency domain) in the outer loop (part of the decimation filter). As such, based on a down sampling rate of 1-to-N, one of N samples are used and differentiated to obtain said servo signal for self-servo writing. A data detector (e.g., phase detector and data detector), which is part of a typical channel, is used, and the system clock is over sampled by an integer number representing the ratio of the resolution (pitch) of the final servo pattern and the reference pattern. As such, the disk drive electronics 40 used for normal servo and data read/write operation is utilized, without the need for a separate complex detector. Oversmapling the system clock is accomplished by clocking the ADC 202 faster then the data rate—the internal sampler runs at high speed but it does not use every value (e.g., used 1 of 8, or 1 of 10, etc. samples).

Figure 19:
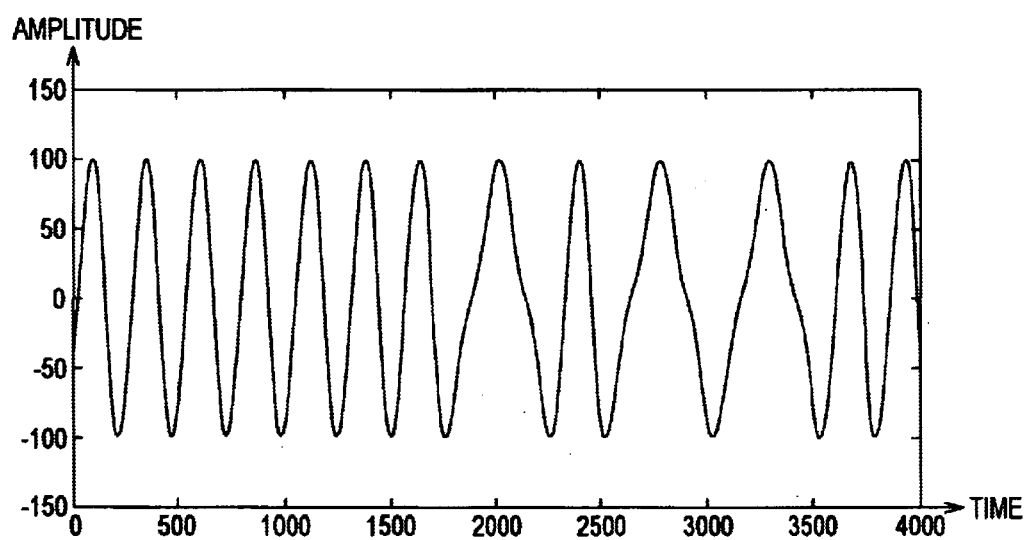
FIG. 19 shows an example waveform of the readback signal from a standard disk storing data.

Accordingly, in one embodiment of the present invention, the fundamental harmonic of the readback signal in FIG. 18 from the low resolution/frequency pattern 12 is extracted, and shaped to generate a recovered signal in such a way that the recovered signal approximates the standard readback signal in FIG. 19. The recovered signal is then processed in the standard signal processing portion of the disk drive channel 21, wherein information is recovered from the recovered signal, corresponding to the printed pattern 12, as though it were actual full speed (high resolution/frequency) information during normal read operation from a standard readback signal.

As shown in FIG. 18, the readback signal from the pattern 12 includes a large portion of high order harmonics which preclude the standard synchronous phase detection technique used for most disk drive read/write. channels. As such, referring back to FIG. 15, according to an embodiment of the present invention, the drive electronics 40 of the disk drive 22 include the control system 200 comprising a phase timing process loop in the channel 21 and a phase modulation process loop in the controller 17 to recover the printed pattern phase information described above. The control system 200 is a higher level system than existing servoing and read/write electronics, and is deactivated during normal user operation when the disk drive is used for normal customer use, without self servo write operations. As such, the control system 200 has no impact on normal high speed operation and critical timing path requirements of the disk drive electronics 40.

Servowriting is accomplished by the use of the pattern 12 readback waveform/signal from which the printed pattern phase and radial position information of the head 34 is extracted using the methods described in herein. In addition, a coherent write waveform which is generated e.g. by a de-skewed internal channel time-base, is used to format (i.e., servowrite) the reference disk 16 and any other blank disks 18 in the disk drive with product servo patterns.

In the example of FIG. 15, the control system 200 for phase control and time signal processing comprises the channel 21 and the controller (FW/ASIC) 17. The channel 21 comprises an analog to digital converter (ADC or A/D) 202, a harmonic signal processor (HSP) 204 (e.g., harmonic signal processor 31 in FIG. 2c), a phase detector (PD) 206, inner loop filter 208, phase signal processor (PSP) 210, elastic buffer 212 and time interval processor/analyzer (TIP or TIA) 214. The controller 17 comprises a phase compute (PC) circuit 216 and an outer loop filter 218. The outer loop filter 218 includes an integrator implemented in software and a loop gain factor optimized to remove the sinusoidal pattern eccentricity of the manufacturing printing process and manufacturing disk misregistration (in FIG. 15, in the inner and outer loop filters 208, 218, respectively, D represents a delay register). As described further below in relation to FIGS. 16–17, the control system 200 provides two control loops for phase extraction: (1) the first control loop 207 (inner loop or phase timing loop) for the high speed bit level phase extraction/acquisition, and (2) the second control loop 217 (outer loop or phase modulation loop) for removing manufacturing and mechanical phase variations such as the disk misregistration and eccentricity of the reference pattern 12.

One purpose of the phase extraction is to develop a high speed phase coherent clock (Write Clock or Disk_Locked Clock) that can be used to write fine pitch disk drive servo wedges (e.g., product servo pattern or wedges 39 in FIG. 10) using the relative coarse pitch of the printed pattern 12. In one example version, it has been determined that the ratio of 8 to 1 is optimum for the relationship between the product servo pitch 39 and patterned servo pitch 12, respectively (Other ratios are possible and contemplated by the present invention). In that case, for processing the reference pattern readback signal, instead of running the channel 21 at full speed, the channel 21 is effectively shut down every e.g. 7 clocks, and turned back on e.g. every 8th clock, described further below. This technique requires minimal change in the standard signal processing of the channel 21.

In the self-servo write process, first using the aforementioned example methodology, the eccentricity of the reference pattern 12 is measured. Thereafter, the drive electronics 40 uses timing and position information in the printed pattern 12 to maintain the head 34 in concentric circles (e.g., using timing segments 50 and/or chevrons 52 in the spokes 11 of the pattern 12, and the measured eccentricity information). At the same time, while the pattern 12 rotates under the head 34, in a phase locked timing loop, within the inner loop 207, the timing information in the spokes 11 of the pattern 12 is used to generate a Sample Clock (i.e., Disk_Locked Clock) for digital sampling of the Preamble and chevrons 52 in the spokes 11 of the pattern 12. The sampled values are used: (1) in the inner control loop 207 to correctly detect and decode embedded servo address mark and track number information, (2a) in the outer control loop 217 to obtain timing information whereby the head radial position is determined, and 2(b) to obtain a phase difference between a Write Clock (i.e., a reference clock, RW Synth, synthesized in the channel 21 for writing product servo wedges), and the Sample Clock, whereby it can be determined when to start and stop writing the product servo wedges/information between each pair of consecutive printed pattern spokes 11 on disk 16 by generating the write clock to be in-phase (coherent) with the Disk_Locked Clock.

For self-servo writing, the servo data phase-lock loop is utilized in the inner loop 207 for timing recovery with modifications to process the readback waveform from the pattern 12. The modifications have no impact on the normal performance of the channel 21 or the controller circuit 17 during standard user operation. This allows using the channel 21 and the controller 17 both: (1) for reading the reference pattern 12 for removing pattern eccentricity and self-servowriting of product servo wedges, and (2) for normal servoing and read/write operations for user data. For normal disk drive operation, when the channel 21 is not used to read/write user data, the channel 21 is used to read product servo information and user data from the disks, wherein analog servo data is digitally sampled, and using e.g. DFT burst phase values in the servo data 39 (FIG. 10) are determined in the channel 21. The burst phase values are provided to a servo processor in the disk electronics 40 or in the controller 17 to generate a position error signal (PES) to control the actuator for proper positioning of the transducer heads 36. During normal operation the outer loop 217 is not used for servoing.

The circuits and methods for extracting the pattern wedge/spoke phase of the pattern 12 and to generate a coherent product wedge phase, are now described.

In order to use the same signal processing logic (i.e., channel 21 and controller 17) in the drive electronics 40 to recover phase information for self-servo writing and for normal user operations, the incoming readback head signal for the pattern 12 is digitized in the ADC 202, and the harmonic signal processor 204 extracts the harmonic content of the read waveform from the digitized readback signal, prior to the digital phase detector 206.

Figure 20:
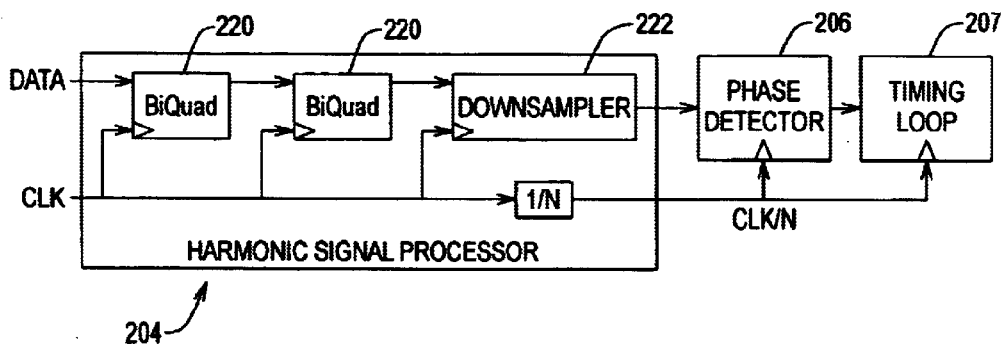
FIG. 20 shows an example block diagram of a harmonic signal processor in the control system of FIG. 15, for attenuating one or more harmonics of the reference pattern readback signal.

Referring to FIG. 20, in one embodiment, the harmonic signal processor (HSP) 204 includes at least one lowpass filter 220 (e.g. biquad) and a downsampler 222 (e.g., 1-to-N downsampler, wherein e.g., N=8), for generating synchronous samples representing the readback signal of the pattern 12. The HSP 204 is used in conjunction with the corresponding Phase Detector 206 (e.g., zero-crossing detection system) for extracting the fundamental frequency of the readback waveform of pattern 12, by equalizing and attenuating certain harmonics of the read waveform using the lowpass digital filter 220. In one example, the frequency cut off of the lowpass filter 220 is at the fundamental frequency of the readback waveform of the pattern 12, the Nyquist to the fundamental frequency ratio is 4 to 1, and a sampling frequency is 8 to 1. The range of values for N can be e.g., 2, 4, 8, 10, 12, 16 . . . with 8 being optimum (other values for N are also possible). If the downsampling frequency ratio is higher than 8, then the implementation of the lowpass filter 220 can be complex. If the down-sampling ratio is lower than 8, then the higher order harmonic signals are not strong enough to allow detection of a SYNC pattern in the Preamble waveform of spokes 11 in the pattern 12. In one version, the lowpass filter 220 is designed to run at high data rates and function without the use of multiplies and divides as described further below.

In the example FIG. 20, Sample Clock (SCLK or CLK) is clocking the ADC 202 and the HSP 204 at a sampling rate, and Sample Clock is divided by N (e.g. CLK/8) for clocking the phase detector 206 and the timing loop of the channel 21. CLK/8 clocks all the logic in the channel 21, wherein CLK is controlled from the inner timing loop in the channel 21. The timing loop generates a high speed clock (Sample Clock) that oversamples the read waveform at the CLK sampling rate, but the timing loop itself is controlled by the rate of CLK/8, thereby allowing the normal backend signal processing of the servo loop to operate as if the channel 21 were reading a normal signal. This allows the added functionality of the self servo write process to interact with the normal spoke processing logic without any additional added complexity. A detailed example of the HSP 204 is described further below.

As such, in this example embodiment, the present invention provides a system and method for decoding low frequency embedded servo information in the reference pattern 12 using synchronous downsampled signal processing with integer relationship between product pattern sample rate and low frequency printed servo pattern rate. The integer relationship is a ratio of the pitch/resolution of the printed pattern 12 to that of the product pattern 39 (FIG. 10). Preferably, synchronous downsampling is used, and the ratio of the oversampled signal to the final signal (downsampled signal) is a factor of $2^n$, with n=3 being optimum such that the ratio of product pattern 39 pitch to printed pattern 12 pitch is 8, and the downsampling ratio of 8. The present invention is usefully applicable to a system in which the ratio of the resolution of the product pattern to the resolution of the printed pattern 12 is a non-integer value, wherein the system oversamples the low frequency printed pattern 12 to generate the read signal, and the read signal is then downsampled, such that the ratio of the sampling rate to the downsampling rate is said non-integer value. The present invention further provides a method and system for controlling a stable low frequency reference sampler (ADC) based on digital phase recovery of low frequency tones (bursts) in the reference pattern 12.

The inner loop phase detector (PD) 206 processes the synchronous samples from the harmonic signal processor, and samples the peaks and zeros of the Preamble waveform in each spoke 11 of the pattern 12, which under nominal conditions, is similar to a sine waveform. The phase detector 206 further detects the shoulders, non-peaks and zeros during the SAM field in each spoke 11. The results are then converted to a phase number by taking the difference of the even and odd samples, wherein the phase information is sent to the inner loop filter 208 for generating a Sample Clock phase error from the read waveform. The inner loop filter 208 provides a proportional and integral compensation scheme for converting the phase error into a compensation signal to a clock delay control. The inner loop provides a delay locked loop such that the phase delay of the ADC clock is modulated to minimize the phase error obtained at the output of the phase detector 206.

The Sample Clock signal drives the ADC 202 when the head 34 is over the spokes 11 of the pattern 12 (or product servo wedges in normal operation), and after the head 34 moves off a spoke 11 (e.g., in self-servo writing the product servo wedges are written in between the spokes 11). For writing the product servo wedges, a desired phase/clock (RW Synth) is synthesized (i.e., Write Clock). The Write Clock (R/W Clock) is close in phase to the Sample Clock, and is modulated by the outer loop 217, as controlled by the controller 17. Thus, effectively the Write Clock is modulated using the printed pattern 12 while writing the product servo wedges, and is a combination of the recovered clock in the printed pattern 12 via the time interval analyzer 214, and the synthesized clock (RW Synth) signal in the channel 21 as controlled by the outer loop of the controller (ASIC/Firmware) 17. The synthesized clock (RW Synth) is synthesized and contained in the channel 21, but it is controlled/modulated by the controller 17 to generate the Write Clock, as described further below.

Figure 16:
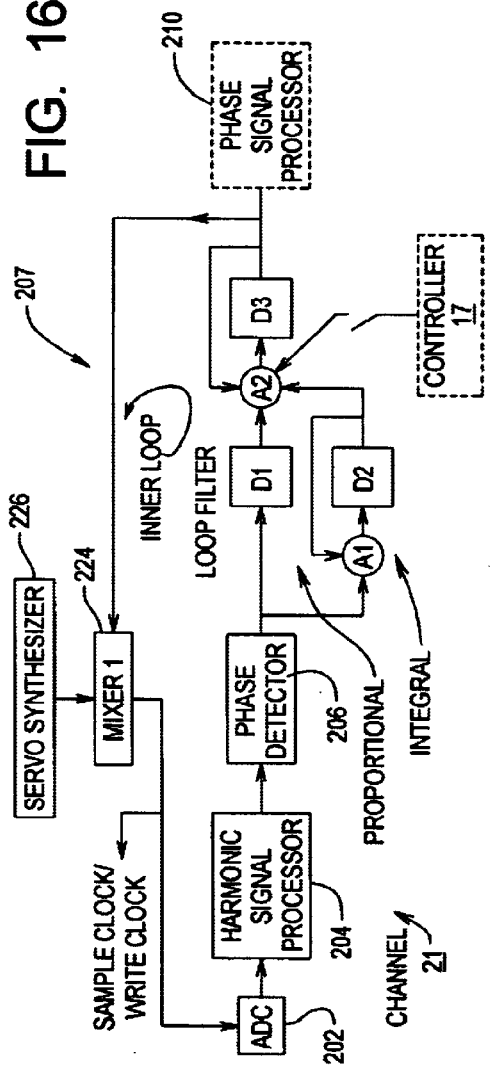
FIG. 16 shows an example block diagram of data and control flow in an inner timing loop in the control system of FIG. 15.

As described, the example diagram in FIG. 16 shows the functional architecture of the inner feedback loop 207. The inner loop filter 208 provides rapid phase error reduction during the beginning of the printed spoke 11 for self-servo writing (and the servo spoke 39 for normal read/write operations), by computing a compensation value that is fed to a Delay Control (e.g., Mixer1) 224 which modulates the ADC clock in a negative feedback fashion. The inner loop/compensation 208 filter includes proportional and integral terms as shown. The filter 208 includes two adders A1 and A2, and three integrator/delay registers D1, D2 and D3, as shown. The last integrator D3 converts the compensation value to a delay control value that modulates a synthesized clock (i.e., Servo Synth generated by a servo synthesizer 226 in the channel 21) via the delay control 222, generating the Sample Clock. As such, the inner loop 207 includes the ADC 202, the HSP 204, the PD 206, the inner loop filter 208, and the Mixer1 224. The PSP 210 is controlled by the SSW clock, wherein the SSW clock is set to the Disk_Locked clock during the period when the PSP is being used.

Figure 21:
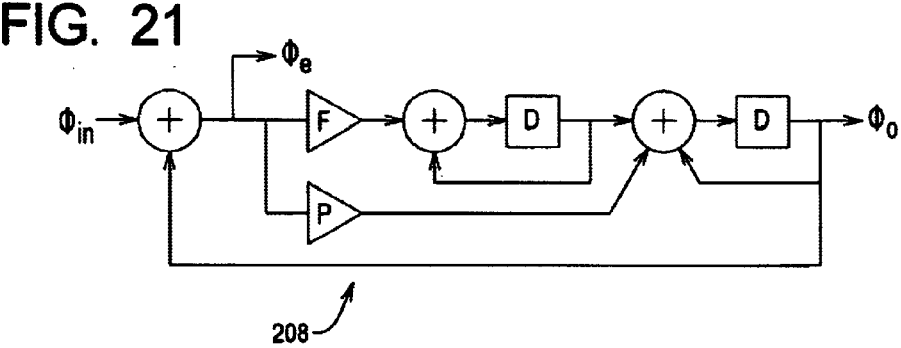
FIG. 21 shows an example block diagram of an of the inner loop filter in the inner timing/control loop of FIG. 15.

FIG. 21 shows an example functional diagram of the inner loop filter 208 including two delay registers D and three adders. Further, F represents a frequency gain term which is set through a serial port register, and P represents a phase gain term which is set through a serial port register. The transfer function of the inner loop filter 208 is described by the equations below.

$$\frac{\Phi_e}{\Phi_{in}} = \frac{[1 - 2D + D^2]}{[1 + (P-2)D + (1-P+F)D^2]}$$

$$\Phi_o = \Phi_{in} - \Phi_e$$

wherein, in the above equation Phi_in ($\Phi_{in}$) is the input from the detector 206, Phi_o ($\Phi_o$), represents the Sample Clock and input to the PSP 210, and Phi_e ($\Phi_e$) is a phase error. By properly setting F and P, the inner loop filter 208 is adjusted to settle on the correct phase in minimum settling time. In one example, settling time can obtain the correct phase (within 5% of the final value) within 190 Tcells when the frequency register, F, is set to zero. The step response of the system with a phase error of 100% shows the loop step response.

The pattern 12 readback waveform is sampled and the relevant phase information from the readback signal of pattern 12, is extracted therefrom using the harmonic signal processor 204. The phase information is filtered by the inner loop filter 208 to produce a correction signal that modulates the delay 224 for the servo synthesizer clock 226. The modulated clock manifests itself in the sampled signals which are then processed by the Phase Detector 206 to close the inner loop. The value of the gains in the integral and proportional loop filter 208 are adjusted to provide optimum acquisition speeds in the system. As such, the phase information from the inner control loop 207 is used to control a timing loop within the inner control loop 207 with enough precision to obtain the servo digital information and servo Gray coded data.

The inner loop phase information represents the difference between the Servo Synthesizer 226 and the phase of the printed pattern 12 during the Gray data field of each printed spoke 11. The inner loop phase information is used to control the timing loop which allows the controller 17 to find SAM in each spoke 11 of the printed pattern 12. Once SAM is found (SAM-found event) then timing measurements and sine/cosine number calculations using the Disk_Locked Clock can begin. Further, a counter that measures a time interval from the end of a SAM to slightly before the next SAM is started.

Figure 22:
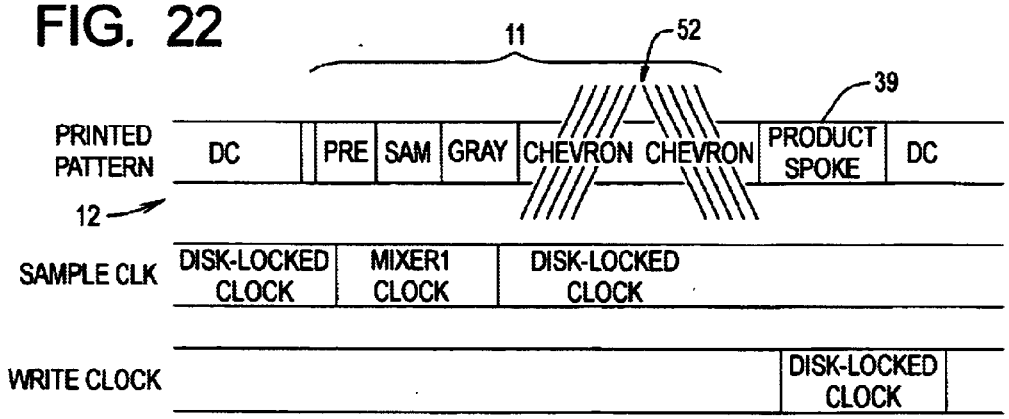
FIG. 22 shows an example schematic diagram of a portion of the printed reference pattern and corresponding clock signal for sampling different fields in the printed spokes.

The Sample Clock is coherent with the fundamental pattern (e.g., timing segments in spoke 11) in the Preamble section (PRE) of each spoke 11 (i.e., frequency of the fundamental pattern in the preamble section of each spoke 11). As such, as shown in FIG. 22, while the pattern 12 rotates under the head 34, in a timing loop within the inner loop 208, the timing information in the spokes 11 of the pattern 12 is used to generate the Sample Clock for digital sampling of the Preamble (PRE) and chevrons 52 in the spokes 11 of the pattern 12 (by extracting fundamental frequency in low-pass filter and downsampling) in each printed pattern spoke/wedge 11. The eccentricity of the printed pattern 12, relative to the disk surface, represents phase incoherence along a circular track. The Sample Clock multiplexes the clock signals generated by the inner and outer timing-loops. As such, the Sample Clock is the same as the ADC clock (i.e., the signal clocking the ADC 202 in FIG. 16), wherein the Sample Clock switches its source as the head 34 moves over the various fields of the disk 16. To sample the chevrons 52, the Sample Clock is generated at the outer timing-loop output (i.e., Disk_Locked Clock), and to sample the Preamble, SAM and Gray data, the Sample Clock is generated at the inner timing-loop output (e.g., Mixer1 224 output in FIG. 16). The Write Clock is only relevant when the product servo wedges are being written, and in that case the Write Clock becomes the same as Disk_Locked Clock.

Using the precise measurement of timing (e.g., by measuring the time interval between printed pattern SAMs precisely with a high-speed clock in the channel 21, and even more precisely by digital demodulation (DFT) of the chevrons 52), the synthesized clock (RW Synth) and the disk 16 are synchronized together to generate the Disk_Locked Clock for sampling the chevrons 52. This can be accomplished either by adjusting the motor torque or by adjusting the frequency of the synthesized clock (RW Synth), based on the measured timing relationship between the synthesized clock (RW Synth) and disk at each printed pattern SAM. As such, the Sample Clock (i.e., output of Mixer1 224), locked to the Preamble of spokes 11 in the printed pattern 12, is used only to sample SAM and the Gray data of the Preamble, and the Disk_Locked Clock, is used to sample the chevrons 52.

Referring back to FIG. 15, the phase signal processor (PSP) 210 computes said sine and cosine values of the pattern 12 readback samples (e.g., by Discrete Fourier Transform operation). The phase signal processor 210 computes the phase components needed for e.g. software based phase compute. The phase signal processor (PSP) 210 whose inputs are derived from the data detector 206, computes the even and odd samples of the printed pattern waveform samples, using a correlated detector that detects the sine and cosine values of the burst 52 signals (e.g., chevrons 52 in spokes 11 of the pattern 12). As such, the PSP 210 integrates the samples that represent the sine values and integrates the samples that represent the cosine values, averages those samples, and creates accurate sine and cosine numbers which are provided to the phase compute 216 in the controller 17 via the buffer 212.

In one example, the phase signal processor 210 comprises a correlation-based detector that depends on four expected chevron 52 samples per cycle where each cycle is a sinusoidal waveform. Thus each sample corresponds to the in-phase and quadrature samples (sine and cosine). These samples are each averaged to produce a sine and cosine signal that is passed to the buffer 212 for further processing in the Phase Compute 216 in the controller 17 to extract the phase of the printed pattern 12 via an inverse tangent (i.e., arctangent) function, described further below. Correlation of the data with a Discrete Fourier Transform (DFT) is obtained by observing that the samples of the sine component are obtained by an alternate-add algorithm on the odd terms, while correlation of the cosine components are obtained by an alternate-add algorithm on the even samples. Thus the samples are premultiplied by $\{0,1,0,-1 \ldots\}$ for the sine values and $\{1,0,-1,0, \ldots\}$ for the cosine values. The running sum is integrated into an accumulator at the beginning of the chevron field 52, then loaded to the controller 17 and cleared at the end of the chevron field 52.

In the controller 17, the Phase Compute 216 generates said phase of the printed pattern 12 for driving the outer timing loop 217, by computing the inverse tangent of the sine/cosine sample values, providing an accurate phase number. The components are obtained through data bus transaction whereby the sine and cosine values are dumped from the PSP 210 to the controller 17 which in turn computes the phase using e.g. a software algorithm. In one example, said phase number is calculated by relation below wherein the phase signal processor 210 computes the numerator and denominator of the arctangent argument while the phase compute 216 computes the arctangent function to extract the phase Phi (Φ):

$$\phi = \mathrm{atan}\left(\frac{X(n)\sin\left(2\pi \frac{n}{T_s} + \phi\right)}{(X(n)\cos\left(2\pi \frac{n}{T_s} + \phi\right)}\right)$$

wherein for the numerator, n=0, 2, 4, . . . , for even samples and for the denominator n=1, 3, 5, . . . , for odd samples. Further, Xs is the coefficient of the correlated sine value from the PSP 210 while Xc is the coefficient of the correlated cosine value, Ts is the SSW clock period and n is the sample value of the signal starting from the beginning of the chevron field 52. The phase compute 216 can use a lookup table with entries including the average sine and cosine values obtained from the phase signal processor 210 via the buffer 212. In general the value of the numerator and denominator are precomputed in the PSP 210 and the PC 216 performs the ARCTAN to obtain the phase.

As such, the head radial position information can be determined e.g. by the apriori knowledge of the format of the printed pattern 12, wherein given the measured phase of the chevrons 52 (computed in the Phase Compute 216 as Arctangent of even and odd Sine and Cosine of sample values) and the expected phase (given the track number and offset), a phase difference is determined and converted into a radial position error. The head circumferential position is determined by counting the number of spokes 11 after an index identifier per track, wherein the index identifier is determined by a special Gray code word which is embedded in the printed pattern 12.

The time interval measurement of the time interval analyzer 214 is input to the phase compute 216 (e.g., via a serial port in the controller 17), once per passage of each spoke 11 under the head 34, to determine the difference between the channel clock (Sample clock or Servo Synth) and the Disk_Locked Clock. The Time Interval Analyzer 214 is used to count the Disk Locked Clock samples with higher precision than that which is available to the controller 17.

In one example, a precise time interval measurement is obtained using the time interval processor 214 by sampling the Disk_Locked Clock with the clock generated by the inner control loop (Sample Clock). The time interval measurement is read by the controller 17 once per spoke 11 to determine the difference between the synthesized clock (RW Synth) of the channel 21 and the Disk_Locked Clock. The output of the Phase Compute 216 and Time Interval Processor/Analyzer 214 are fed to the outer loop filter 218, to control the phase of the synthesized clock (RW Synth) to generate the Write Clock to within the required precision for writing final servo patterns 39 interlaced with the spokes 11 of the printed pattern 12.

The time interval measurement of the timer interval analyzer 214 can be carried out by a counter in the channel 21, tied to the Disk_Locked Clock. Said counter is used to measure the spoke-to-spoke timing interval in the pattern 12 and is a "coarse" measurement of the disk speed variation. As such, in one version, for the time interval analyzer 214 function, the channel 21 includes e.g. a modulo 256 (8 bits) counter which provides a measure of time interval changes from one patterned spoke 11 to another. The modulo counter ticks at twice the rate of Disk_Locked Clock, it is reset only by hardware reset upon power-up, and it always rolls over. Each time a SAM is found in a spoke 11, the modulo counter's contents is stored into a read-only register inside the channel 21. The modulo counter is used to increase the time resolution available to the phase compute 216 in the controller 17. Because controller 17 necessarily runs with a clock that is N times slower than the internal clock of the channel 21, the controller 17 does not have enough precision to measure the interval at which time the channel 21 finds each address mark SAM in a spoke 11. Using the time interval analyzer 216, controller 17 obtains further information which is used to compute phase error.

In this embodiment, the motor may cause speed variations within the resolution of the time interval analyzer 214, which are removed by the Phase Signal Processor 210. In one example, the nominal phase resolution of a delay modulation control, such as the Mixer1 224 of FIG. 16 in the channel 17, is 1/64 (i.e., 64-step Mixer), wherein each phase step is not exactly nominal (1/64). The required phase step per bit is about 0.5/64 to 2/64 of a Tcell. As such, when the Mixer1 224 input is changed by 1 count, actual phase jump on the Disk_Locked Clock is not exactly 1/64. By using the combination of the low frequency counter in the controller 17 (SAM2SAM_count), the channel 21 time interval counter (i.e., Time Interval Analyzer 214) and the computed inverse tangent function in the Phase Compute 216, a precise time measurement is obtained overall. The controller 17 provides coarse resolution timing, the channel time interval analyzer 214 provides medium resolution timing, and the phase compute 216 provides fine timing, which, when combined provide a large range and fine resolution of the overall timing.

The outer control/timing loop includes a phase computation process in the phase compute 216 which uses said precise time interval measurements from the time interval processor 214 along with the Sine and Cosine of the phase of the Disk_Locked Clock samples burst value (i.e., chevrons 52) of a Discrete Fourier Transform (DFT) of the sampled values (i.e., phase information) from the phase signal processor 210, to control the phase of the synthesized clock (RW Synth) to within the required precision to generate the Write Clock. The Disk_Locked Clock drives the ADC as the Sample Clock, and the ADC takes samples of the chevrons 52, and outputs them to the PSP 210 to calculate sine and cosine of the samples (i.e., DFT of the chevrons 52) and provide to Phase Compute 216 to compute the inverse tangent of the sine and cosine values of the ADC samples that were driven by the Disk_Locked Clock.

In one example, said phase information represents the angular speed modulation of the printed pattern 12 on the disk 16 relative to the Disk_Locked Clock. With these features the disk drive 22 is able to servo on the given pattern 12 of the reference disk 16, and write an extremely precise production servo pattern interlaced with the spokes 11 of the pattern 12 (and on blank disks 18), wherein the product servo pattern 39 is devoid of the manufacturing induced errors described above.

The outer loop 217 includes the Phase Compute 216 and said outer loop filter 218, wherein the outer loop filter 218 including an integrator and adder whose gain values are set to control a proportional and integral feedback term to the Disk Lock Clock phase mixer (Mixer2 230) in the channel 21. The output of the Phase Compute 216 is fed to the outer loop filter 218, to control the phase of the synthesized clock (RW Synth) within the required precision to generate the Write Clock for writing final servo patterns 39 interlaced with the spokes 11 of the printed pattern 12, and to sample the chevrons 53 in a phase coherent manner. Under normal operation of the channel 21 for servoing (e.g., data read/write), a position error signal (PES) for the head is determined by the amplitude of the A, B, C and D bursts in the product pattern 39 servo wedges or a subset thereof. However, for self-servo writing, the phase computation for the chevrons 52 is accomplished by said inverse tangent technique in the PC 216 to determine head radial position. The measured phases of the chevrons 52 are also used in conjunction with time interval measurements of the time interval analyzer 214 for the outer loop phase computation. In this example, the time interval processor 214 uses a downsampled version of the Sample Clock (e.g., Sample Clock/32). The phase information from the phase signal processor 210 provides the radial position information and also the phase for the outer loop. The outer loop 217 adjusts the zero start phase location (initial phase estimate) of the ADC 202 and the FIR, to have zero runout per revolution.

As such, a phase lock is achieved at every spoke 11 to generate the Sample Clock in the inner loop 207. At the end of the Preamble, SAM and Gray fields in each spoke 11, the clock is switched to the Disk_Locked Clock and is used in the ADC 202 to sample the chevrons 52 (bursts) in spokes 11 of the pattern 12 as they pass under the head 34 (e.g., FIG. 22). The eccentricity of the mounting of the disk on the motor shaft and/or of pattern 12 can cause the frequency variation on a once around revolution. As the chevrons 52 pass under the head 34, a DFT process determines their phases, and said phases are input to the phase signal processor 210 which determines phase numbers for the Phase Compute 216 in the controller 17 to generate burst phase values. A curve fitting routine fits a e.g. a sine wave to the once around run out due to eccentricity. The measured chevron (burst) phases are used to adjust the outer loop phase to take out the once around runout eccentricity effect.

The outer loop filter 218 filters the resulting phase from the Phase Compute 216 (obtained by extraction from the coherent phase information) to provide highly precise frequency error information for modulating the synthesized clock (RW Synth) coherently from spoke 11 to spoke 11 and across adjacent tracks, to generate the Write Clock. The Write Clock (which is normally used for writing the user data on the disks) is traditionally reset at each servo-sector-address-mark (SAM), but remains coherent from track to track by means of the Disk Locked-Clock. The data write clock can be used to write the product servo wedges.

The motor RPM varies slightly relative to that Write clock. One effect of switching between the internal sample clock (i.e. Mixer1 224 output) and the Disk_Locked Clock (i.e., Mixer2 230 output) is that additional margin must be left before and after each block of separately-written data (i.e., product servo spoke), in order to insure that the ends of one block are not overwritten when the preceding or following block is written. Another effect is that attempts to write servo-patterns (for example, during self-servowrite operations) are challenged by degradation of timing coherence between one product servo wedge pattern and the corresponding product servo wedge pattern at the next radial position. This degradation of coherence is due to the fact that the product servo wedges are written in two or more subsequent passes of the head over adjacent tracks. The product servo wedges which are used during normal servo operation, exist inside the open areas of the printed pattern 12 (e.g., between spokes 11) such that they are concentric with the axis of the drive spindle. The final product wedges 39 are written into the region immediately following the final chevron 52 in each spoke 11 of the printed pattern 12, and are staggered in time from the master printed disk 16 to the secondary disk 18 surfaces in a manner that allows simultaneous self-servo writing of many storage surfaces in one rotation of the disk spindle (stagger write).

As shown in FIG. 22, when the head 34 is over each spoke 11 the output of Mixer1 224 is used as the Sample Clock for sampling the Preamble and SAM fields, and the Disk_Locked Clock (output of Mixer2 230) is used for sampling chevrons 22. And, when the head 34 is between spokes 11, the Disk_Locked Clock is used as the Write Clock is for writing product servo wedges. Referring back to FIG. 17, the outer loop phase mixer 230 (Mixer2) is used to modulate the phase of the synthesized clock RW Synth (Read/Nrite Synthesizer) to generate the Disk_Locked Clock as the Write Clock for writing product servo wedges. The phase Mixer2 230 (e.g., implemented in the channel 21) includes a set of registers which are updated by a high precision serial port register set from the controller 17.

Figure 23:
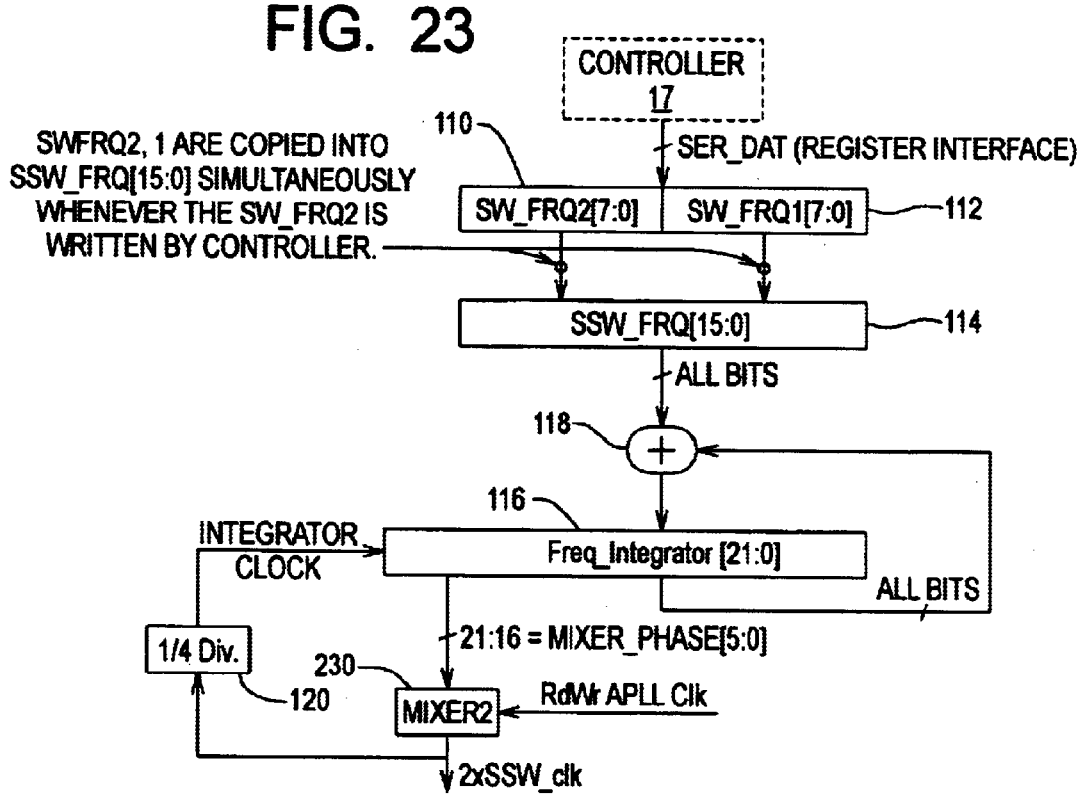
FIG. 23 shows an example block diagram of a circuit for transferring phase information the controller to the channel of FIG. 15.

After the end of the printed wedge 11 read/sampling operation, the controller 17 sends a 16-bit frequency error value (i.e., integrated phase error) to the channel registers (the frequency error values are integrated in the outer loop filter 218 to generate a digital phase signal (filtered phase information) as output of the outer loop filter. After the serial port registers are written with the filtered phase information from the outer loop filter 218 at the end of the patterned pattern spoke 11, they are automatically loaded into an internal 16 bit timing loop working register (i.e., two serial port registers that control the phase of the modulator Mixer2 230). This update takes place synchronously after a second serial port register transfer is complete (in one example, the registers are transferred in 8 bit bytes and synchronous loading is needed to affect the change in the loop timing in one step to minimize disturbance in the loop). The result of serial port register is then stored in the register of the modulator Mixer2 230. In order to simplify integrator complexity, the update frequency rate of the disk locked clock phase modulator Mixer2 230 can be at ¼ of the output frequency of the Disk_Locked Clock. FIG. 23 shows an example of the above operation, wherein two serial port registers, SW_FRQ1 110 and SW_FRQ2 112, are fed from the drive controller (ASIC)17 through serial ports, and the values therefrom are provided to a SSW_FRQ 114 register which holds the frequency value. The value in the SSW_FRQ 114 register is input to a Freq_Integrator 116, that adds up the result using a summer 118. The summed result is input into a mixer register Mixer2 230. The R/W Clock (RdWr APLL Clk), clocks the Mixer2 230 register, and the contents of the Mixer2 230 register are divided by 4 in a ¼-Div. junction 120, to clock the Freq_Integrator 116.

Referring back to FIG. 17, the value SAM2SAM_count represents the count of reference clock (REFCLK) ticks by the controller 17, between SAM-found marks/events. The controller 17 counts REFCLK periods (REFCLK is generated by the channel 21 in RW Synthesizer 231 as RW Synth) between the one SAM-found and the next SAM-found event in the pattern 12. REFCLK is based on the synthesized reference from MIXER2 230. As such, REFCLK is running on the synthesized clock (RW Synth) and the SAM-found mark is discovered in the printed pattern 12 waveform from the read back signal. The result is that the time between SAM-found events varies according to the eccentricity of the pattern 12 and hence the SAM2SAM_count varies (e.g., by two clock cycles). The variation in SAM2SAM_count is resolved by the higher precision of the Time Interval Analyzer 214 (TIA) and the PC 216 measurements. The TIA 214 measures the internal clock of the channel 21 which runs 64 times faster than the REFCLK. Because the controller 17 is only concerned with SAM-found on byte boundaries, there can be some ambiguity as to where the actual SAM-found mark occurred in the read signal. The TIA 214 then runs at a speed that is 64 times higher to resolve within a REFCLK period. With the SAM2SAM_count and the TIA 214, the location of each SAM is found within one internal Disk_Locked Clock. This can be improved using the actual phase of the bursts (i.e. chevrons 52 or timing marks) computed using the inverse tangent function in the PC 216. The sMOD operator in the equation below brings together the signals to provide both the range and resolution needed to control the Disk locked clock (from Mixer2 230).

Figure 17:
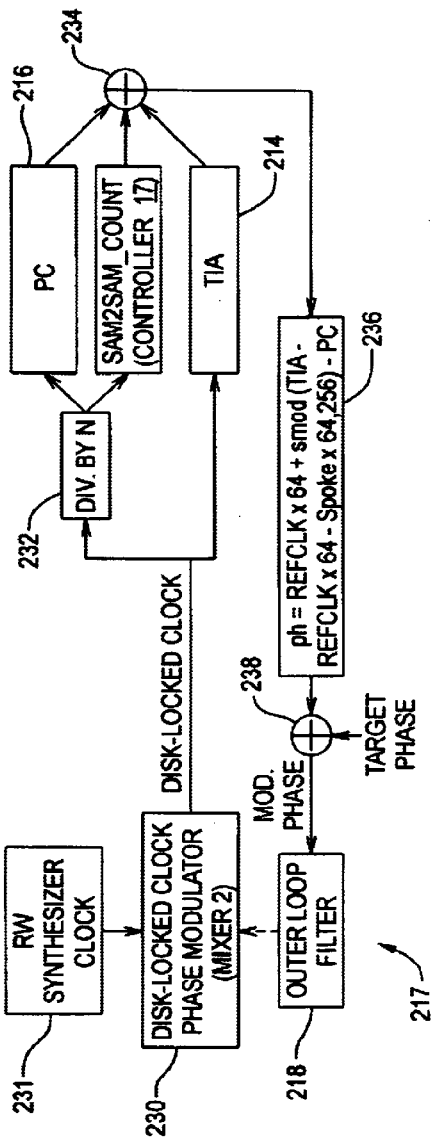
FIG. 17 shows an example block diagram of data and control flow in an outer modulation loop in the control system of FIG. 15.

The control loop shown in FIG. 17 shows the steps of generating and using the Disk_Locked Clock in the outer loop. The Disk_Locked Clock is output from the phase modulator Mixer2 230. The Disk_Locked Clock is divided by a divider 232 (e.g., div. by N) for clocking the PC 216 and SAM2SAM_count measurements. The outputs of the PC 216, the SAM2SAM_count in controller 17 and TIA 214, are added together by an adder 234, and a measured phase (ph) is computed therefrom in a process block 236 according to the example equation below:

$$ph = \text{REFCLK} \times 64 + s\text{MOD}(\text{TIA} - \text{REFCLK} \times 64 - \text{Spoke} \times 64, 256) - \text{PC}$$

In the above equation in process block 236, REFCLK is the same as RW Synth, Spoke is the value of the SAM2SAM_count, PC is output of phase compute 216 and TIA is output of time interval analyzer 214. The values of REFCLK, TIA, SAM2SAM_count and PC are combined as shown, wherein REFCLK provides coarse resolution phase information, smod(TIA−REFCLK×64−SAM2SAM_count×64,256) provides relatively finer resolution phase information and the PC output (phi) provides relatively finest resolution phase information.

The measured phase (ph) from block 236 is input to a differencing amplifier 238 that subtracts out a Target Phase (i.e., phase variation due to eccentricity of the pattern 12) from the measured phase (ph) to provide a phase error (mod. phase) to the outer loop filter 218. The outer loop filter 218 includes an integrator (software) for integrating the phase error, and the integrated phase error value from the outer loop filter 218 of controller 17 is provided to the Disk_Locked Clock phase modulator Mixer2 230 via a serial port in the channel 21.

As such, with the head 34 at the OD of the disk 16, in a first process a Target Phase due to eccentricity is measured on one track at the OD of the disk 16, for all spokes 11 of the pattern 12. A phase lock loop (inner loop) is used to acquire phase lock on the spoke 11 and read the SAM and the Gray DATA. The outer loop is then used to disk lock the clock to the printed pattern 12 (generating stable phase coherent Disk_Locked Clock). The angular position of the head 34 relative to the recovered signal i.e., filtered ADC samples with one or more harmonics removed) is known, and is used to measure and store the phase at various angles around the disk 16. This phase information is used to compute an eccentricity profile which becomes the Target Phase that is subtracted from the outer loop feedback signal. The output of the adder 238 produces a very stable reference signal (i.e., Disk_Locked Clock) that is used for writing the drive servo wedges. Therefore, the outer loop 217 is held constant while SAM is found and Gray data read in the inner loop 207, and then the outer loop is started to compensate for known eccentricity (refining the model of the eccentricity until the disk locked clock is stable).

Therefore, the inner loop 207 and the and outer loop 217 are used cooperatively, wherein the inner loop 207 is used to obtain enough phase information to properly detect the SAM and read the GRAY data, and thereafter the outer loop 217 is used to measure and correct the phase information for reading the chevrons 52 of the pattern 12 to generate the Disk_Locked Clock (write clock) for writing final servo patterns 39.

In FIG. 17, in one example, the Target Phase represents an algorithmic computation of eccentricity of the pattern 12 on the disk 16, wherein as the reference pattern 12 rotates, the Target Phase is modulated to counter the phase output (ph) of the process block 236 via the differencing amplifier 238, so that the phase error (mod. phase) is close to zero, making the Disk_Locked Clock stable. As such, the phase number output from the outer loop filter 218 is close to zero at all times, so that the modulated phase (Disk_Locked Clock) is a very stable reference clock relative to the eccentricity of the pattern 12.

The Disk_Locked Clock is used as Write Clock for self-servo writing, wherein when the head 34 is over each spoke 11 the Disk Locked clock is the same as the Sample Clock for sampling the chevrons in each spoke 11, and when the head 34 is not over a spoke 11, the Disk Locked clock is the same as the Write Clock for writing product servo wedges in between the spokes 11.

In one version, the outer loop 217 includes the PSP 210 (which provides the odd and even sample sine and cosine measurements), the buffer 212, the phase compute 216 in the controller 17, the outer loop filter 218, and a serial port register for providing phase error information to the channel 17 for modulating the RW Synth clock.

The outer loop adjusts the phase of the ADC 202, to have zero runout per revolution. This maintains a timing reference between the Servo Synth clock when the head 34 is over each spoke 11, and the RW Synth clock when the head 34 is between the spokes 11. In one example, state machines in the controller 17 use the signal RW Synth/32 to perform phase interval processing (i.e., compensation). The outer loop adjusts the Disk_Locked Clock so that it tracks the once around phase error due to eccentricity (and disk misregisteration during the assembly of the printed disk to the spindle hub). In one example, the eccentricity variation from spoke 11 to spoke 11 of the pattern 12 is less than four high speed ADC clocks, or one Preamble cycle (one fundamental period in the printed media waveform). A counter in the drive controller 17 is used to measure the Disk_Locked Clock count and determine when the next servo spoke 11 should appear under the head 34. The phase of all clocks in the system 200 is tied to the shifting of the printed waveform 12 as the disk 16 rotates around the spindle. As such, the spoke-to-spoke time interval is regular, to prevent skipping a cycle and missing the window on the predicted location of the next SAM within a spoke 11. In effect, for self-servo writing, the outer loop eliminates the shifting due to pattern eccentricity, and the inner loop eliminates the jitter of the electronics.

The channel's servo section (including the ADC 202, the HSP 204, the Data Detector 206, the Servo compensation filter 208 and the PSP 210) demodulates burst amplitude of the pattern 12 chevrons 52, and sends the resulting Sine and Cosine values via data bus to the phase compute 216 in the controller 17. The burst patterns (chevrons 52) are sampled with the Disk_Locked Clock, wherein the controller 17 calculates the phase between the Disk_Locked Clock and the periodic pattern 12 on the disk 16 using a method of extracting the repeatable runout (RRO) (e.g., due to eccentricity).

Figure 24:
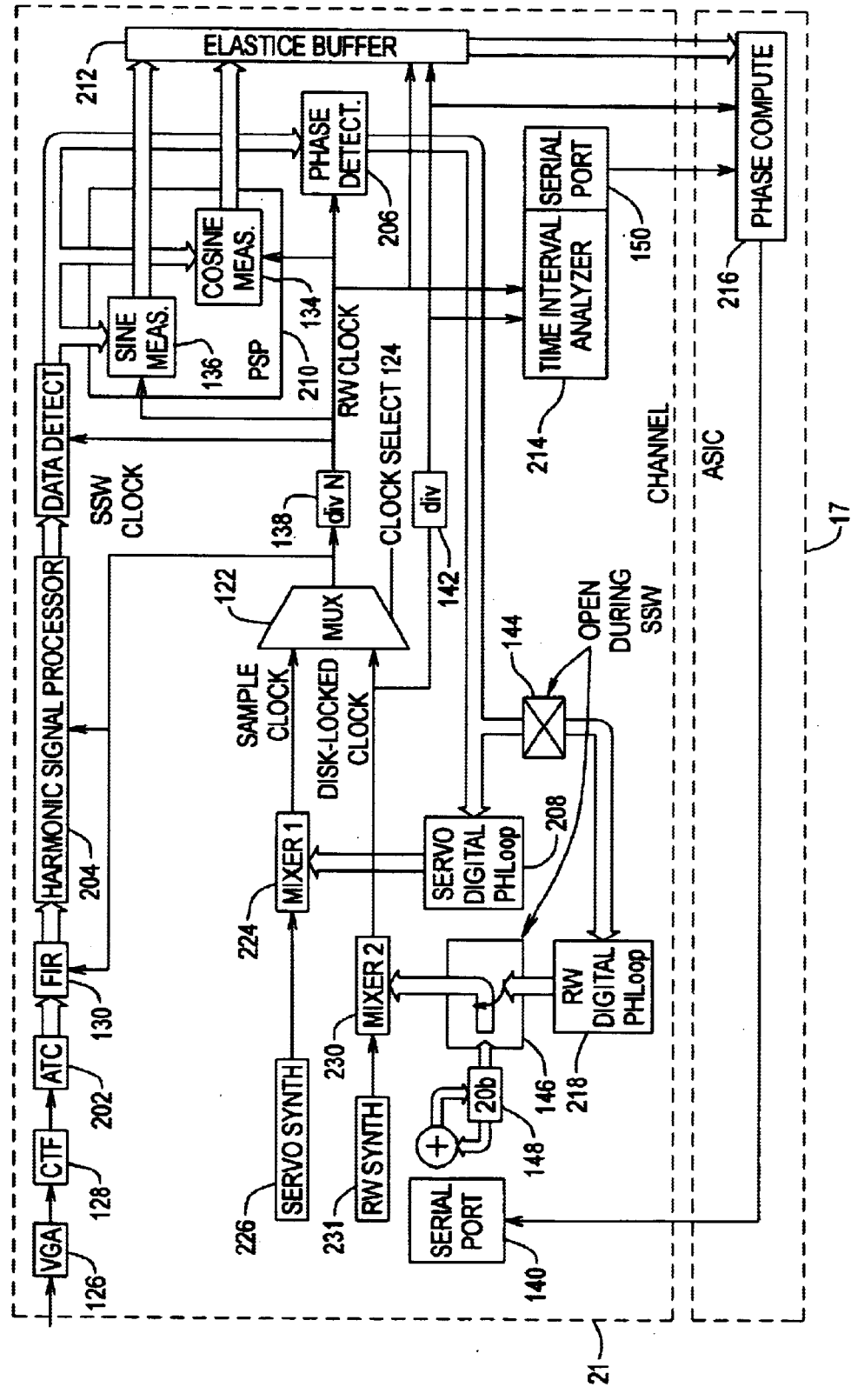
FIG. 24 shows an example data and control flow of the control system of FIG. 15.

Referring to FIG. 24 an example data/signal flow diagram of the control system 200 of the disk drive electronics 40 is shown. In normal operation the Phase Compute 216 in the inner control loop 207 is used to modulate the Sample Clock during both "servo mode" for reading product servo wedges 39, and "data mode" for reading user data. For the example self-servo write herein, Synchronous Servo Write (SSW) or Printed Media (PM) mode, a static multiplexor (not shown) is switched to allow the channel 21 to operate in a special mode to generate the Disk_Locked Clock. In addition, a dynamic multiplexor Mux 122 is switched by a Clock Select signal 124, which controls the clock signal source for clocking the digital logic of the system 200, depending on the location of the head 34 on the reference pattern 12. Two inputs to the Mux 122 include the RW Synth clock signal from the R/W synthesizer clock 231, and the Servo Synth clock signal from the servo synthesizer clock 226.

The output of the Mux 122, SSW Clock signal, is switched between the Sample Clock from Mixer1 224, and the Disk_Locked Clock. The Mux 122 shows the SSW Clock signal changes meaning depending on where the head 34 is relative to the pattern 12. The Mux 122 outputs the Sample Clock as SSW clock when the head 34 is over PRE, SAM and GRAY fields of each spoke 11. When the head 34 is over the remainder of the pattern 12, the Mux 122 outputs the Disk_Locked Clock as SSW clock. For writing the product wedges 39 the Mux 122 outputs the Disk_Locked clock as SSW clock or Write Clock (R/W Clock). The Write Clock is not used when the head 34 is over the printed servo fields 11 because no write operation takes place in that field.

In FIG. 24 the time interval analyzer 214 is driven by both the Disk-Locked Clock/N as well as the SSW_clock/N so that the time interval relationship between the RWClock (SSW_clock/N) and the Disk_Locked clock can be determined. This time measurement counts the number of high speed clocks between the phase of the Sample Clock and the Disk_Locked Clock which changes once per printed spoke 11. The value is read via a serial port register such that the time SAM found signal can be resolved within the proper R/W Clock period.

When the head 34 is over the digital data portions (Preamble, Gray, SAM fields) of a printed pattern servo spoke 11 the servo synthesizer clock 226 signal (Servo Synth) is selected by the Clock Select signal, such that the Mux 122 outputs the modulated Servo Synth clock (output of Mixer1 224). When the head 34 is not over the digital portions of a printed servo wedge 11, the modulated RW Synth Clock (output of Mixer2 230) is selected by the Clock Select signal, such that the Mux 122 outputs the Disk_Locked Clock signal.

FIG. 24 shows composite diagram of the entire self servo write system components, including a Variable Gain Amplifier (VGA) 126, a continuous time filter (CTF) 128 which limits the system noise and pre-shapes the read signal, the ADC 202 which samples the read waveform based on a SSW Clock signal. The channel 21 further includes, an FIR filter 130 and the Harmonic Signal Processor 204 (decimation filter), said phase/data detector 206, the cosine measure block 134 and the sine measure block 136 (forming said Phase Signal Processor 210), the inner loop filter 208 (Servo PH Loop 208), the outer loop filter 218 (R/W Digital PH Loop), and the Phase Compute 216.

The SSW clock is determined by the setting of the Mux 122 which selects either the Disk_Locked Clock, or the Sample Clock. The Sample Clock is obtained by modulation of the Servo synthesizer 226 in using the phase modulator Mixer1 224. The Disk_Locked Clock is obtained by modulation of the RW Synth clock 231 using the phase modulator Mixer2 230. Control of the mixers 224, 230 is by the feedback from the Phase Detector (Phase Detect) 206 in the case of the Sample Clock, or the serial port registers and the outer loop filter 218 in case of Disk_Locked Clock.

The output of the phase/data detector 206 is processed by the phase compute 216, and fed to the servo digital phase logic 208 (Servo Digital PH Loop which includes the inner timing loop components), as the pattern 12 phase error due to eccentricity or instantaneous read phase acquisition error during reading of low frequency servo spoke 11. The RW Digital PH Loop 218, which is normally used to detect user data, is bypassed for the duration of the Synchronous Servo Write (SSW) operation. After self-servo writing is complete, the loop RW Digital PH Loop 218 is used for normal read write operations. The RW Digital PH Loop 218 compensates the user data phase acquisition during normal data reads (not used in SSW mode).

As such, when the head 34 is over a printed wedge/spoke 11, the Clock Select selects the Servo Synth via the Mux 122 (in SSW mode, the Mixer1 224 output is called the Sample Clock), wherein in this example Servo Synth runs N=8 times faster than the clock of the Preamble in spoke 11 (as used herein, N represents the ratio of the resolution of the produce servo wedges 39 to the printed pattern 12). The HSP 204, clocked by the modulated Servo Synth 226, provides low-pass filtering and downsampling of the readback data from the ADC 202. The Servo Synth clock 226 rate is divided by 8 in a div-N junction 138 for clocking the data/phase detector 206 and the inner control loop. In the example of FIG. 24, the inner control loop includes the HSP 204, the Data Detector 206 and Servo PHLoop 208. Every Nth (e.g. 8th) data sample is kept, and processed in the phase signal processor 210, wherein the Sine and Cosine of the kept values is computed (e.g., using cosine and sine measure blocks 134, 136), and provided to the phase compute 216. The HSP 204 (e.g., decimation filer) and phase detector 206 (e.g., zero-cross detector), form a signal conditioner. In one example, signal decimation is used to obtain fine resolution on the Preamble of each spoke 11 to reach within one Preamble cycle/N in order to provide for a zero-cross detection operation. During said zero-cross detection the correct one-of-8 downsampled values is chosen as the sample to keep during the remainder of the printed spoke 11. As such, signal decimation is used to provide a relatively accurate phase for zero phase start.

The phase compute 216 includes a decision-directed error generator whose control is derived from either the preliminary data samples, or in another embodiment, a maximum likelihood detector. The phase compute 216 output is used in the inner control loop 207 to acquire the proper phase of the read signal during the detection of the servo Gray data fields in each spoke 11.

The phase signal processor 210 includes a set of quadrature sample values (e.g., Sine and Cosine of sample values) which are used in the phase compute 216 to calculate a phase difference (phase error). The phase difference is fed back to the RW Digital PH Loop 218, and the Servo Digital PH Loop 208.

The Sample Clock and the Disk_Locked clock are the same when the head 34 is over the chevrons 52 in each spoke 11, but unrelated when the head 34 is over the Preamble section of a spoke 11 because the Disk Locked clock is driven by the phase modulated version of the RW Synth from Mixer2 230. During acquisition and Gray code detection of the spoke 11 signal the Disk_Locked Clock is driven by a serial port 140 from the phase compute 216. The Disk_Locked Clock may change its phase instantaneously while the Sample Clock is being used to acquire the Gray data. The Clock Select 124 switches the Mux 122 after the end of the Gray code field and before the beginning of the chevrons 52 to allow the phase jump to propagate from the ADC 202 to the buffer 212.

Immediately after the head 34 is past a printed spoke 11, for writing a product servo wedge, the Clock Select 124 switches the Mux 122 to output the RW Synth Clock, wherein the Mixer2 230 phase modulates the RW Synth Clock based on either the RW Digital PH Loop 218 or a Serial port register 140. The serial port register 140 is used to run the Mixer2 230 which directs the Disk_Locked clock to appropriate phase at the start of the next printed spoke 11. The low frequency signal processing in the inner timing loop (e.g., using a low frequency clock implemented as Sample Clock/32, where N=8) is used to extract the signal from the printed pattern 12 to phase lock to the correct phase. The controller 17 feeds the serial port register 140 based on the phase error computed by the phase compute 216 using said sine measure and cosine measure values of the PSP 210 input to the controller 17 via the elastic buffer 212.

The output of the Mux 122 switches between the modulated Servo Synth clock and the modulated RW Synth clock as described, wherein both clock synthesizers have a phase modulated phase based on the architecture shown in FIG. 24. The modulated RW Synth clock is divided in a junction 142 (e.g. div. by 4) to generate RW Synth clock/32, as the output of the Time Interval Analyzer 214 into the controller 17, wherein the controller 17 uses the RW Synth clock/32 as a counter for phase computation (e.g., 32 to 1 ratio between the actual Sample Clock and the R/W clock in the controller 17). In this example, when the head 34 is past a spoke 11 (e.g., writing final servo wedges in between spokes 11) the Write Clock and the Disk_Locked clock are the same. The serial port register 140 is fed back from the phase compute 216 in the controller 17 to the channel 21 to control a very precise clock that modulates the RWSynth clock. In that mode the channel 21 is running only in servo mode (and hence the RWSynth is spare), and the RWSynth clock is used to generate an additional clock that is phase coherent with the spindle clock.

Therefore, the Disk_Locked Clock is the R/W clock (i.e., RW Synth Clock/32) in the read channel 21, modulated with said pattern eccentricity so that it is locked to the disk 16. The product servo wedges 39 are written using the Disk_Locked Clock as the Write Clock, at a phase that is corrected relative to the printed pattern 12 phase. When product servo wedges 39 are written, the Disk Locked clock is modulated in a sinusoidal fashion to remove said eccentricity of the pattern 12. The eccentricity causes a phase difference between Disk Locked clock and the printed pattern phase (i.e., read waveform of the printed media). Because the chevrons 52 are sampled with the Disk Locked clock, the controller 17 can determine the phase (ph) between the Disk_Locked Clock and a periodic pattern on the disk as the phase angle according to the following example equations:

$$p = \text{SAM2SAM\_count} \times 8 + \text{mod}(\text{TIA} - \text{SAM2SAM\_count} \times 8, 16);$$

$$ph = p \times 128 + \text{mod}(PC - p \times 128, 1024);$$

In the above equation, SAM2SAM_count is as described above, PC is output of phase compute 216 and TIA is output of time interval analyzer 214. The computed phase (ph) is then modulated in the outer loop 217 by the eccentricity of the pattern 12, to generate the Disk_Locked Clock, as described above in relation FIG. 17. As such, when the Disk_Locked Clock is running, it generates a stable reference clock that does not change in frequency, but the printed pattern 12 modulates to eccentricity. The product servo patterns 39 are written using the Disk_Locked Clock, as the Write Clock, which is sinusiodally modulated due to the eccentricity of the printed pattern. As such, the Disk_Locked Clock has a sinusoidal modulation relative to the phase of the printed pattern phase 12.

The synchronous self-servo writing method (SSW) described above, uses the acquired phase of the pattern 12 as modulated by the phase compute 216 and the outer feedback loop to write the product patterns. Another example method of self-servo writing method (lock & coast method) according to the present invention includes self-servo writing product patterns using the acquired phase from the pattern 12 in the inner loop, and writing the product patterns using the acquired phase, unmodulated by the phase compute 216 and unmodulated by the outer feedback loop.

Both methods can be implemented using the same control system shown in FIG. 24. For the Synchronous Self-Servo Write method (SSW), the control of Mixer2 230 is always driven by the serial port 140 via a switch 144 that opens the feedback to the RW Digital PHLoop 218. Another switch 146 remains open as shown, wherein the serial port 150 is connected to the Mixer2 230 via a 20-bit integrator 148. For lock & coast self-servo writing method, the control of Mixer2 230 is always driven by the RW Digital PHLoop block 218 wherein the switch 144 is closed so the feedback is connected to the RW Digital PH Loop 218, and the switch 146 is closed to connect the RW Digital PH Loop 218 to the Mixer2 230.

In one example, the phase modulator/mixer Mixer2 230 in FIG. 24, includes a series of 32 replicated waveforms that are slightly shifted from each other. The RW synthesizer 231 generates a sine wave, and a selector selects one of the 32 phases using a 6-bit number. The 6-bit number is fed into the selector that affects/modulates the phase either early or late. The Disk_Locked Clock is output of Mixer2 230 as controlled by the controller 17 via the outer loop. The phase mixer/modulator Mixer1 224 stretches or shrinks period of the sample clock instantaneously.

Figure 25:
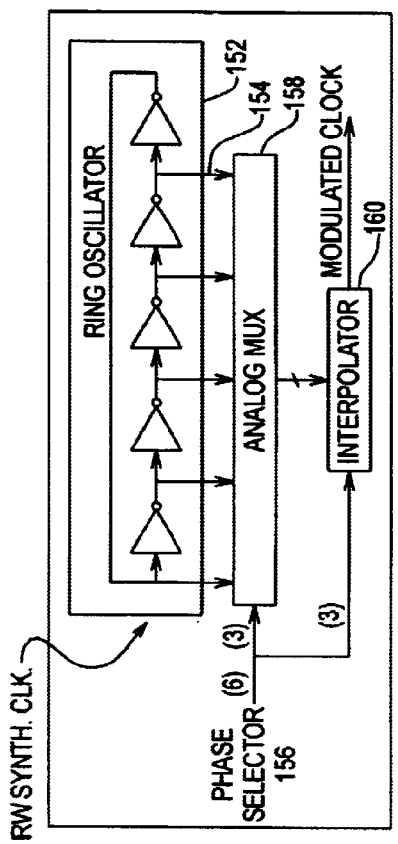
FIG. 25 shows example block diagram of phase mixer/modulators of FIG. 24.

FIG. 25 shows schematic of a phase mixer/modulator that can be used as Mixer1 224 or Mixer2 230. An example implementation of Mixer2 230 comprises a delay control ring oscillator 152, with the RW synthesized clock 231 circulating around. The example shows several output taps 154 from the ring oscillator 152, and a phase selector signal 156 (e.g., a digital control), provides e.g. 6 output bits wherein upper 3 bits (coarse, delay control) select one of said taps via a multiplexor 158 (MUX), and the lower 3 bits (fine) select an interpolated voltage between two of said taps. The MUX 158 has two outputs, one is an early signal and the second a late signal. As such, a weighted sum of the two taps is determined (e.g., by means of a set of resistive dividers whose outputs are tapped to produce an interpolated signal whose delay is proportional to the tap weight setting) and divided by two in an interpolator 160, generating the modulated clock e.g. SSW clock. The modulated clock is further divided by N to produce the Disk_Locked Clock. In this example, the phase selector signal can be from the switch 146 in FIG. 24, providing output of the Phase Compute 216 to the Mixer2 230 via the serial port 140 and 20-bit integrator 148.

Figure 26:
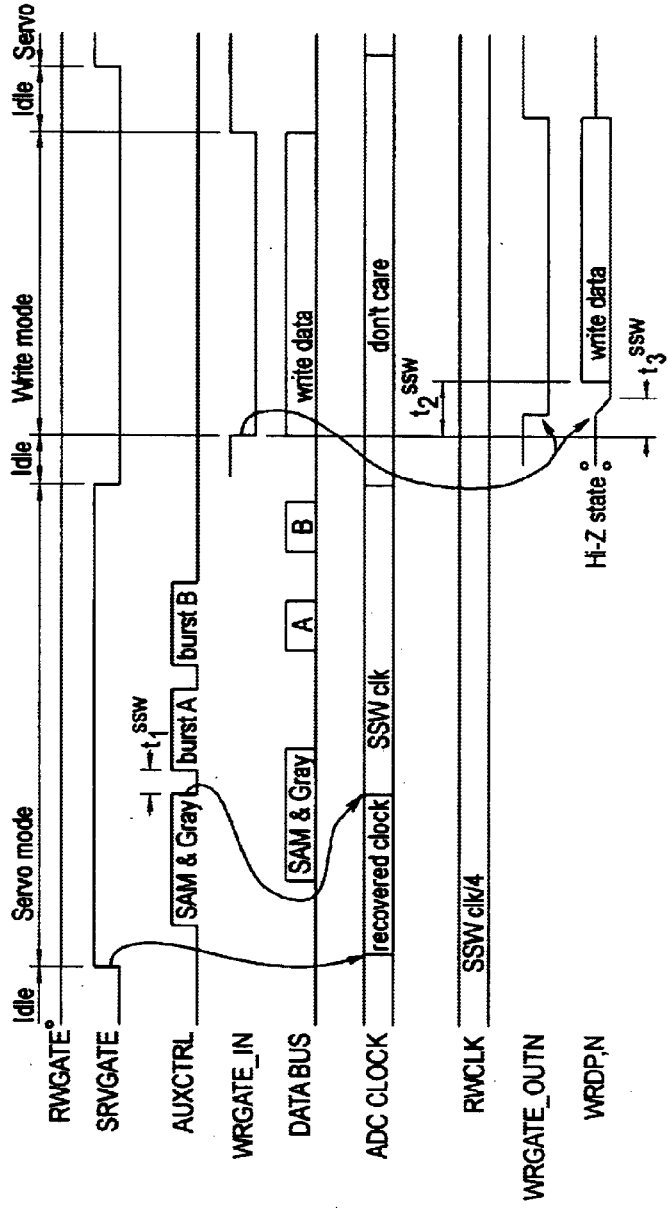
FIG. 26 shows an example timing diagram for a self-servo write operation to write final (product) servo patterns in between printed spokes.

Referring to FIG. 26, an example timing diagram for a self-servo write operation to write final (product) servo patterns in between spokes 11 on disk 16 (and on blank disk surfaces) is shown. In general, writing the product servo patterns 39 is the same as the write operation for normal read/write channel format, except that for self-servo write the write operation is at the rate of the Disk Locked clock (SSWCLK). In one example, the product servo pattern write operation is the same as in normal write mode, except: (1) the write channel clock is the Disk Locked Clock (normally data clock (DCLK)), (2) the channel 21 accepts only N (e.g., 8) bits from the DATA bus (used by the output of the elastic buffer 212) during one controller 17 clock cycle in order to match the Write Clock and speed of incoming readback data which is tied to the sampling (e.g., downsampling) rate, (3) The controller 17 bypasses internal encoder and decoder blocks that are used in normal data write operation, and disables all special field writing, and sends appropriate product servo patterns to the channel 21 via a DATA bus (e.g., data bus used by the elastic buffer is turned around and becomes input to the channel 21 for writing), wherein the channel 21 interprets that data as non-return to zero (NRZ) (e.g., the sequence . . . 111000 . . . is mapped into one transition), and (4) write precompensation is not used.

When the head 34 is over a spoke 11 of the pattern 12, said DATA bus has the SAM and Gray Code thereon as normal operation, and optionally A and B bursts as normal (FIG. 9B). After the head 34 moves past a spoke 11, the system 200 immediately switches (e.g., via Clock Select signal to the Mux 122 in FIG. 24) to a high frequency clock (e.g., Disk_Locked Clock/N, wherein e.g. N=8). After the end of the spoke 11 for wiring final servo patterns, the high frequency clock remains coherent with the data that is written in between the printed spokes 11 as the final servo pattern wedge.

The RW clock described above is used to clock the data from the controller 17 into the channel 21 when writing final servo wedges. The frequency of both the Sample Clock and the Disk_Locked Clock are very close together, although they may differ in phase. In one example, sampling of each spoke 11 of the printed pattern 12 is clocked at Sample Clock/(N*4) (e.g., N=8) and the product pattern Write Operation is clocked at Disk_Locked Clock/N, while RW Clock (RWCLK) multiplexes between these two clocks at various portions of the write operation.

The example FIG. 26 shows waveforms of time domain control of a printed pattern 12 servo read followed by a product servo write operation, according to the present invention. The operation of the channel 21 can be described by a series of states including: (1) idle mode, wherein the channel 21 is not reading or writing, (2) servo mode, wherein the channel 21 is reading printed servo spokes 11 and (3) write mode, where the channel 21 is writing product wedges. In FIG. 26, SRVGATE represents the control signal that signals the channel 21 to operate in servo mode, thereby synchronizing the channel 21 to a printed spoke 11. The synchronization is achieved by activating the AUXCTRL control line which enables the channel 21 to use a control window to search for the Servo Address Mark (SAM) and then to read the Gray Data (Gray) in a printed spoke 11 (Servo Address Mark is a unique identifying mark that contains encoded digital information whose signature is unique within the printed media spoke 11). The digital encoded information is provided to the controller 17 over the Data Bus as a serial stream of digitally encoded waveforms. AUXCTRL also signals the end of Gray data and the beginning of the burst fields (e.g., Burst A, Burst B in FIG. 9B) whose digital decoded values are also presented over the Data Bus. WRGATE_IN is an active low control signal that informs a preamplifier chip (not shown) in the disk drive 22, that the digital values (i.e., digital encoded information) on the WRDP,N lines are to be written to the disks. WRGATE_OUTN is a buffered and framed version of WRGATE_IN, needed to align the output WRGATE_OUT so that the delay in the channel 21 (caused by the internal encoder, scrambler, etc.) does not skew into the end of the WRGATE_IN control.

In write mode, for product servo writing, internal encoder and scrambler of the channel 21 are not used, as described above. In that case the Data Bus represents a parallel data byte that is serialized and sent to the WRDP,N lines as flux transitions to the heads 34, 36. The internal ADC clock is switched between the printed pattern recovered clock (the clock that is acquired after the zero phase start and phase acquisition, output of Mixer1 224) and the Disk_Locked Clock (SSW_Clk) which is controlled by the outer control loop 217 (i.e., output of Mixer2 230). The Disk_Locked Clock is used by the ADC 202 during the printed pattern burst (i.e., chevrons 52) sampling in order to determine the phase change between the Disk_Locked Clock and the chevrons 52 in the printed pattern 12. This phase change is computed as the inverse tangent of the sine and cosine values of the printed pattern bursts (i.e., chevrons 52). There are minimum timing requirements between the control of the SAM and GRAY strobe and the beginning of printed pattern burst A (i.e., a chevron 52) in FIG. 9B (described by the time T1, one low frequency clock period). It is preferable to keep this time period as short as possible in order to minimize the size of the printed field in each spoke 11. There is also a minimum time required by the preamplifier to respond to a write command (i.e., the time for the preamplifier to begin writing once the channel 21 is commanded to begin a write operation, shown as T2 in the waveform). This period is tightly controlled in order to provide coherent writing between adjacent product servo patterns. Preferably, coherence between adjacent product servo patterns is maintained between separate revolutions of the printed pattern 12 under the head 34 to better than ½ of one product clock period. The turn on time of the writer to recover from a standby (non-writing state) to the write state, shown as period T3, is not controlled and depends on several factors such as temperature and voltage. The timing of the write data is controlled by bringing write driver out of standby into a known controlled polarity then using the period T2 to tightly control the beginning of the final/product spoke field 39.

In another example, data for writing final product wedges is prepared in an external buffer RAM. At each sector, a single data pattern groups up the product wedges 39 to be written on each surface as a single write transfer operation. The patterns are created 10 bits wide where the low 8 bits are sent to a serializer in the channel 21 at a 8×T/2 rate. The upper 2 bits are used as side band signals: a write enable and a preamplifier serial interface control (SIF). Each bit has 1/2-T cell granularity to facilitate writing dual frequency bursts. For fields in each product servo wedge, data bits are simply replicated in bit pairs so that each byte represents a single 4T wide biphase symbol. The write enable bit negates write gate when switching heads.

As such, the printed reference pattern 12 can be lower density (low frequency or coarse pitch) and lower quality than the final product servo pattern 29 (higher frequency or fine pitch), because the entire data region between the final product embedded servo wedges can be used to contain the printed servo reference patterns 12. Such low resolution printed reference patterns 12 are used during self-servowrite even though they give poor performance in long track seeks. The printed reference patterns 12 may include timing-based positional information alone, timing information (e.g., tim-ing segments) and position information (e.g., chevrons), or the patterns may be frequency-encoded (i.e. different frequencies are printed on adjacent segments of the reference pattern), etc.

Figure 27:
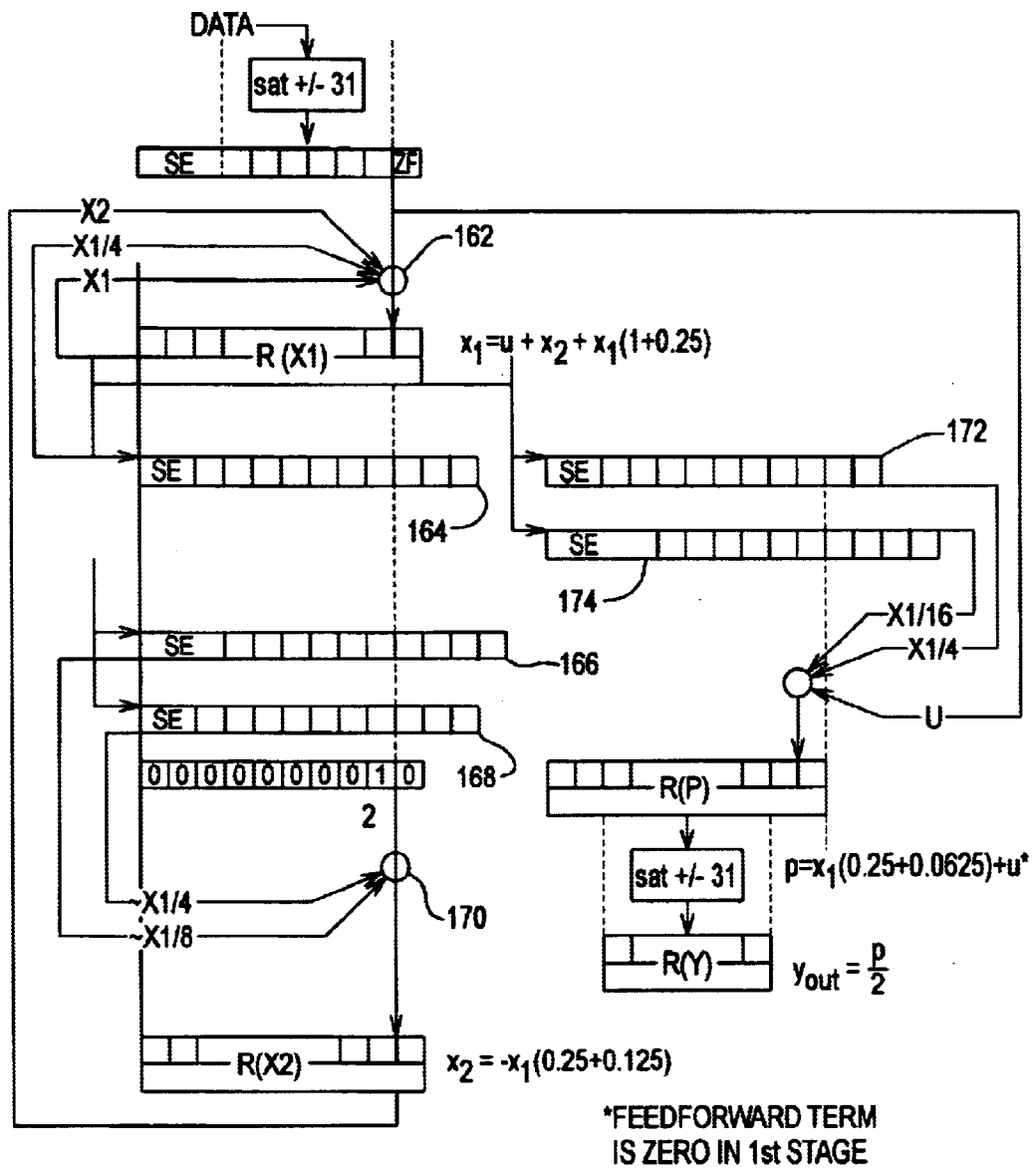
FIG. 27 shown an example block diagram of the filter of the harmonic signal processor of FIG. 20.

Referring back to FIG. 20, in one embodiment, the harmonic signal processor (decimation filter) 204, incorporates a fixed-point architecture that maintains system precision while minimizing internal register logic complexity. An exhaustive search algorithm was used to determine coefficients of the Infinite Impulse Response (IIR) filter such that left right shifting and adders are used to implement the required filter topology without compromising the required pole location in the filter. FIG. 27 shows a representation of the signal flow inside the filter. This second order filter section represents a common portion of the standard filter. There are two such filter sections 220 in the HSP 204 producing an overall $4^{th}$ order response.

The input to the first filter state is determined by the state equation:

$$x1[i+1]=x1[i]+x1[i]/4+x2[i]+u[i]$$

The second state input is determined by the state equation:

$$X2[i+1]=-(x1[i]/4+x1[i]/8)$$

Wherein, x represents the states of the filter 220 which are the outputs of the registers D, U is the input to the filter, and y (below) is the output of the filter.

From the state equations a state matrix below can be derived that describes the operation of the system:

$$x[i+1] = [\ 1.25\ \ 1\ ]*x[i] + u[i][\ -0.375\ \ 0\ ]$$
$$y[i] = 0.3125*x[i] + u[i]$$

Wherein, "*" in the above two equations is the matrix multiplication operation, the [1.25 1, −0.375 1] is a 2-by-2 matrix, and x[i], x[i+1], u[i] and y[i] are 2-by-1 column vectors. Elements of the column vector are x1 and x2. In FIG. 27, R(P) is a preliminary register. An output of the filter is yout/2 (i.e., p/2). The eigenvalues of the state matrix are the poles of the system which are both optimum and unique for the given sample rate and input waveform shape.

The simplicity of the filter design is an artifact of the selection of the 8× downsample rate and an exhaustive search of the pole locations necessary to minimize the error rate of the servo address mark detection in the noisy read signal.

In FIG. 27, an example embodiment of a filter 220 (one section 220 of two series filter sections 220) of the HSP 204, is a preferred filter topology for coefficient precision, filter order and the corresponding pole location. The topology is determined given a restriction of 10-bit internal representation of the filter and a maximum of 4-input adders at each filter state (Xi). As the servo address mark detector (i.e., phase detector 206) is a threshold based detector, the preferable filter topology is found such that the servo address mark (SAM) has a maximum eye-opening and hence an optimum hamming distance.

Said filter poles comprise the roots of the transfer function of the filter 220. The poles determine the frequency, phase and time domain response of the system 200. In the filter topology (structure) of FIG. 27, the poles were selected for maximizing the Hamming distance of the SAM and the 4T Preamble read patterns.

The pole locations of the filter 220 for said example topology in FIG. 27, are:

P1=1/2, P2=3/4. Both stages use similar poles (i.e., there are two biquads 220 in series, each with similar poles).

There are two filters in series, and they both have similar poles (P1=1/2 and P2=3/4).

The transfer function of the first stage (i.e., first filter 220) is:

$$\frac{D}{[1 - 1.25D + 0.375D^2]}$$

The transfer function of the second stage (i.e., second filter) 220 is:

$$\frac{[1 - 9.375D + 0.375D^2]}{[1 - 1.25D + 0.375D^2]}$$

Wherein D is a delay operator (i.e., register).

The above values provide the example response in FIG. 30 (further below), of a single biquad filter 220 used in the HSP 204. In this example, the overall filter (i.e., decimation filter or HSP 204) removes the third harmonic from the read waveform at the output of the ADC 202. The third harmonic component contributes an unwanted amplitude distortion to the recovered tone, from which the Phase Signal Processor 210 extracts the fine inter-spoke phase information. The unwanted amplitude distortion corrupts the phase information obtained in the chevrons 52 by adding amplitude variation to the argument of the arctan function which is then translated to phase noise in the outer control loop.

In FIG. 27, an example of a lowpass biquad filter 220 in the Harmonic Signal Processor 204 for attenuating the third harmonic of the pattern 12 readback waveform, includes registers R(X1), R(X2), R(P) and R(Y). Register R(X1) is fed through a line X1 back to a summing node 162, and is also provided to: (1) a first shifted copy 164 (shifted by 2 bits), (2) a second shifted copy 166 shifted over by 3 bits, and (3) a third shifted copy 168 shifted over by 2 bits. The first copy is fed back to the summing node 162, and the second and third copies are fed to the register R(X2), along with an unshifted version. The filter 202 includes a summer 170 for the register R(X2). An output is taken from R(X1) and shifted right by 4 (at 174) and shifted right by 2 bits (at 172) (i.e., divide). R(x) is the register output for each of the states as described above.

This topology for each filter 220 accounts for dynamic range and minimum number of gates and high speed, by optimizing several conditions. The HSP 204 includes two BiQuad filters 220 in series, followed by a decimation/downsample filter 222. In this example, every N=8th sample is kept (the other 7 are discarded), representing a zero-phase start system. As such, when the first part of the pattern 12 readback signal is processed in each spoke 11 for finding SAM, where the waveform is uniform, there is a fundamental harmonic representing a sine wave, and that sine wave, after passing through the BiQuad filters 220, has 32 samples per sine period. Only 4 samples per period are needed, hence only one sample out of eight samples is kept. Selection of the correct 4 samples among the 32 possible samples determines proximity to the correct phase at the start of new phase acquisition. When proper high speed phase acquisition is obtained, the readback sinewave is sampled at zero-crossings, and at the peaks (i.e., nominal phase). If, instead the shoulders of the signal are sampled, the samples are 90 degrees out of phase relative to the phase lock loop requirements. As such, zero-crossings of the signal are detected and when the signal crosses zero, the corresponding samples are kept providing the desired phase.

Figure 28:
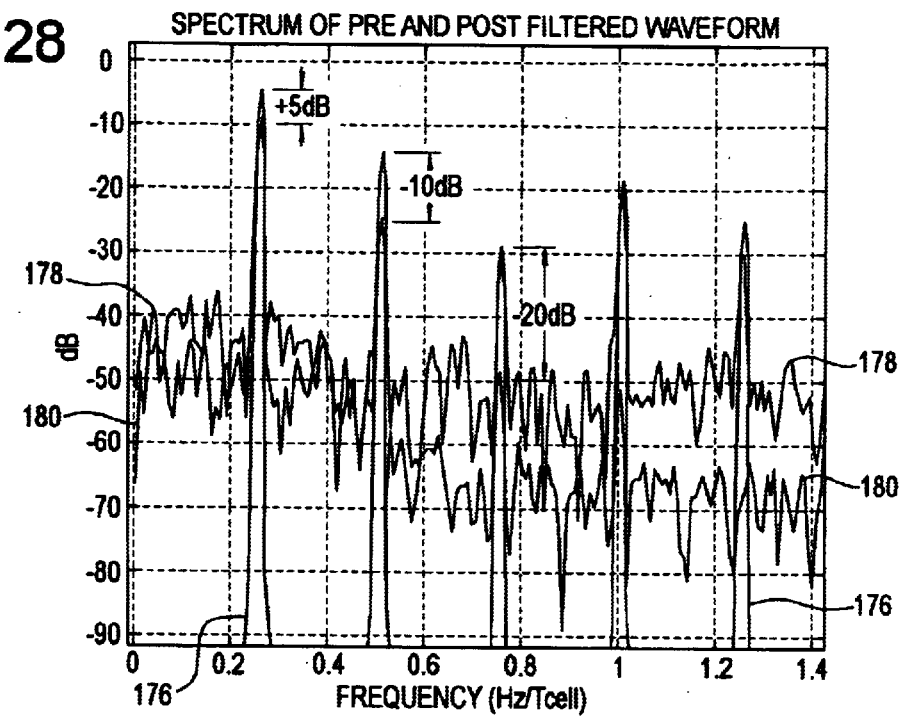
FIG. 28 shows example readback waveforms of the printed pattern and corresponding recovered signals, at the outer diameter (OD) of the reference disk.
Figure 29:
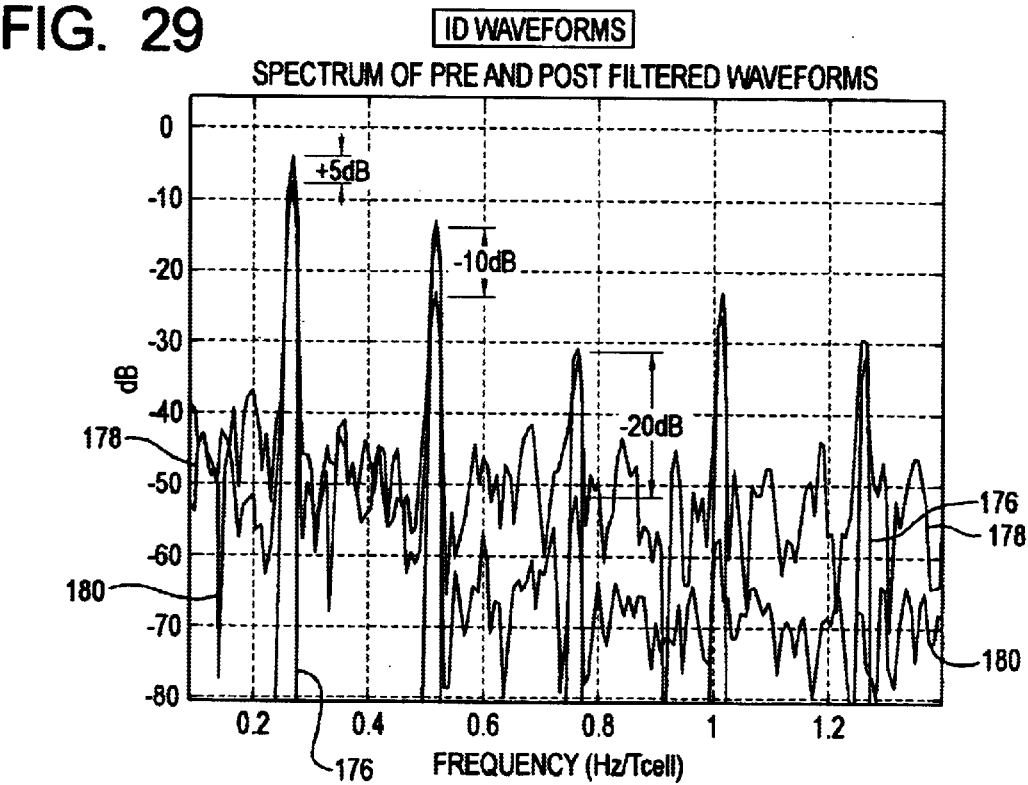
FIG. 29 shows example readback waveforms of the printed pattern and corresponding recovered signals, at the inner diameter (ID) of the reference disk.
Figure 30:
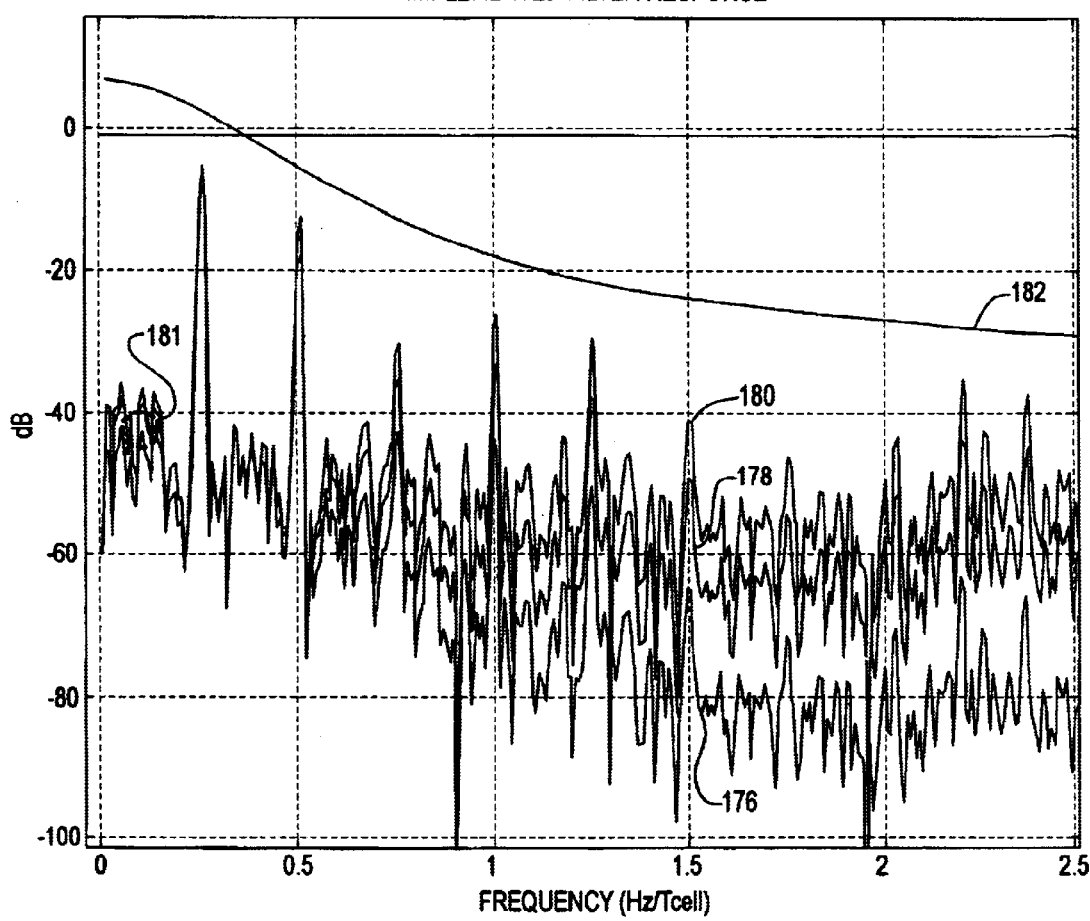
FIG. 30 shows example frequency domain signal of FIG. 28 obtained from the low pass filter in the harmonic signal processor of FIG. 20.

Referring to FIGS. 28–30, example representations of the recovered signal at various processing steps are shown. FIG. 28 shows readback waveforms of the pattern 12 at the outer diameter (OD) of the disk 16, wherein a first graph 176 represents the frequency spectrum of a noise free theoretical waveform whose harmonic content is matched to the pattern 12 readback wave form. A second graph 178 represents the frequency spectrum of the recovered read waveform at the output of the ADC 202, before decimation in the HSP 204. A third graph 180 represents the frequency spectrum of the recovered waveform after the lowpass filter 220 in the HSP 204. Comparison between the graph 176 (theoretical waveform) and the graph 180 (signal after low pass filter 220 in HSP 204) in FIG. 28 shows that in one embodiment, the lowpass filter 220 provides 5 dB gain at the fundamental frequency (a desirable signal component), and 10 dB attenuation at the first harmonic (a signal component which does not interfere with the processing of the burst phases in each spoke 11), and a 20 dB attenuation at the third harmonic (an undesirable signal component as it corrupts the phase information because during downsampling it folds back into the fundamental frequency, and modulates the amplitude of the waveform). The example FIG. 29 shows said three graphs for readback waveform at the inner diameter (ID) of the disk 16.

Figure 31:
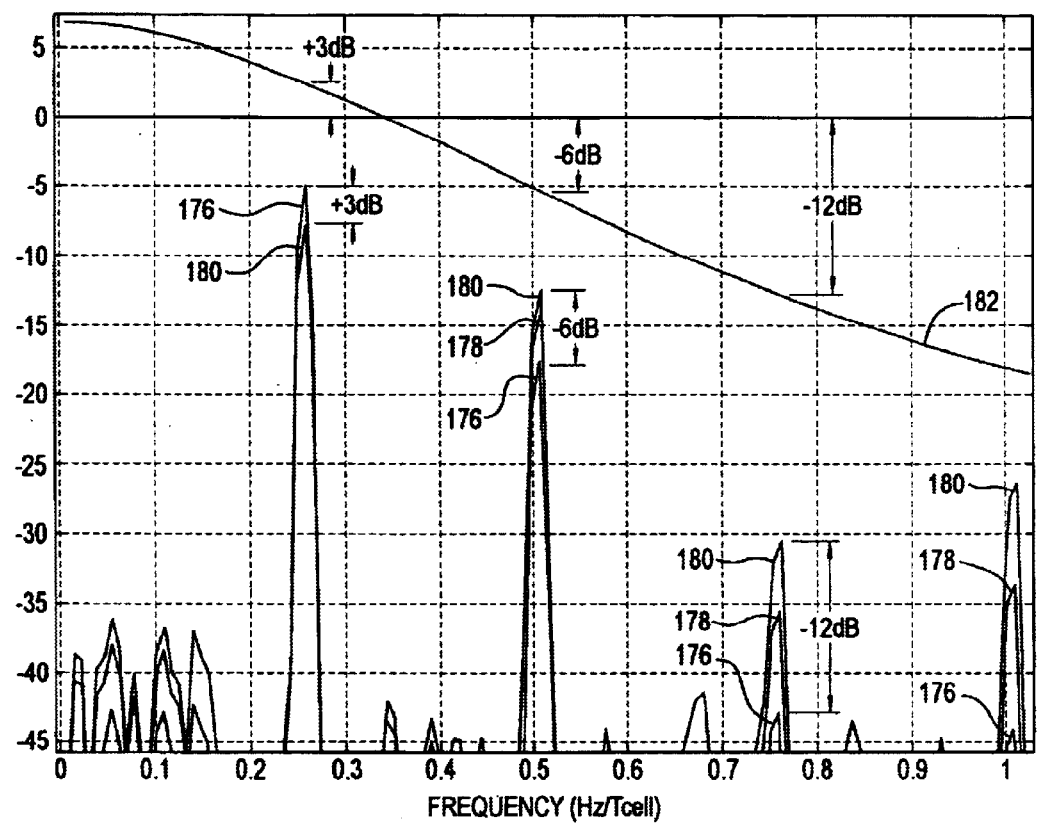
FIG. 31 shows an enlarged view of a portion of the waveforms of FIG. 30.

The example FIG. 30 shows the same frequency domain signal of FIG. 28 obtained from the low pass filter 220 in the HSP 204, including finite precision components. The example FIG. 31 shows an enlarged view of a portion of the waveforms of FIG. 30 (indicated by dashed circle 181 in FIG. 30). As shown in FIG. 31, the fundamental frequency of said signal is amplified by 3 dB, the first harmonic is attenuated by 6 dB and the third harmonic is attenuated by 12 dB. The frequency response of the filter 220 is shown as graph 182.

Figure 32:
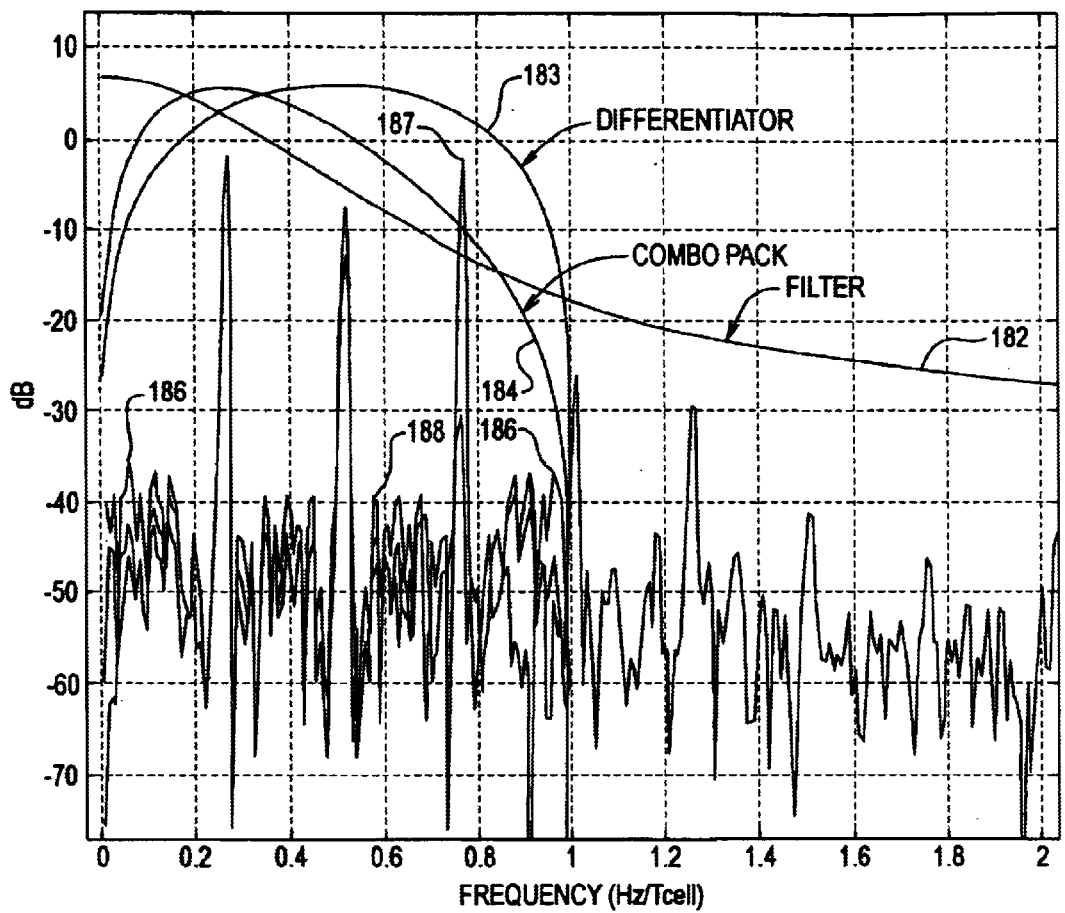
FIG. 32 shows an example of overall response of the Harmonic Signal Processor of FIG. 20.

The overall response of the Harmonic Signal Processor 204 is shown in FIG. 32, whereby the Nyquist frequency is at 8 Hz/Tcell, while the pattern 12 preamble frequency is 0.25 Hz/Tcell. Downsampling is performed by the downsampler 222 (FIG. 20) after the lowpass filter 220, and the downsampled signal is processed by the normal signal processing of the servo timing loop in the channel 21. The example in FIG. 32 shows the response of the entire downsampling signal processing with the composite lowpass filter and a differentiator (including a register and a differencing summer which subtracts a present sample from a previous sample). The differentiator output signal 183, and the combination of the differentiator signal and the lowpass filter signal as signal 184. The differentiator and combo pack signals stop at the Nyquist frequency, while the other filter waveforms are effectively wideband. The example FIG. 32 also shows the effect of the lowpass filter on the harmonic components of the original readback signal 188 after downsampling signal 186. After downsampling of the signal the differentiator (e.g., 1--d filter running at low frequency) has a sine wave shape, and the HSP 204 has a smooth line. The Lowpass Downsamp Data signal 186 and the Lowpass Downsamp Diff signal 187 are the signals shown in the spectrum which run from 0 to 1 on the horizontal axis. The waveforms represent the Fourier transform of the read signals at each point in the system.

Because the channel Sample Clock may differ in phase and frequency from the clock used by the controller 17 when the controller clock is derived from the Disk_Locked Clock, the elastic buffer 212 is used in the data-path from the channel 21 to the drive controller 17. On average there is a zero difference between said two clocks over a disk revolution, but at any given time the two clocks may have an accumulated phase error that is accounted for by the elastics buffer (phase buffer) 212.

Figure 33:
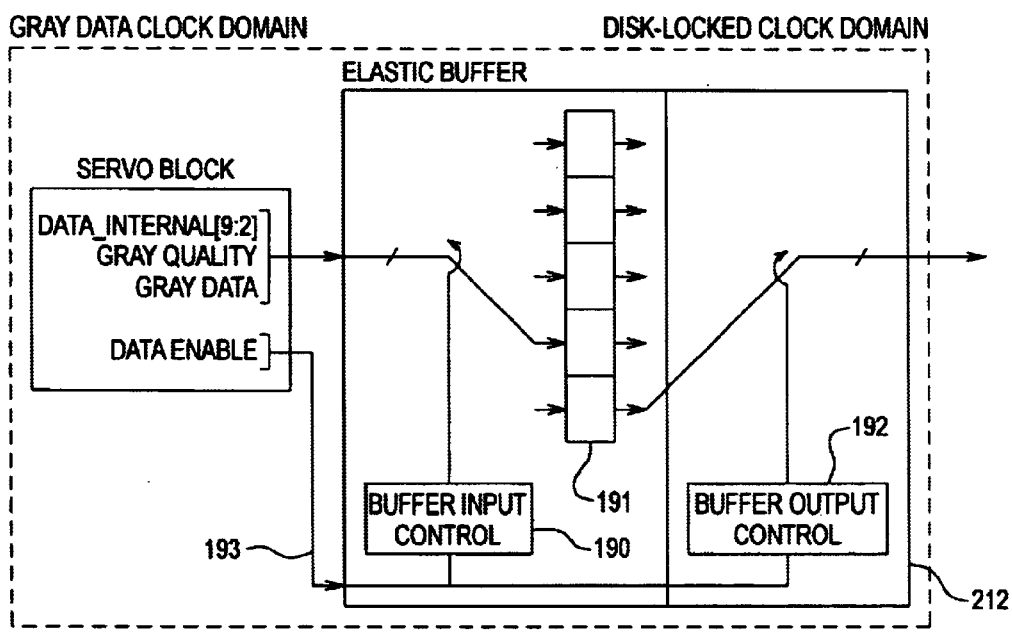
FIG. 33 shows an example block diagram of an embodiment of the elastic buffer of the control system of FIG. 15.

Referring to FIG. 33, in one embodiment, the elastic buffer 212 accomplishes the asynchronous transfer of servo data from the inner timing-loop clock domain of the channel 21 (where the clock is locked or synchronized to the servo preamble, patterned address mark and gray data) to the outer timing-loop, Disk_Locked Clock domain, of the controller 17. In order to limit the latency of the elastic buffer 212, the buffer design tolerates up to 1-T cell of phase slip between said two clocks. As such, from start to end of data transfer between the two clock domains, the clock phases can slip by up to 1-T cell before any loss of data occurs during the transfer. Given the estimated maximum frequency offset between the two clocks and maximum data transfer time period, the 1-T cell upper limit constraint is adequate.

The buffer 212 includes buffer area 191 for storing incoming data (i.e. servo data), an input control 190 for clocking in data into the buffer area 191 based on the inner timing-loop clock domain (Gray data clock), and an output control 192 for clocking data out of the buffer area 191 based on the Disk_Locked Clock domain. The buffer input and output controls 190, 192 are both triggered by an input enable signal 193 (Data enable), such that at the start of data transfer, the output data lags the input data by a minimum of 1-T cell and a maximum of 2-T cells. This enables the 1-T cell phase slip tolerance between the two clock domains due to frequency offsets. In one example operation scenario, the sampled data is clocked into the elastic buffer 212 using the Gray data clock (e.g., Disk_Locked Clock/N where N is e.g. 8). The data is clocked out on the elastic buffer 212 based on the controller 17 clock. An example buffer depth is such that there can be to +/−1 Tcell phase tolerance, so the phase difference between the two clocks, Disk_Locked Clock and controller clock, can be up to one Tcell difference.

The present invention has been described in considerable detail with reference to certain preferred versions thereof; however, other versions are possible. For example, it should be clear to those skilled in the art that the present invention may also be utilized in conjunction with other servo patterns and storage devices using servo patterns. Therefore, the spirit and scope of the appended claims should not be limited to the description of the preferred versions contained herein.

What is claimed is:

1. A method for self-servo writing a disk drive comprising the steps of:
   (a) transferring a servo reference pattern by magnetic printing onto at least one storage surface of a reference disk, wherein a resulting printed reference pattern includes embedded servo information providing servo timing and transducer head position information;
   (b) assembling the disk drive including the steps of installing at least said disk into the disk drive and enclosing said disk and the data transducers within a housing sealed against particulate contamination from an eternal ambient environment;
   (c) reading the printed reference pattern from said disk via at least one transducer head to generate a readback signal;
   (d) sampling the readback signal at a sampling rate to generate a sampled signal;
   (e) processing the sampled signal waveform spectrum to generate a recovered signal including the embedded servo information and a fundamental frequency of the sampled signal;
   (f) using the servo information from the recovered signal to precisely position and maintain the data transducers at concentric track locations of disk storage surfaces; and
   (g) self-writing disk drive servo patterns onto the storage surfaces at the concentric track locations with the data transducers in accordance with disk drive servo pattern features.

2. The method of claim 1, wherein the servo information includes a pattern of segments providing timing information.

3. The method of claim 2, wherein said segments further provide transducer head position information.

4. The method of claim 3, wherein the segments provide timing and transducer head circumferential and radial relative position information.

5. The method of claim 2, wherein the segments are substantially radially spaced.

6. The method of claim 2, wherein said segments comprise slanted segments.

7. The method of claim 1, wherein the servo information comprises a pattern of one or more substantially radial timing segments.

8. The method of claim 1, wherein the servo information provides timing and transducer head circumferential and radial relative position information.

9. The method of claim 1, wherein:
   the servo timing information comprises a pattern of one or more substantially radial timing segments; and
   the servo position information comprises position segments, such that sets of one or more timing segments are separated by the position segments.

10. The method of claim 9, wherein the position segments between the timing segments are organized into a plurality of substantially radially spaced sets of position segments.

11. The method of claim 1, wherein step (g) further includes self-writing servo patterns in relation to printed reference pattern on said disk.

12. The method of claim 11, wherein:
    step (b) further includes the steps of including one or more data disks having storage surfaces in the disk drive; and
    step (g) further includes self-writing servo patterns on the storage surfaces of the data disks.

13. The method of claim 1, wherein step (f) further includes the steps of using the servo information in the recovered signal to measure an eccentricity and timing non-uniformity of the printed reference pattern to precisely position and maintain the data transducers at concentric data tracks.

14. The method of claim 13, wherein the step of measuring eccentricity further includes the steps of using at least the servo timing information to measure the eccentricity of the printed reference pattern.

15. The method of claim 1, wherein step (f) further includes the steps of using the servo timing and position information in the recovered signal to measure an eccentricity of the printed reference pattern to precisely position and maintain the data transducers at concentric data tracks.

16. The method of claim 13 further comprising the steps of using a circuit and controls to counteract at least one eccentricity and timing non-uniformity of the printed reference pattern before self-writing the disk drive servo patterns.

17. The method of claim 1, further comprising the steps of:
    obtaining eccentricity phase information corresponding to an eccentricity and timing non-uniformity of the printed reference pattern, from the recovered signal;

wherein:
step (f) further includes the steps of generating a phase coherent clock signal based on said eccentricity phase information; and
step (g) further includes the steps of using the phase coherent clock signal to write the disk drive servo pattern in relation to the printed reference pattern.

18. The method of claim 17, wherein in step (f) further includes the steps of generating said phase coherent clock signal based on: (1) said eccentricity phase information, and (2) said servo information.

19. The method of claim 17, wherein step (f) further includes the steps of:
synthesizing a clock signal; and
modulating the synthesized clock signal based on said eccentricity phase information in a phase modulation loop to generate said phase coherent clock.

20. The method of claim 19, wherein step (f) further includes the steps of:
in a phase modulation loop, modulating the synthesized clock signal based on: (1) said eccentricity phase information, and (2) said servo timing and position information in the recovered signal, to generate said phase coherent clock.

21. The method of claim 19, wherein step (f) further includes the steps of:
in said phase modulation loop:
(i) obtaining even and odd synchronous samples of the servo information in the recovered signal providing timing information, and measuring a phase of the reference pattern, based on said synchronous samples, and
(ii) modulating the synthesized clock signal based on: (1) said eccentricity phase information, and (2) said measured phase, to generate said phase coherent clock.

22. The method of claim 21, wherein the step of obtaining said even and odd synchronous samples includes sampling the servo information in the reference pattern based on the phase coherent clock.

23. The method of claim 17, wherein step (g) further comprises the steps of using the phase coherent clock to counteract the eccentricity and timing non-uniformity of the printed reference pattern before self-writing the disk drive servo patterns.

24. The method of claim 17 further comprising the steps of using the eccentricity phase information to counteract the eccentricity and timing non-uniformity of the printed reference pattern before self-writing the disk drive servo patterns.

25. The method of claim 1, wherein:
step (f) further includes the steps of obtaining printed reference pattern phase information based on the servo information in the recovered signal, and generating a phase coherent clock signal based on the printed reference pattern phase information, and
step (g) further includes the steps of using the phase coherent clock signal to write the disk drive servo patterns in relation to the printed reference patterns.

26. The method of claim 1, further including the steps of obtaining servo timing information from the recovered signal and generating a sample clock based on the obtained servo timing information, for sampling the readback signal.

27. The method of claim 26, further comprising the steps of:
generating a synthesized clock;
in a timing loop, modulating the synthesized clock based on the obtained servo timing information to generate said sample clock.

28. The method of claim 27, wherein the servo information in the reference pattern includes Preamble fields, such that the sample clock is used to sample the Preamble fields.

29. The method of claim 27, wherein the sample clock is used to sample the servo information in the reference pattern, to obtain a phase lock to extract track identification and servo address mark information.

30. The method of claim 26, wherein the step of generating the sample clock further includes the steps of generating the sample clock based on even and odd synchronous samples in the recovered signal.

31. The method of claim 30, wherein the step of generating the sample clock further includes the steps of generating the sample clock based on differences of even and odd synchronous samples in the recovered signal.

32. The method of claim 30, wherein the step of generating the sample clock further includes the steps of:
generating a synthesized clock;
in a timing loop, modulating the synthesized clock based on said even and odd synchronous samples to generate said sample clock.

33. The method of claim 1, wherein the printed reference pattern has a resolution lower than a disk drive servo pattern including features proportional to head gap widths of data transducer heads included in the disk drive.

34. The method of claim 33, wherein:
the printed reference pattern has a resolution lower than the disk drive servo pattern; and
step (e) further includes the step of attenuating one or more harmonics of the sampled signal and synchronously downsampling the attenuated signal at a downsampling rate to generate said recovered signal.

35. The method of claim 34, wherein the ratio of the resolution of the disk drive servo pattern to the printed reference pattern is an integer.

36. The method of claim 35, wherein the ratio of said sampling rate to said down sampling rate is an integer.

37. The method of claim 1, wherein in step (e) processing the sampled signal includes the steps of attenuating one or more harmonics of the sampled signal to generate said recovered signal.

38. The method of claim 1, wherein in step (e) processing the sampled signal includes the steps of equalizing the sampled signal waveform spectrum to generate said recovered signal.

39. The method of claim 1, wherein in step (e) processing the sampled signal includes the steps of attenuating one or more harmonics of the sampled signal waveform spectrum to generate said recovered signal including a fundamental frequency of the sampled signal waveform.

40. The method of claim 39, wherein in step (e) processing the sampled signal includes the steps of attenuating a third harmonic of the sampled signal waveform spectrum to generate said recovered signal including a fundamental frequency of the sampled signal waveform.

41. The method of claim 1, further wherein:
step (b) further includes the steps of installing one or more disks in the disk drive along with said reference disk having the reference pattern, and the step of (d) of self-writing disk drive servo pattern comprises writing disk drive servo patterns onto storage surfaces of said reference disk and said one or more disks with the aid of the printed reference pattern.

42. The method of claim 41, wherein step (d) includes stagger writing the servo patterns onto the storage surfaces of said disks.

43. A self-servo writing disk drive, comprising:
(a) a reference disk including a printed reference pattern transferred by magnetic printing onto a storage surface of the reference disk, wherein the printed reference pattern includes embedded servo information providing servo timing and transducer head position information;
(b) a spindle motor for rotating at least the reference disk;
(c) a synchronous sampling data detection circuit including:
   (i) a digital sampler for synchronously sampling analog readback signals magnetically induced to a transducer head from flux transitions present in the reference pattern, at a sampling rate to produce digital samples representing a sampled signal waveform;
   (ii) a data detection channel configured for receiving the digital samples and processing the sampled signal waveform spectrum to generate recovered samples representing the embedded servo information; and
   (iii) a control loop circuit for extracting servo timing and position information from the recovered samples and using said extracted information to precisely position and maintain the data transducers at concentric track locations of disk storage surfaces, and self-writing disk drive servo patterns onto the storage surfaces at the concentric track locations with the data transducers in accordance with disk drive servo pattern features.

44. The self-servo writing disk drive of claim 43, wherein the channel is configured for processing the digital samples by equalizing the sampled signal waveform spectrum to generate said recovered samples.

45. The self-servo writing disk drive of claim 43, wherein the channel is configured for processing the sampled signal waveform spectrum to generate said recovered samples further representing a recovered signal waveform having a fundamental frequency of the sampled signal waveform.

46. The self-servo writing disk drive of claim 45, wherein the control loop circuit further utilizes said fundamental frequency waveform to obtain a phase lock to extract track identification and servo address mark information from the embedded servo information.

47. The self-servo writing disk drive of claim 45, wherein the channel is further configured for processing the digital samples by attenuating one or more harmonics of the sampled signal waveform spectrum to generate said recovered samples representing the recovered signal waveform having a fundamental frequency of the sampled signal waveform.

48. The self-servo writing disk drive of claim 45, wherein the channel is further configured for processing the digital samples by amplifying at least a portion of the sampled signal waveform spectrum to generate said recovered samples representing the recovered signal waveform having a fundamental frequency of the sampled signal waveform.

49. The self-servo writing disk drive of claim 43, wherein the channel includes a decimation filter for processing the digital samples to extract the harmonic content of the readback signal waveform.

50. The self-servo writing disk drive of claim 49, wherein the decimation filter includes at least a lowpass filter for processing the digital samples to attenuate one or more harmonics of the readback signal waveform.

51. The self-servo writing disk drive of claim 49, wherein the decimation filter includes a first finite precision filter coupled in series with a second finite precision filter for processing the digital samples to attenuate one or more harmonics of the readback signal waveform, wherein the first filter implements the transfer function:

$$\frac{D}{[1 - 1.25D + 0.375D^2]}$$

and the second filter implements the transfer function:

$$\frac{[1 - 9.375D + 0.375D^2]}{[1 - 1.25D + 0.375D^2]}$$

where D represents a delay register.

52. The self-servo writing disk drive of claim 50, wherein the decimation filter includes a downsampler for downsampling the signal output of the lowpass filter at a downsampling rate of N to 1, wherein N represents an integer ratio of the resolution of the disk drive servo patterns to the resolution of the reference pattern.

53. The self-servo writing disk drive of claim 52, wherein N represents the ratio of said sampling rate of the readback analog signal, to the downsampling rate of the output of the lowpass filter.

54. The self-servo writing disk drive of claim 52, wherein the frequency cut off of the lowpass filter is at the fundamental frequency of the readback signal waveform.

55. The self-servo writing disk drive of claim 54, wherein the Nyquist to the fundamental frequency ratio is 4 to 1.

56. The self-servo writing disk drive of claim 49, wherein the channel further includes a detector for processing synchronous samples output from the decimation filter to detect a preamble waveform in the embedded servo information.

57. The self-servo writing disk drive of claim 56, wherein the channel further comprises a timing loop circuit for receiving the output of the detector, and generating a timing signal for sampling the analog readback signal at said sampling rate.

58. The self-servo writing disk drive of claim 56, wherein the channel further includes a phase signal processor coupled to the output of the detector, for processing even and odd synchronous samples of the servo information in the sampled signal providing timing information, for measuring a phase of the reference pattern based on said synchronous samples.

59. The self-servo writing disk drive of claim 56, wherein the control loop circuit further comprises a phase compute circuit for receiving said timing information from the phase signal processor and measuring a phase of the reference pattern therefrom.

60. The self-servo writing disk drive of claim 59, wherein the phase compute circuit is configured for calculating an inverse tangent of a value that is a function of the ratio of said odd and samples, to measure the phase of the reference pattern.

61. The self-servo writing disk drive of claim 60, further including a circuit for determining the head radial position information based on apriori knowledge of the format of the printed reference pattern, using said measured phase of the rotating reference pattern due to eccentricity, and the expected phase of the printed pattern to determine a phase difference providing a radial position error for the control loop circuit to maintain the head on concentric tracks.

62. The self-servo writing disk drive of claim 60, wherein:
the control loop circuit further includes an outer loop circuit configured for using said measured phase of the reference pattern to modulate a synthesized clock signal based on said measured phase to generate a phase coherent signal for writing said servo patterns.

63. The self-servo writing disk drive of claim 60, wherein:
the channel further includes a time processor for measuring time intervals corresponding to speed of the rotation of the reference pattern; and
the control loop circuit further includes an outer loop circuit configured for using said measured phase of the reference pattern and said time intervals to modulate the synthesized clock signal to generate the phase coherent signal for writing said servo patterns.

64. The self-servowriting disk drive of claim 43, wherein the synchronous sampling data detection circuit is further capable of being used for reading and writing data to storage surfaces for normal data recording and retrieval operation.

65. A synchronous sampling data detection circuit for a disk drive including at least a transducer head, a reference disk having a printed reference pattern transferred by magnetic printing onto a storage surface of the reference disk, wherein the printed reference pattern includes embedded servo information providing servo timing and transducer head position information, a spindle motor for rotating at least the reference disk, the data detection circuit comprising:
(i) a digital sampler for synchronously sampling analog readback signals magnetically induced to a transducer head from flux transitions present in the reference pattern, at a sampling rate to produce digital samples representing a sampled signal waveform;
(ii) a data detection channel configured for receiving the digital samples and processing the sampled signal waveform spectrum to generate recovered samples representing the embedded servo information; and
(iii) a control loop circuit for extracting servo timing and position information from the recovered samples and using said extracted information to precisely position and maintain the data transducers at concentric track locations of disk storage surfaces, and self-writing disk drive servo patterns onto the storage surfaces at the concentric track locations with the data transducers in accordance with disk drive servo pattern features.

66. The data detection circuit of claim 65, wherein the channel is configured for processing the digital samples by equalizing the sampled signal waveform spectrum to generate said recovered samples.

67. The data detection circuit of claim 65, wherein the channel is configured for processing the sampled signal waveform spectrum to generate said recovered samples further representing a recovered signal waveform having a fundamental frequency of the sampled signal waveform.

68. The data detection circuit of claim 67, wherein the control loop circuit further utilizes said fundamental frequency waveform to obtain a phase lock to extract track identification and servo address mark information from the embedded servo information.

69. The data detection circuit of claim 67, wherein the channel is further configured for processing the digital samples by attenuating one or more harmonics of the sampled signal waveform spectrum to generate said recovered samples representing the recovered signal waveform having a fundamental frequency of the sampled signal waveform.

70. The data detection circuit of claim 67, wherein the channel is further configured for processing the digital samples by amplifying at least a portion of the sampled signal waveform spectrum to generate said recovered samples representing the recovered signal waveform having a fundamental frequency of the sampled signal waveform.

71. The data detection circuit of claim 65, wherein the channel includes a decimation filter for processing the digital samples to extract the harmonic content of the readback signal waveform.

72. The data detection circuit of claim 71, wherein the decimation filter includes at least a lowpass filter for processing the digital samples to attenuate one or more harmonics of the readback signal waveform.

73. The data detection circuit of claim 71, wherein the decimation filter includes a first finite precision filter coupled in series with a second finite precision filter for processing the digital samples to attenuate one or more harmonics of the readback signal waveform, wherein the first filter implements the transfer function:

$$\frac{D}{[1 - 1.25D + 0.375D^2]}$$

and the second filter implements the transfer function:

$$\frac{[1 - 9.375D + 0.375D^2]}{[1 - 1.25D + 0.375D^2]}$$

where D represents a delay register.

74. The data detection circuit of claim 72, wherein the decimation filter includes a downsampler for downsampling the signal output of the lowpass filter at a downsampling rate of N to 1, wherein N represents an integer ratio of the resolution of the disk drive servo patterns to the resolution of the reference pattern.

75. The data detection circuit of claim 74, wherein N represents the ratio of said sampling rate of the readback analog signal, to the downsampling rate of the output of the lowpass filter.

76. The data detection circuit of claim 74, wherein the frequency cut off of the lowpass filter is at the fundamental frequency of the readback signal waveform.

77. The data detection circuit of claim 76, wherein the Nyquist to the fundamental frequency ratio is 4 to 1.

78. The data detection circuit of claim 71, wherein the channel further includes a detector for processing synchronous samples output from the decimation filter to detect a preamble waveform in the embedded servo information.

79. The data detection circuit of claim 78, wherein the channel further comprises a timing loop circuit for receiving the output of the detector, and generating a timing signal for sampling the analog readback signal at said sampling rate.

80. The data detection circuit of claim 78, wherein the channel further includes a phase signal processor coupled to the output of the detector, for processing even and odd synchronous samples of the servo information in the sampled signal providing timing information, for measuring a phase of the reference pattern based on said synchronous samples.

81. The data detection circuit of claim 70, wherein the control loop circuit further comprises a phase compute circuit for receiving said timing information from the phase signal processor and measuring a phase of the reference pattern therefrom.

82. The data detection circuit of claim 81, wherein the phase compute circuit is configured for calculating an inverse tangent of a value that is a function of the ratio of said odd and samples, to measure the phase of the reference pattern.

83. The data detection circuit of claim 82, further including a circuit for determining the head radial position information based on apriori knowledge of the format of the printed reference pattern, using said measured phase of the rotating reference pattern due to eccentricity, and the expected phase of the printed pattern to determine a phase difference providing a radial position error for the control loop circuit to maintain the head on concentric tracks.

84. The data detection circuit of claim 82, wherein:

the control loop circuit further includes an outer loop circuit configured for using said measured phase of the reference pattern to modulate a synthesized clock signal based on said measured phase to generate a phase coherent signal for writing said servo patterns.

85. The data detection circuit of claim 84, wherein:

the channel further includes a time processor for measuring time intervals corresponding to speed of the rotation of the reference pattern; and the control loop circuit further includes an outer loop circuit configured for using said measured phase of the reference pattern and said time intervals to modulate the synthesized clock signal to generate the phase coherent signal for writing said servo patterns.

86. The data detection circuit of claim 65, wherein the synchronous sampling data detection circuit is further capable of being used for reading and writing data to storage surfaces for normal data recording and retrieval operation.

87. The data detection circuit of claim 65, wherein:

the digital sampler includes low frequency reference sampler;

the control loop circuit is configured for controlling said low frequency reference sampler based on digital phase recovery of low frequency servo information from said reference pattern.

88. The data detection circuit of claim 65, wherein:

the digital sampler includes low frequency reference sampler;

the channel is configured for controlling said low frequency reference sampler based on digital phase recovery of low frequency servo information from said reference pattern.

* * * * *